(12) United States Patent
Carson et al.

(10) Patent No.: US 9,499,422 B1
(45) Date of Patent: Nov. 22, 2016

(54) TECHNOLOGIES, FUNCTIONS, AND APPLICATIONS OF SCIMIST

(75) Inventors: Roger W. Carson, Vienna, VA (US); Kent E. Maggard, Springfield, VA (US); Michael L. Mastracci, Rockville, MD (US); Richard Soehn, West Melbourne, FL (US)

(73) Assignee: Scimist Corporation, Vienna, VA (US)

( * ) Notice: Subject to any disclaimer, the term of this patent is extended or adjusted under 35 U.S.C. 154(b) by 164 days.

(21) Appl. No.: 12/804,643

(22) Filed: Jul. 26, 2010

Related U.S. Application Data

(60) Provisional application No. 61/271,665, filed on Jul. 24, 2009.

(51) Int. Cl.
*C02F 1/46* (2006.01)
*C02F 1/70* (2006.01)
*C02F 1/72* (2006.01)

(52) U.S. Cl.
CPC .. *C02F 1/70* (2013.01); *C02F 1/72* (2013.01)

(58) Field of Classification Search
CPC ............... C02F 2201/46115; C02F 1/4618; C02F 1/4672; C02F 1/4676
USPC ................................................. 204/263, 266
See application file for complete search history.

(56) References Cited

U.S. PATENT DOCUMENTS

| | | | | |
|---|---|---|---|---|
| 4,069,371 | A * | 1/1978 | Zito | 429/409 |
| 5,855,763 | A * | 1/1999 | Conlin et al. | 205/688 |
| 5,952,542 | A * | 9/1999 | Steele | 588/303 |
| 5,968,337 | A * | 10/1999 | Surma et al. | 205/688 |
| 7,045,238 | B2 * | 5/2006 | Gottmann et al. | 429/418 |
| 7,387,719 | B2 * | 6/2008 | Carson et al. | 205/688 |
| 2005/0123472 | A1 * | 6/2005 | Hall et al. | 423/651 |
| 2006/0144700 | A1 * | 7/2006 | Carson et al. | 204/252 |

* cited by examiner

*Primary Examiner* — Zulmariam Mendez
(74) *Attorney, Agent, or Firm* — James Creighton Wray; Meera P. Narasimhan

(57) ABSTRACT

Anolytes and catholytes in and from separate anolyte and catholyte reaction chambers and electrochemical separation chambers are used for destruction of waste, sharps, biologicals, prions, cleaning of tanks, equipment, coal, ores and metals, sanitizing, sterilizing, generation of hydrogen, fuels, sterilizing solutions, water and heat and power, and processing of coal, shale oil and oil sands.

33 Claims, 24 Drawing Sheets

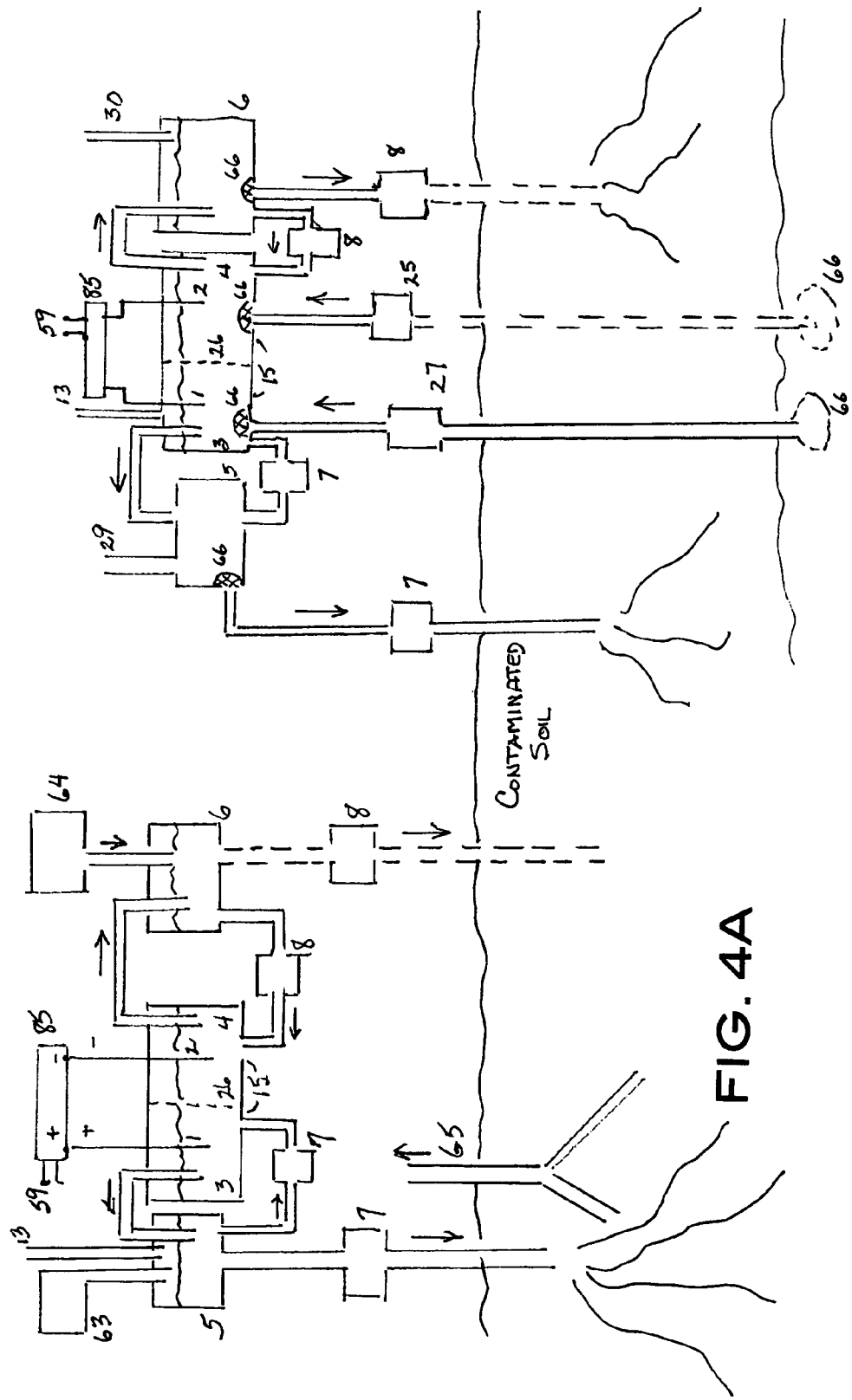

TECHNOLOGIES, FUNCTIONS, AND APPLICATIONS OF SCIMIST

This application claims the benefit of U.S. Provisional Application No. 61/271,665, filed Jul. 24, 2009, which is hereby incorporated by reference in its entirety.

SUMMARY OF THE INVENTION

This invention relates generally to processes and apparatus(s) for the use of the SCIMIST electrochemical technologies to perform eleven distinct Functions and their applications. This group of Functions is composed of technologies that collectively will be hitherto referred to as SCIMIST. The technologies that comprise SCIMIST are contained but not limited to those in the following list: a) SEO (SCIMIST Electrochemical Oxidation), b) SER (SCIMIST Electrochemical Reduction), c) single compounds, isopolyanions, heteropolyanions, and combinations thereof, d) secondary oxidation/reduction, e) additional energy sources (ultrasonic, ultraviolet, and mechanical), low temperature and ambient atmospheric pressure, g) electrical and thermal controls, h) water recovery, i) electrolytes composed of acid, alkaline, neutral salts, acid and neutral salts, and alkaline and neutral salts, and j) selective membranes (semi-permeable, ion selective, ceramic, glass frits, etc.), k) liquids, solids, and gas materials, l) DC low voltage and high current, m) ECO-Product gas generation, n) sensor and instrumentation controls, o) variable concentration of electrolytes and SCIMIST compounds, p) discharger (oxidizer/reducer suppressor), q) strong oxidizers and reducers, r) free radical generation by oxidizing species reacting with the aqueous solution, s) digital programmable processes and operational cycles, t) application of AC potential to electrochemical cell, u) different electrolyte in anolyte and catholyte, v) concurrent use of multiple SCIMIST compounds, w) highly non-selective oxidizers/reducers, x) variable temperature controlled throughout anolyte and catholyte systems, y) simultaneous use of SEO and SER processes, and z) Internet enabled controls and operations. SCIMIST technologies are defined in detail in the numerous patents that have been granted since 2001 and this list does not constitute an exhaustive list of all potential technologies.

The technologies that comprise SCIMIST are combined into unique processes and apparatus that are used to perform at least eleven distinct functions hitherto referred to as the SCIMIST Functions. The eleven SCIMIST Functions are as follows: 1) decomposition, 2) dissolution, 3) decontamination, 4) sanitation, 5) producing chemical intermediates, 6) inorganic and organic fuel generation, 7) generation of electrical, thermal, and mechanical energy, 8) hydrocarbon generation by reduction, 9) generation of ECO-Products, 10) Extraterrestrial Based Operations, and 11) Hybrid Formulations. Within each SCIMIST Function the set of SCIMIST technologies that are used to perform that specific function may vary depending on engineering trade-offs and the end-use of that specific function. The list of functions is not assumed to be complete and the invention includes others that derive from the SCIMIST technologies, both specified and implied.

Practical applications of SCIMIST use selected SCIMIST Functions singly or in combination to satisfy specific needs and solve various problems by applying and integrating the functions into comprehensive system solutions. The following systems represent specific SCIMIST Applications that are used to demonstrate the breadth and scope of the use of the SCIMIST Functions:

Embodiment # Application Title
1. Waste Destruction,
2. Medical Sharps Handling
3. Low Level Transuranic Waste
4. Sharps Destruction
5. Fertilizer Production
6. Transuranic Dissolution
7. Soil Remediation
8. Recovery of Precious Metals
9. Container and Equipment Decontamination
10. Decontaminating Transuranic Materials m
11. Spa and Pool Sanitizer
12. Washer (waterless) m
13. Lab Equipment Sterilization
14. On-site Generation of Sterilizing Solutions
15. Chemical Intermediate
16. Methane Generator
17. Methanol Generator
18. Hydrogen Combustion Substitution
19. Hydrogen/Oxygen Combustion Substitution
20. Hydrogen/Oxygen Blending with Combustion Fuels
21. Combined Heat and Power (CHP) Powers SCIMIST Functions
22. Generating Combustion Fuel from CHP Exhaust
23. Methane Generation Feed CHP
24. Gas-fired Internal Combustion Engine
25. Production of Mechanical Power
26. Hydrogen as Combustion Fuel
27. Hydrogen and Oxygen Blended with Combustion Fuels
28. Generating Hydrocarbon by Reduction
29. Closed-Loop Generation of Hydrocarbon by Reduction
30. Solar Enhanced ECO-Products Generation
31. Recovery of Inorganic Salts
32. Water Recovery
33. ECO-Gases Storage
33. Off Gas Management
34. Thermal Energy Capture
35. Extraterrestrial-Based System ECO-Product Generator
36. Extraterrestrial-Based Hydrocarbon Generator
37. Shale Oil Processor
38. Oil Sands Processor
39. Clean Coal Processor
40. Remotely Generated Energy Converter The SCIMIST Applications are presented in this invention as the embodiments (41 items) and some of them (FIGS. 1-24) are so depicted.

The SCIMIST technologies are combined in unique and different ways to produce systems that perform the eleven distinct functions. In addition the basic technologies of SCIMIST can provide ECO-Products and enable the integration of multiple functions into many and varied engineering Applications. The SCIMIST technologies create safe and clean chemical changes to many diverse forms of input materials including unwanted waste products and/or soluble compounds turning them into useful end products and ECO-Products. The following items are listed as potential input materials—this list should not be considered exhaustive. Typical input materials are: all biological materials, all organic materials (excluding fluorinated hydrocarbons), and some inorganic materials.

The end products and ECO-Products directly produced by the SCIMIST technologies include hydrogen, oxygen, carbon dioxide, nitrogen, chemical intermediates, water, salts, and heat. The term "ECO-Gases is used in this invention to refer collectively to hydrogen, oxygen, nitrogen, and carbon dioxide. This invention offers implementations and embodiments where SCIMIST technologies operate at significantly reduced carbon footprints and in some applications they achieve nearly carbon neutral results. The SCIMIST technologies in this invention have features that provide embodiments that can achieve 'net zero-energy' applications.

The SCIMIST technologies are scalable, configurable, possess broad functionality, and are interoperable with numerous other systems and applications. SCIMIST technologies may operate stand-alone or may be integrated within or added to, a myriad of embodiments tailored to solve specific problems for many industrial institutional, commercial, and/or residential applications.

The world society today faces three significant intractable issues resulting from an ever expanding population and exponential advances in technology—the volume of waste materials produced, the exposure to toxic, corrosive, carcinogenic, and infectious materials, and potential climate change due to the expanding energy usage paced by populate growth and increasing technological expectation. The present invention addresses these problems with solutions based on its new SCIMIST family of technologies applied in a variety of systemic ways to solve the large variety of problems.

The SCIMIST electrochemical technology promises many SCIMIST Applications across numerous industries, institutions, commercials, and domestic venues. The SCIMIST Applications of the SCIMIST technologies are accomplished by using its various SCIMIST Functions either in a standalone system or in combination with various preferred embodiments. The preferred embodiments use the SCIMIST Function(s) to produce designer chemical compounds or ECO-Products to avert or solve environmental problems, provide better solutions for societal needs, and improve industrial processes. The SCIMIST Functions and preferred embodiments (engineered Applications) exhibit improved efficiencies, conservation of carbon-based fuels, reducing carbon footprints, and better stewardship of waste or unwanted materials; breaking the cycle of creating additional polluting or toxic substances.

SCIMIST comprises a set of technologies previously described. The SCIMIST technologies are arranged into a comprehensive and a promising array of new processes and apparatus based on the science of electrochemistry. The SCIMIST core technologies are combined in unique combinations that produce the eleven distinct SCIMIST Functions.

The SCIMIST technologies include but are not limited to these processes and apparatus: a) SCIMIST Electrochemical Oxidation (SEO), b) SCIMIST Electrochemical Reduction (SER), c) secondary oxidation and/or reduction, d) SCIMIST simple ions, isopolyanions, heteropolyanions, and combinations thereof, e) addition energy sources of ultrasonic, ultraviolet, mechanic, and combinations thereof, f) low temperature and ambient atmospheric pressure, g) electrical and thermal controls, h) water recovery, i) electrolytes composed of acid, alkaline, neutral salts, acid and neutral salts, and alkaline and neutral salts, j) selective membranes (semi-permeable, ion selective, ceramic, glass frits, etc.), k) liquids, solids, and gas materials, l) DC low voltage and high current, m) ECO-Product gas generation, n) sensor and instrumentation controls, o) variable concentration of electrolytes and SCIMIST compounds, p) discharger (oxidizer/reducer suppressor), q) strong oxidizers and reducers, r) free radical generation by oxidizing species reacting with the aqueous solution, s) digital programmable processes and operational cycles, t) application of AC potential to electrochemical cell, u) different electrolyte in anolyte and catholyte, v) concurrent use of multiple SCIMIST compounds, w) highly non-selective oxidizers/reducers, x) variable temperature controlled throughout anolyte and catholyte systems, y) simultaneous use of SEO and SER processes, and z) Internet enabled controls and operations. A SCIMIST function may involve the use of SEO and SER processes and apparatus. A SCIMIST Function may use processes that incorporate the use of ions selected from the group consisting of (a) simple ion redox couples (see Table I), (b) Type I isopolyanions, (c) Type I heteropolyanions, (d) heteropolyanions containing heteroatom type element(s) in both Table I and Table II, or (e) combinations from this list. An ion with a redox potential greater than 1.7v is referred to as a 'super oxidizer' in the patents incorporated in this invention. A SCIMIST Function may use a 'super oxidizer', which produce a secondary oxidation process that may generate free radicals. The secondary oxidation process may contain either or both organic or inorganic free radicals. A SCIMIST Function may use one or more electrolytes in the anolyte and catholyte, which are selected from an acid, an alkaline, a neutral salt, an acid and neutral salt, or an alkaline and neutral salt. A direct current (DC) power supply applies a low DC voltage across the anode and cathode. The two cells containing the anode and the cathode are filled with two electrolytes (an aqueous solution); an anolyte 3 and a catholyte 4 respectively. Pump(s) independently circulate the anolyte 3 and catholyte 4 respectively through the two separated cells. The SCIMIST Function(s) operates at low temperatures (less than 100° C.) and at ambient atmospheric pressure. The aqueous electrolyte solutions may contain selected compounds that have been added to the electrolytes. As the selected compounds in solution pass through the anolyte section or catholyte section of the electrochemical cell 15 an electrical potential is applied across the electrodes to cause a reaction with the compounds and alters their electrical composition.

The mix of SCIMIST technologies enables additional features, which significantly affect the SEO and SER processes. Included in those features is the addition of ultrasonic energy sources to foster mixing, sonic breakdown of feed materials, emulsifying of two or more liquids, implosion for vigorous mixing in the catholyte solution to oxidizing the nitrous acid and small amounts of NOx, and dissociating compounds in the electrolyte such as hydrogen peroxide into hydroxyl free radicals. Ultraviolet energy sources are used to a) decompose hydrogen peroxide into hydroxyl free radicals, and/or, b) kill microorganisms present in the feed materials. Included in the SCIMIST technologies are system components such as; a) organic compound removal systems from the anolyte 3, b) anolyte recovery system operating on the catholyte 4, c) mechanical mixing systems, d) thermal control systems to manage the anolyte 3 and catholyte 4 temperatures, e) water removal systems such as reverse osmosis and flash vacuum systems, and f) processes for the generation of secondary oxidation accomplished by free radicals (both inorganic and organic).

This invention utilizes combinations of the SCIMIST technologies to form these eleven unique SCIMIST Functions: 1) decomposition, 2) dissolution, 3) decontamination, 4) sanitation, 5) producing chemical intermediates, 6) inorganic and organic fuel generation, 7) generation of electrical, thermal, and mechanical energy, 8) hydrocarbon generation by reduction, 9) generation of ECO-Products, 10) Extraterrestrial Based Operations, and 11) Hybrid Formulations. This list of SCIMIST Functions should not be considered the only functions represented by this invention nor should it be an exhaustive list.

Underpinning these eleven Functions and the many derived Applications are the SCIMIST electrochemical technologies, with the basic principle—controlling chemical reactions, which involve ionic and electron transfer between electrodes and the respective electrolyte or species in solution. Although based on the basic core electrochemistry, the eleven SCIMIST-designated Functions can be characterized by their different outputs enabled by selective control of the basic SEO (oxidation) and/or SER (reduction) reactions. The outputs produced are simpler, less toxic compounds, valuable intermediate chemical compounds that have positive economic values, or ECO-Products that contribute environmental benefits. Finer input detail is accomplished by virtue of conventional process and system engineering, which will further manage and use the ECO-Gases.

Each of the SCIMIST Functions is uniquely controlled to produce different chemical reactions, and reflect different system configurations. Yet all Functions and their derived Applications have at their core the basic SCIMIST technologies.

The altered compounds react with the feed materials that have been introduced into the SCIMIST Functions 1, 2, and 3 resulting in decomposing, dissolving, and decontaminating of these materials. Feed materials can be introduced into the SCIMIST Function 5 where they are modified into chemical intermediate products. The SCIMIST Function 4 may be used without any feed materials and only the selected compounds in the aqueous anolyte and catholyte solutions. In that case the selected compounds are converted to strong oxidizers/reducers as an output product for use in sanitizing, sterilizing, disinfecting, and cleaning. The SCIMIST Function 6 converts feed materials into inorganic fuels for use in energy systems. The fuels generated include, hydrogen, oxygen, and carbon dioxide. The SCIMIST Function 7 uses the heat generated from the feed materials as well as the hydrogen, oxygen, carbon dioxide to produce various forms of energy. The SCIMIST Function 7 creates the various forms of energy (thermal, mechanical, and electrical) by converting the energy content within the feed materials. SCIMIST Function 8 uses the catholyte component of the system to perform reduction of the carbon dioxide that is fed from the anolyte component. The reduction of carbon dioxide yields carbon monoxide, which in turn is mixed with hydrogen to produce hydrocarbons such as methane, and methanol. The latter hydrocarbon fuels are generated in connection with the use of fuel cells operating in reverse mode. The SCIMIST Function 8 is used in tandem units or singly to perform the reduction. The SCIMIST Function 9 produces numerous ECO-Products from the feed materials. The ECO-Products produced are water, inorganic salts, chemical intermediates, heat, hydrogen, oxygen, carbon dioxide, hydrocarbon combustibles, and nitrogen. The SCIMIST Function 10 is used to perform processes in an extraterrestrial-based environment. This function may produce useful ECO-Products from processing feed materials such as urine, soapy water, food waste, human waste, animal waste, construction waste, experiment waste, mortuary waste, human and animal body disposal, solids as skin cells and hair, trace organics, microbes, and condensation from cabin air. The SCIMIST Function 11 blends several Functions into a Hybrid system. Hybrid Systems combine functions such as decomposition, dissolution, sanitation, and ECO-Products to transform unwanted materials so that a process is remediated as well as generating energy and fuels to increase the productivity of the process. Typical of a hybrid function is the integration of these SCIMIST Functions with existing processes for recovering oil from the oil sands.

The SCIMIST Application(s) consists of a number of different modified configurations that are dependent on which of the eleven fundamental SCIMIST Functions are being used. These SCIMIST Functions produce many useful ECO-Products that can be used in a SCIMIST technology application or other applications. The various gases result from the selected compounds used in the anolyte and catholyte solutions and the choice of electrolyte(s) used in the anolyte and catholyte solutions. Carbon dioxide and oxygen are typical gases produced from the SEO process in the anolyte portion of the SCIMIST Functions. Hydrogen is the most common gas produced by the SCIMIST Functions in the catholyte portion. Under specific choices of electrolytes for the catholyte fluid the gas may be nitrogen. The SCIMIST Functions may produce liquid products, for example, water, strong oxidizer in solution, and chemical intermediates. The products of the SCIMIST Functions may be used in a preferred embodiment to produce additional results; conversion to thermal, mechanical and electrical energy, and/or potable water. SCIMIST Function products may be used in additional preferred embodiments to produce items such as-hydrocarbon fuels, and hydrogen blends with methane or propane.

The SCIMIST technologies have many applications across numerous industries. The applications of the SCIMIST technologies are accomplished by using SCIMIST Functions either as standalone systems or in combination with preferred embodiments. The preferred embodiment interface with the SCIMIST Functions and use the ECO-Products to solve problems, fulfill needs, and/or satisfy want. The SCIMIST Functions used with preferred embodiments exhibit improved efficiencies, conservation of carbon-based fuels, reducing carbon footprints, and disposing of unwanted materials without creating polluting substances. Reference to the materials being used by the SEO or SER processes in this invention as waste does not imply that they are necessary waste in the common sense.

SEO Chemistry

SCIMIST Electrochemical Oxidation (SEO) process chemistry described in this patent uses oxidizer species (i.e., characteristic elements having atomic number below 90) as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements'listed in Table II (heteroatoms) either singly or in combination thereof; or any HPA containing at least one heteroatom type (i.e., element) contained in both Table I and Table II; or combinations of mediator species from any or all of these generic groups. Since the anolyte and catholyte are completely separated entities, it is not necessary for both systems to contain the same electrolyte. Each electrolyte may, independent of the other, consist of an aqueous solution of acids, alkali, neutral salts, acids and neutral salts, and alkali and salts.

The SEO Apparatus is unique in that it accommodates the numerous choices of mediator ions and electrolytes by simply draining, flushing, and refilling the system with the mediator/electrolyte system of choice.

Because of redundancy and similarity in the description of the various mediator ions, only the iron and sulfuric acid combination is discussed in detail. However, it is to be understood that the following discussion of the ferric/ferrate, $(Fe^{+3})/(FeO_4^{-2})$ redox couple reaction in sulfuric acid ($H_2SO_4$) also applies to all the aforementioned oxidizer species and electrolytes described at the beginning of this section. Furthermore, the following discussions of the interaction of ferrate ions with aqueous electrolytes to produce the aforementioned free radicals also applies to all aforementioned mediators having an oxidation potential sufficient to be classified super oxidizers (SO). A super oxidizer has an oxidation potential at least equal to that of the redox couple $Ce^{+3}/Ce^{+4}$ that has a potential of approximately 1.7 volts at 1 molar, 25° C. and pH 1 in an acid electrolyte.

FIG. 1 shows an SEO Apparatus in a schematic representation for destroying animal waste. At the anode of the electrochemical cell 15 Fe (III) ions ($Fe^{+3}$, ferric) are oxidized to Fe (VI) ions ($FeO_4^{-2}$, ferrate),

If the anolyte temperature is sufficiently high, typically above 50° C., the Fe (VI) species may undergo a redox reaction with the water in the aqueous anolyte. The oxidation of water proceeds by a sequence of reactions producing a variety of intermediate reaction products, some of which react with each other. A few of these intermediate reaction products are highly reactive free radicals including, but not limited to the hydroxyl (.OH) and hydrogen peroxy or perhydroxyl (.$HO_2$) radicals. The mediated oxidizer species ions may interact with anions present in the acid or neutral salt electrolyte (e.g., $NO_3^-$, $SO_4^{-2}$, or $PO_4^{-3}$, etc.) to produce free radicals typified by, but not limited to .$NO_3$, or the anions may undergo direct oxidation at the anode(s) of the cell. The population of hydroxyl free radicals may be increased by ultraviolet irradiation of the anolyte in the anolyte reaction chambers 5 to cleave the hydrogen peroxide molecules, and intermediate reaction products, into two such radicals. Free radical populations also are increased by ultrasonic vibration induced by the aforementioned implosion generated shock wave, augmented by the 4800° C. temperature spike and 1000 atmospheres pressure.

These secondary oxidation species are capable of oxidizing organic materials and thus act in consort with Fe(VI) ions to oxidize the organic materials.

The oxidizers react with the input materials to produce $CO_2$ and water. These processes occur in the anolyte on the anode side of the system in the anolyte reaction chambers 5 and throughout the anolyte system when in solution.

Addition of ferric ions to non-iron-based SEO systems has the potential for increasing the overall rate of input materials oxidation compared to the non-iron SEO system alone. (Again it is to be understood this discussion of the ferric/ferrate redox couple also applies to all the aforementioned oxidizer species described at the beginning of this section.) An example is considering a two-step process the first of which is to electrochemically formed an $FeO_4^{-2}$ ion. In the second step, the $FeO_4^2$ ion oxidizes a mediator ion, from its reduced form (e.g., sulfate) to its oxidized form (e.g., peroxysulfate), faster than by the direct anodic oxidation of the sulfate ion itself. Thus there is an overall increase in the rate of input materials destruction.

Membrane 26 separates the anode and the cathode chambers in the electrochemical cell 15. Hydrogen ions ($H^+$) or hydronium ions ($H_3O^+$) travel through the membrane 26 due to the electrical potential from the dc power supply applied between the anode(s) 1 and cathodes(s) 2.

In the case where the catholyte contain compounds other than nitrogen such as sulfuric or phosphoric acids or their salts, the hydrogen ions ($H^+$) or hydronium ions ($H_3O^+$) contact the cathode and hydrogen gas evolves. The hydrogen gas is diluted with the air from the air sparge and released to the atmosphere or the evolved hydrogen gas can be feed to devices that use hydrogen as a fuel such as the fuel cells. The hydrogen may under go purification prior to use (e.g., palladium diffusion, etc.) and/or solid-state storage (e.g., adsorption in zirconium, etc.).

In some cases oxygen is evolved at the anode due to the over voltage necessary to create the oxidation species of some of the mediator ions. The efficiency of these mediators is somewhat less under those conditions. The evolved oxygen can be feed to the devices that use hydrogen as a fuel such as the fuel cells. Using the evolved oxygen to enrich the air above its nominal oxygen content of 20.9 percent increases the efficiency of fuel cells deriving their oxygen supply from ambient air.

The overall process results in the input materials being converted to carbon dioxide, water, and a small amount of inorganic compounds in solution or as a precipitate, which may be extracted by the inorganic compound removal and treatment system 20.

The SEO process may proceed until complete destruction of the input materials has been affected or modified to stop the process at a point where the destruction of the input materials is incomplete but: a) the organic materials are benign and do not need further treatment, or b) the organic materials may be used in the form they have been reduced to and thus would be recovered for that purpose.

SER Chemistry

SCIMIST Electrochemical Reduction (SER) process chemistry described in this patent will use reducer species, which are also known as reductants and reducing agents. The reducers used in this invention are described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of mediator species from any or all of these generic groups. The SCIMIST Electrochemical Reduction (SER) process involves an electrolyte containing one or more redox couples, wherein the reduced form of at least one redox couple is produced by cathodic reduction at the cathode(s) of an electrochemical cell. The reduced forms of any other redox couples present are produced either by similar cathodic reduction or reaction with the reduced form of other redox couples present capable of affecting the required redox reaction. The cathodic reduction in the electrochemical cell is driven by an externally induced electrical potential induced between the anode(s) and cathode(s) of the cell. The reduced species of the redox couples reduced the feed materials and are themselves converted to their oxidized form, whereupon they are re-reduced by either of the aforementioned mechanisms and the redox cycle continues until all reducible feed materials, including intermediate reaction products, have undergone the desired degree of reduction. The redox species ions are thus seen to facilitate the transfer of electrons to the feed materials from the cathode, (i.e., reduction of the feed materials).

A membrane in the electrochemical cell separates the anolyte and catholyte, thereby preventing parasitic oxidation of the reducing species at the anode. The membrane is typically an ion-selective cation exchange membrane (e.g., Nafion™, etc.) or a micro porous polymer, ceramic, or sintered glass membrane. The preferred SER process uses the ions species described in Table I (simple anions redox couple mediators); the Type I isopolyanions (IPA) formed by Mo, W, V, Nb, and Ta, and mixtures thereof; the Type I heteropolyanions (HPA) formed by incorporation into the aforementioned isopolyanions of any of the elements listed in Table II (heteroatoms) either singly or in combinations thereof; any type heteropolyanion containing at least one heteropolyatom (i.e. element) contained in both Table I and Table II; or combinations of mediator species from any or all of these generic groups. In addition to the reductants previously identified in the Tables the SER process in this invention may use electropositive elemental metals (e.g., Fe, Zn, etc.), hydride transfer reagents (e.g., $NaBH_4$, $NaAlH_4$, etc.), and hydrogen gas.

Since the anolyte and catholyte are completely separated entities, it is not necessary for both systems to contain the same electrolyte. Each electrolyte may, independent of the other, consist of an aqueous solution of acids, alkali, neutral salts, acids and neutral salts, and alkali and salts.

The SER Apparatus is unique in that it accommodates the numerous choices of mediator ions and electrolytes by simply draining, flushing, and refilling the system with the mediator/electrolyte system of choice. If the catholyte temperature is sufficiently high, typically above 50° C., the ions may undergo a redox reaction with the water in the aqueous anolyte. The reduction of water proceeds by a sequence of reactions producing a variety of intermediate reaction products, some of which react with each other. A few of these intermediate reaction products are highly reactive free radicals including, but not limited to the hydroxyl (.OH) and hydrogen peroxide or perhydroxyl ($.HO_2$) radicals. Additionally, the mediated oxidizer species ions may interact with anions present in the acid or neutral salt electrolyte (e.g., $NO_3^-$, $SO_4^{-2}$, or $PO_4^{-3}$, etc.) to produce free radicals typified by, but not limited to $.NO_3$, or the anions may undergo direct reduction at the cathode(s) of the cell. The population of hydroxyl free radicals may be increased by ultraviolet irradiation of the catholyte in the catholyte reaction chambers 6 to cleave the hydrogen peroxide molecules, and intermediate reaction products, into two such radicals. Free radical populations also are increased by ultrasonic vibration induced by the aforementioned implosion generated shock wave, augmented by the 4800° C. temperature spike and 1000 atmospheres pressure.

These secondary reduction species are capable of reducing organic materials and thus act in consort with the ions to reduce the organic materials.

The reducers react with the feed materials to produce hydrogen, $CO_2$ and water. These processes occur in the catholyte on the cathode side of the system in the catholyte reaction chamber and throughout the catholyte system when in solution.

Membrane 26 separates the anode and the cathode chambers in the electrochemical cell 15. Hydrogen ions ($H^+$) or hydronium ions ($H_3O^+$) travel through the membrane 26 due to the electrical potential from the dc power supply applied between the anode(s) and cathodes(s).

In the case where the catholyte contain compounds other than nitrogen such as sulfuric or phosphoric acids or neutral salts, the hydrogen ions ($H^+$) or hydronium ions ($H_3O^+$) contact the cathode and hydrogen gas evolves. The hydrogen in the catholyte will also act as its own reducer, which contributes, to the SER process. The hydrogen gas is diluted with the air from the air sparge and released to the atmosphere or the evolved hydrogen gas can be feed to devices that use hydrogen as a fuel such as the fuel cells. The hydrogen may under go purification prior to use (e.g., palladium diffusion, etc.) and/or solid-state storage (e.g., adsorption in zirconium, etc.).

The overall process results in the input feed materials being converted to hydrogen, carbon dioxide, water, and a small amount of inorganic compounds in solution or as a precipitate, which may be extracted by the inorganic compound removal and treatment system.

The SER process may proceed until complete destruction of the input feed materials has been affected or modified to stop the process at a point where the destruction of the input feed materials is incomplete but: a) the organic materials are benign and do not need further treatment, or b) the organic materials may be used in the form they have been reduced to and thus would be recovered for that purpose.

The entireties of U.S. Pat. Nos. 4,686,019; 4,749,519; 4,874,485; 4,925,643; 5,364,508; 5,516,972; 5,745,835; 5,756,874; 5,810,995; 5,855,763; 5,911,868; 5,919,350; 5,952,542; and 6,096,283.

These and further and other objects and features of the invention are apparent in the disclosure, which includes the above and ongoing written specification, with the claims and the drawings.

BRIEF DESCRIPTION OF THE DRAWINGS

Table I Simple Ion Redox Couples

Table II Elements Participating as Heteroatoms in Heteropolyanion Complex Anion Redox Couple Mediators FIG. 1, Decomposition. This is a schematic representation of a functional version of the SCIMIST Function (1) for decomposition.

FIG. 2 is a schematic representation of a functional version of the SCIMIST Function (1) for handling of sharps. FIG. 2 is a schematic representation of a general embodiment of a SCIMIST Function (1) for this present invention. The FIG. 2 shows the ARC implementation for the SEO process, which would replace the ARC in FIG. 1. A similar version would show the CRC implementation for the SER process by replacing the CRC in FIG. 1.

FIG. 3 shows an implementation of both the SEO and SER processes, which may be used as, separate systems or operate in a simultaneous mode.

FIG. 4a, Soil Remediation Open-Loop. This is a schematic representation of SCIMIST Function (3) of the invention operating in the open-loop decontamination mode to clean contaminated soil where the electrolyte is left to disperse in the soil. FIG. 4b, Soil Remediation Closed-Loop, is a schematic representation of SCIMIST Function (3) of soil remediation operating in a closed-loop mode where the electrolyte is recovered and reused in the process.

FIG. 5 shows both the SEO and SER processes to decontaminate mining scrap that has been contaminated by a cyanide process. The processes can be used singly or in combination.

FIG. 7a illustrates the SEO configuration. When the SER process is used the circulation system similar to the anolyte system in FIG. 7a is connected to the CRC 6 and the catholyte is circulated similar to the way the anolyte is circulated in FIG. 7a.

FIG. 8 is a representation of the use of SCIMIST Function (4).

FIG. 10 is a representation of the use of SCIMIST Function (8).

FIG. 11 is a representation of the use of SCIMIST Function (6).

FIG. 12 is a representation of the use of SCIMIST Function (7).

FIG. 14 is a representation of the use of SCIMIST Function (8).

FIG. 15 is a representation of the use of SCIMIST Function (8).

FIG. 17 is a representation of the use of SCIMIST Function (9).

FIG. 18 is a representation of the use of SCIMIST Function (9).

FIG. 19 is a representation of the use of SCIMIST Function (9).

FIG. 20 is a representation of the use of SCIMIST Function (10).

Figure 1:
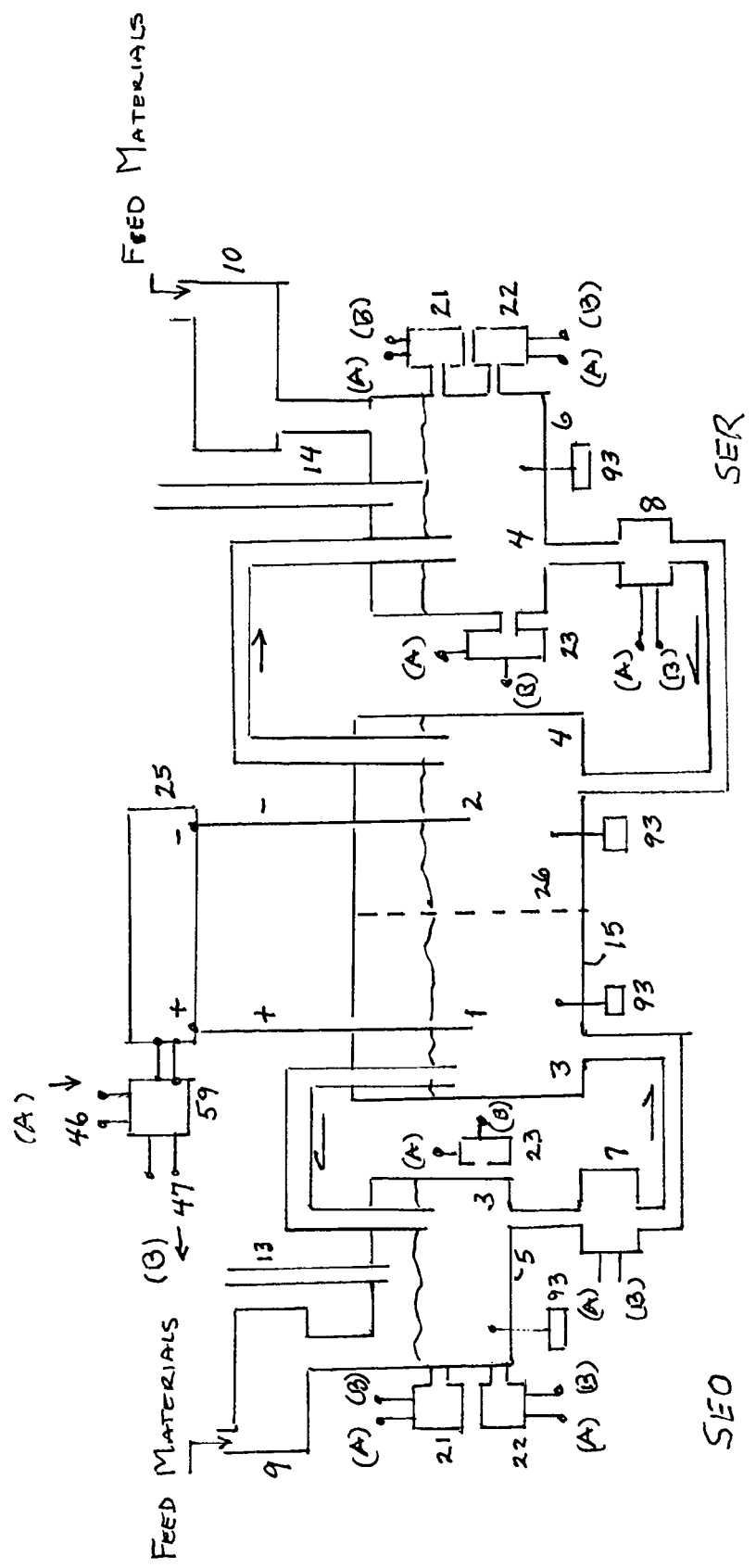
FIG. 1 is a schematic representation of a general embodiment of a SCIMIST Function (1) for this present invention. The figure shows both the SEO and SER processes, which may operate singly or simultaneously.

| Components for Figures | |
|---|---|
| Number | Element |
| 1 | Anode |
| 2 | Cathode |
| 3 | Anolyte |
| 4 | Catholyte |
| 5 | ARC |
| 6 | CRC |
| 7 | Anolyte-Pump |
| 8 | Catholyte-Pump |
| 9 | Anolyte-Input |
| 10 | Catholyte-Input |
| 11 | Anolyte Compartment |
| 12 | Catholyte Compartment |
| 13 | Anolyte-Off Gas |
| 14 | Catholyte-Off Gas |
| 15 | Electrochemical-Cell |
| 16 | Lid |
| 17 | Spray Head |
| 18 | Basket |
| 19 | Organic Removal System |
| 20 | Inorganic Removal system |
| 21 | Ultrasonic |
| 22 | Ultraviolet |
| 23 | Mixer |
| 24 | Anolyte Spent |
| 25 | Catholyte Spent |
| 26 | Membrane |
| 27 | Anolyte Suction Pump |
| 28 | Catholyte Suction Pump |
| 29 | Off Gas Anolyte Reaction |

-continued

| Number | Element |
|---|---|
| 30 | Off Gas Catholyte Reaction |
| 31 | Grinder |
| 32 | Valve |
| 33 | Contaminated Container |
| 34 | Air Pump |
| 35 | Return Pump |
| 36 | Pool |
| 37 | Inlet Nozzle |
| 38 | Output Nozzle |
| 39 | Sampling Pump |
| 40 | Water Recovery System |
| 41 | Equipment Rack |
| 42 | Drain |
| 43 | Potable Water |
| 44 | Water Pump |
| 45 | Cleaning Compartment |
| 46 | Inputs-Instrumentation/Sensors |
| 47 | Outputs-Instrumentation/Sensors. |
| 48 | Fuel Cell |
| 49 | Pump |
| 50 | Hydrocarbon Fuel Processor |
| 51 | Fuel Cell Anode |
| 52 | Fuel Cell Cathode |
| 53 | Combustion Fuel Appliance |
| 54 | Fuel Gas Blender |
| 55 | CHP |
| 56 | $CO_2$ Filter |
| 57 | Heat Exchanger |
| 58 | AC/DC Power Supply |
| 59 | Controller |
| 60 | Feed Material Mechanism |
| 61 | CHP Exhaust |
| 62 | Gas-Fired Internal Combustion Engine |
| 63 | Input Anolyte Feed |
| 64 | Input Catholyte Feed |
| 65 | Off Gas Handler |
| 66 | Filter |
| 67 | Reverse Osmosis |
| 68 | Optical Transparent Material |
| 69 | Solar Energy |
| 70 | Filter |
| 71 | Feed Solution System |
| 72 | Pressure Regulator |
| 73 | Piston Driven Pump |
| 74 | Pressure Gauge |
| 75 | Needle Valve (5000 psi rated) |
| 76 | Ball Valve |
| 77 | Drain |
| 78 | Flush |
| 79 | Membrane |
| 80 | Housing |
| 81 | Temperature Control |
| 82 | Gas Pressure Pump |
| 83 | Gas Tank Storage |
| 84 | Gas Filter |
| 85 | Power Supply |
| 86 | Anolyte Supply System |
| 87 | Catholyte Supply System |
| 88 | Sterilizer Application System |
| 89 | Anolyte Storage System |
| 90 | Catholyte Storage System |
| 91 | Gas Pump |
| 92 | Condenser |
| 93 | Oxidation/Reduction Potential (ORP) Sensor |
| 94 | Processing Container |
| 95 | Spray System |
| 96 | Anolyte/Catholyte Return Lines |
| 97 | Ambient Air Fan |
| 98 | Coolant Water Basin |
| 99 | Water Recovery Unit |
| 100 | Solar Photovoltaic Panel |
| 101 | Electrical Wind Powered Generator |
| 102 | Grinder |
| 103 | Gas Compressor |
| 104 | Hydrocarbon Removal System |

-continued

| Number | Element |
|---|---|
| 105 | Solar Reaction Chamber (SRC) |
| 106 | Fermentation Processor |
| 107 | Stream Head |
| 108 | Lever |
| 109 | Sharps Vessel |

DETAILED DESCRIPTIONS OF PREFERRED EMBODIMENTS

The SCIMIST technologies are combined to form at least eleven SCIMIST Functions. The eleven SCIMIST Functions are: 1) decomposition, 2) dissolution, 3) decontamination, 4) sanitation, 5) producing chemical intermediates, 6) inorganic and organic fuel generation, 7) generation of electrical, thermal, and mechanical energy, 8) hydrocarbon generation by reduction, 9) generation of ECO-Products, 10) Extraterrestrial Based Operations, and 11) Hybrid Formulations. Numerous preferred embodiments are presented in detail in the following sections to illustrate the use of the eleven (11) different SCIMIST Functions. These embodiments are not the only embodiments that are claimed for this invention.

SCIMIST Function (1) Decomposition

In one preferred embodiment [1], Waste Destruction System, the SCIMIST Function 1 can be configured to accept feed materials in these forms; solid, liquid, gas and combinations (see FIG. 1). In this application the feed materials are considered waste. The waste may be biological, organic, inorganic, and combinations of these feed materials. Typical sources of these feed materials are medical, food, pharmaceuticals, veterinary, mortuary, industrial waste, chemical industry waste, but not limited to these alone. This embodiment decomposes the feed materials into ECO-Products converting them from unwanted or unused materials into useful products. The decomposition of the feed materials involves the use of either of the two SCIMIST electrochemical processes—SEO and SER. The feed materials to be decomposed may be introduced into either the anolyte reaction chamber 5 (ARC) or the catholyte reaction chamber 6 (CRC) depending on a) which SCIMIST process is chosen and b) which feed material is being processed. The anolyte solution composed of selected ions in an aqueous solution containing an electrolyte is circulated by a pump 7 through the ARC 5 and returned to the anolyte cell 1 in the electrochemical cell 15. The catholyte solution composed of selected ions in an aqueous solution containing an electrolyte is circulated by a pump 8 through the CRC 6 and returned to the catholyte cell 2 in the electrochemical cell 15. During the operation of the SEO or SER process there is an applied DC voltage from the power supply 85 applied across the anolyte 3 and the catholyte 4 which are separated by a semi-permeable membrane 26. A controller 59 (usually digital) accepts digital, analog, pneumatic, or mechanical inputs 46 from instrumentation and sensors throughout the embodiments. These inputs are used in the controller 59 to control the operation of the system and to output digital, analog, pneumatic, or mechanical controls to the various components throughout the system. Typical of the components controlled are: pumps, valves, nozzles, flow controls, temperature controls, flow rates, gas handling systems, ultraviolet system, ultrasonic systems, AC/DC power supply, mixer, and other components. The aforementioned controller system will be referred to in the remaining portions of the invention collectively as the controller 59. The inputs (A) from components and output (B) to components are shown in FIG. 1 but will not be repeated on each subsequent Figure for each embodiment to avoid redundancy. A form of the controller 59 will generally be a part of any embodiment. Additionally, oxidation/reduction potential (ORP) 93 sensors are use through the embodiments to measure the performance of the SEO and SER processes where needed and communicate to the controller via the inputs (A) and outputs (B).

The electrolytes chosen to be used in the anolyte 3 and catholyte 4 are from the following acid, alkaline, neutral salts, acid and neutral salts, or alkaline and neutral salts. The nature of the feed material may influence the choice of the ions selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups. Depending on the state of the feed materials the input handlers 9 and 10 will be capable of processing liquids, solids, gases, or combinations of them. The result of the SEO and SER processes is off gases, which are ECO-Products that are handled by the off gas handling systems 13 and 14 respectively.

In one preferred embodiment [2], Sharps Handling System this embodiment is used to destroy or sterilize sharps, which are defined as any objects that can cut or puncture the skin. Some sharps such as needles or scalpels are sterilized and destroyed (see embodiment [4]) while broken glass or plastics is sterilized. The products from the decomposition are water, oxygen, hydrogen, carbon dioxide, and inorganic salts. In the case where the sharps are being sterilized the choice of ions to be used may be selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

Figure 2:
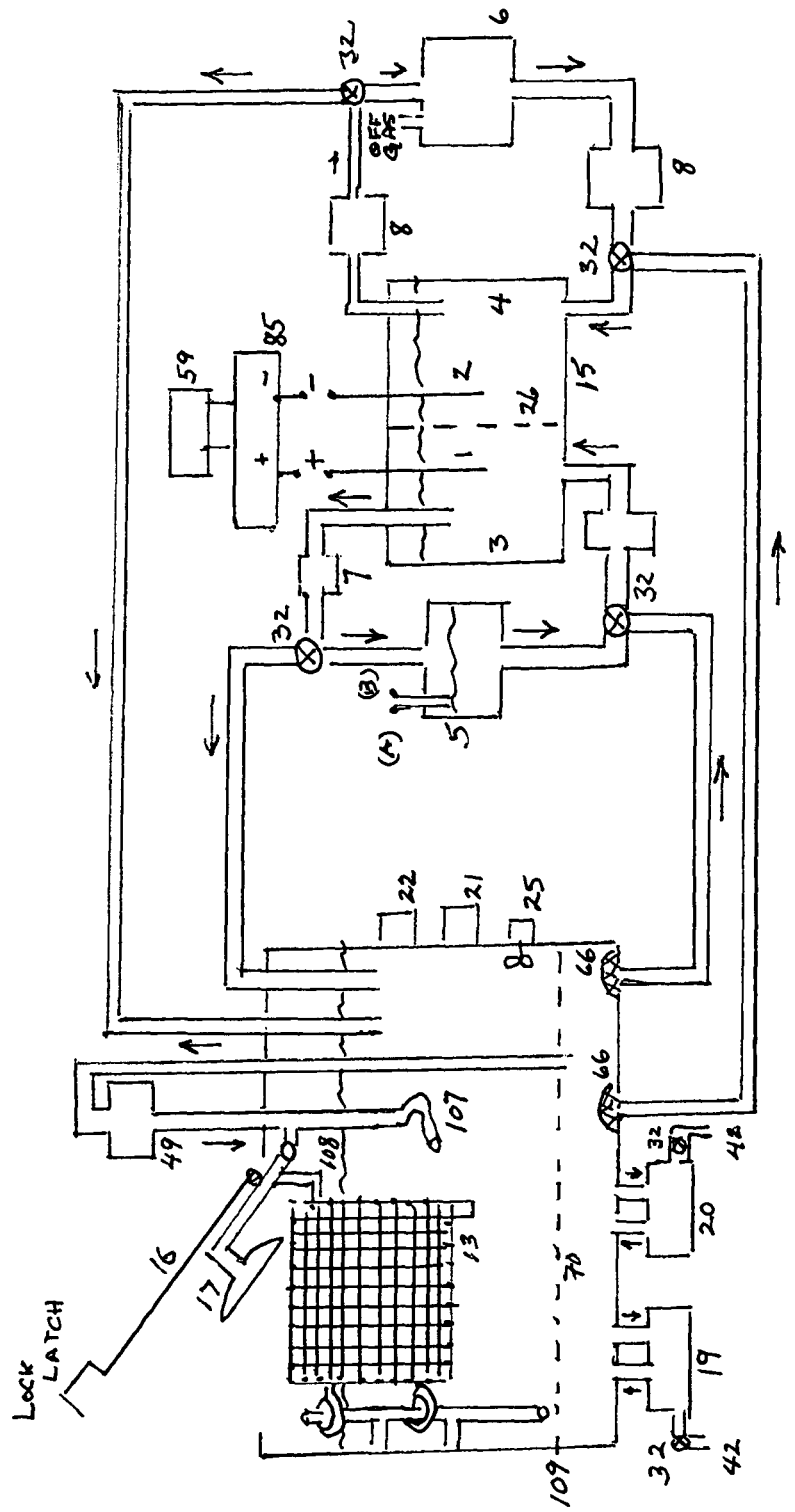
FIG. 2, Sharps Handling. This

This embodiment is similar to the embodiment in FIG. 1 with some notable changes. This embodiment uses either the SEO or SER process to sterilize the sharps. The controller 59 selects which valves 32 are open or closed depending on whether the system is using either the SEO or SER process. The ARC 5 and CRC 6 are replaced with the Sharps vessel 109 in FIG. 2. The Sharps Handling system has a lid 16 that may be opened to input sharps and is closed during the operation. A level 108 raises the basket 18 as the lid 16 is opened to drain the basket 18. The spray head 17 deposits anolyte 3 or catholyte 4 on the surface of the fluid from either the ARC or CRC to eliminate the accumulation of materials that are less dense than the anolyte 3 or catholyte 4 solutions. A stream head 107 is submerged in the electrolyte of choice to act as a mixing device. The sharps are stored in the basket 18 during the operation of the system. Additional energy sources previously discussed in the Summary of the Invention are optional in this embodiment as shown by ultrasonic 21, ultraviolet 22, and mechanical mixers 23. The DC voltage for the electrochemical cell 15 is provided by the power supply 85. A screen filter 70 keeps any solids from passing back to the electrochemical cell 15. The organic removal system 19 and the inorganic removal system 20 are used to remove either type of compound from the sharps vessel 109.

In one preferred embodiment [3], Low Level Transuranic Waste System, this embodiment is used for the destruction of the non-fluorocarbon organic component in these waste types. The SEO and SER processes are used in a manner analogous to embodiment [1] (see FIG. 1) and the ions used in this process are selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The process involves two steps in dealing with the low level waste. First, the materials will be decomposed into water, oxygen, hydrogen, carbon dioxide, and inorganic salts. The transuranics on these materials will be dissolved in to the anolyte 3 solution. The second step in the process is the removal of the transuranic salts from the anolyte 3 in a manner consistent with the governmental regulation for handling transuranic materials.

In one preferred embodiment [4], Sharps Destruction System this embodiment is used to destroy sharps, which are defined as metallic objects such as scalpels and needles that can cut or puncture the skin. This embodiment is similar to embodiment [2] (see FIG. 2). These sharps are first sterilized and then destroyed by dissolving the metallic ions into the aqueous solution. When the sharps are from this group of metallic such as scalpels and needles the choice of ion is perbromate or a similar class of ions. The dissolved metallic ions are removed form the anolyte 3 or catholyte 4 by using the Inorganic Treatment and Removal System 20.

SCIMIST Function (2) Dissolution

Figure 3:
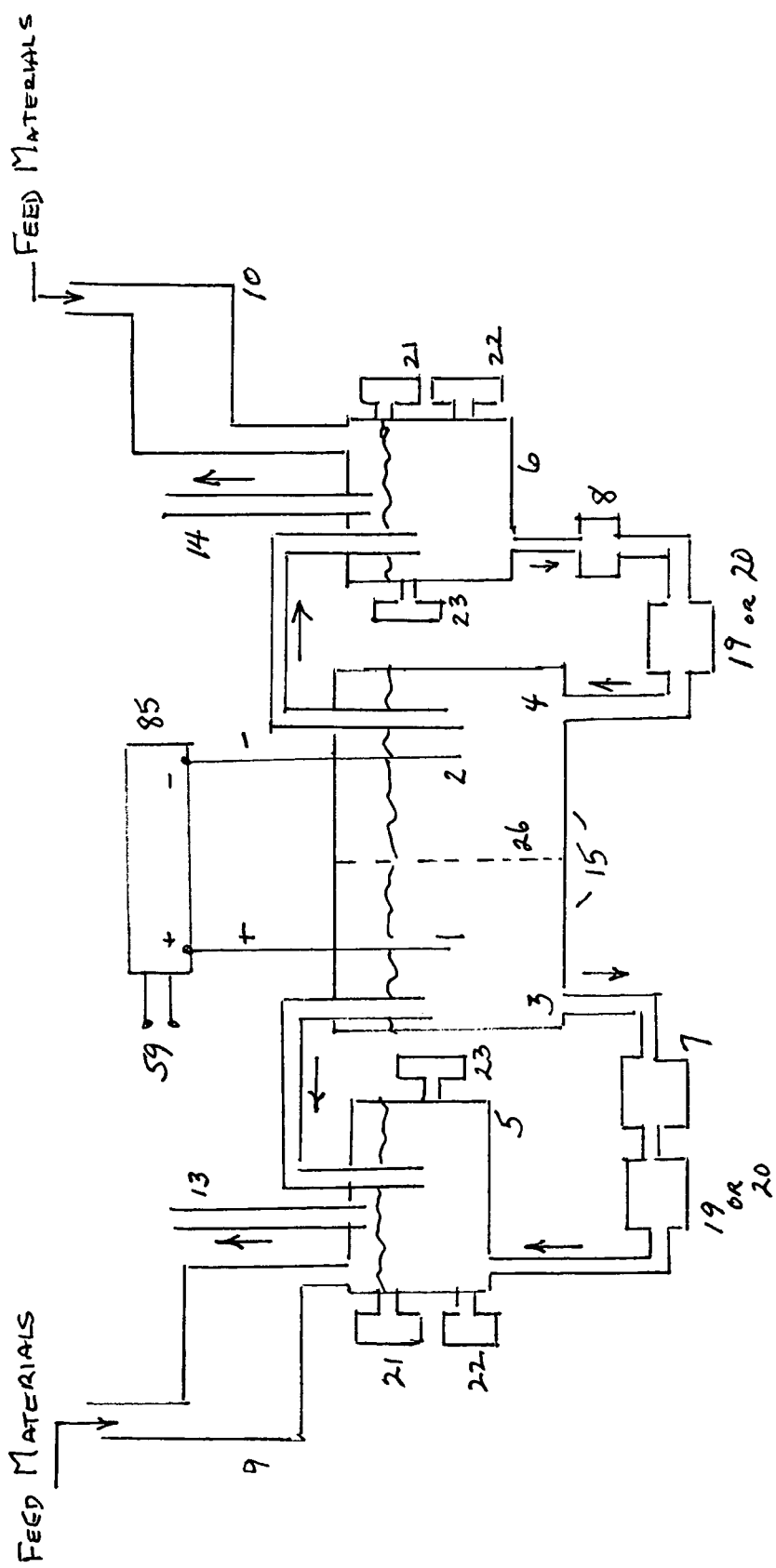
FIG. 3, Dissolution. This is a schematic representation of SCIMIST Function (2) of the invention operating in the dissolution mode.

In one preferred embodiment [5], Fertilizer Production System this embodiment uses the SCIMIST Function (2) to decompose biological waste. The biological waste will be decomposed into carbon dioxide, water, oxygen, hydrogen and trace inorganic salts. Typical of the inorganic salts are nitrogen, potassium, phosphorus, calcium, and sulfur. Animal manures are considered for use as agricultural fertilizers however they generally are not rich in minerals. This embodiment processes the biological waste, condenses the inorganic trace minerals, and destroys the pathogens leaving a clean rich fertilizer. FIG. 3 is a schematic of this embodiment. The SEO and SER processes are used in a manner analogous to embodiment [1] (see FIG. 1) and the ions used in this process are selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The power supply 85 provides the potential across the electrodes 1 and 2 in the SEO and SER process and the total embodiment is controlled by the controller system 59. The anolyte 3 and catholyte 4 uses electrolytes selected from the following; acids, alkalines, neutral salts, acid plus neutral salts, and alkaline plus neutral salt. The organic and/or inorganic removal systems 19 and 20 are used to remove any residual organic compounds and the dissolved inorganic salts. The inorganic salts contain the aforementioned compounds that may makeup the concentrated fertilizer.

In one preferred embodiment [6], Transuranic Dissolution System this embodiment is an addition to the SCIMIST Function 2 to dissolve the transuranic elements (e.g., plutonium, neptunium, americium, curium, and californium), and/or compounds thereof in transuranic waste (TRUW), low level waste (LLW), low level mixed waste (LLMW), special case waste (SCW), and greater than class C (GTCC) LLW's and remove them from the anolyte 3 that was used in the SEO and SER processes. The transuranic compounds are introduced in to this embodiment where they are dissolved by the anolyte 3 from the SCIMIST Function (2). The choice of ions to be used by the SEO in the SCIMIST Function (2) may be selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The anolyte 3 and catholyte 4 uses electrolytes selected from the following; acids, alkalines, neutral salts, acid plus neutral salts, and alkaline plus neutral salt. This embodiment is similar to embodiment [3]. The transuranic ions in solution are recovered by this embodiment and converted into transuranic metals by this embodiment. The transuranic ion recovery unit replaces the organic and/or inorganic removal systems 19 and 20. The embodiment is required to handle the transuranic materials in accord with the regulations for treating and handling radioactive materials.

SCIMIST Function (3) Decontamination

In one preferred embodiments [7], Soil Remediation System the SCIMIST Function (3) generates strong oxidizers/reducers that can be used to remediate contaminated soil. The choice of ions to be used by the SEO and SER processes in the SCIMIST Function (3) may be selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The anolyte 3 and catholyte 4 uses electrolytes selected from the following; acids, alkalines, neutral salts, acid plus neutral salts, and alkaline plus neutral salt. This embodiment operates in three modes. First, the embodiment [7a] FIG. 4a runs in an open-loop mode where the anolyte 3 or catholyte 4 are supplied to the system through the input anolyte feed 63 and the input catholyte feed 64. The anolyte 3 and catholyte 4 are processed through the electrochemical cell 5 to produce the strong oxidizers/reducers that will be released by pumps 7 and 8 respectively on to the soil that is to be remediated. The strong oxidizers/reducers decompose the contaminating materials. When the SEO process is used the anolyte is the solution released in the soil or when the SER process is used the catholyte is the solution released. The released anolyte 3 and catholyte 4 are not recirculated back through the SCIMIST Function (3) and is allowed to disperse into the ground. The SEO and SER processes produce some off gases that are collected and released from the soil by the off gas handler 65. The choice of the anolyte 3 and catholyte 4 used in this mode is an environmentally friendly solution that does not have to be recovered. The embodiment [7b] FIG. 4b can be operated in a close-loop mode where the anolyte 3 and catholyte 4 from the SCIMIST Function (3) are dispersing into the ground and recirculated back to the ARC by the anolyte suction pump 27 when the SEO process is used or recirculated back to the CRC by the catholyte suction pump 28 when the SER process is used respectively through the contaminated soil to be remediated. The input to the anolyte suction pump 27 and the input to the catholyte suction pump 28 pass through a filter 66 to remove any solids from the solution. Pumps 7 and 8 deliver the anolyte 3 and catholyte 4 to the soil and Gases generated in the SEO and SER processes are released through off gas anolyte system 29 and by the off gas catholyte system 30 to the atmosphere or to a gas storage unit such as gas storage tank 83 depicted in FIG. 14. The strong oxidizers/reducers interact with the contaminating materials and are recirculated through the SCIMIST Function (3) where they are regenerated into strong oxidizers/reducers. The controller system 59 coupled to the electrochemical cell 15 controls the embodiments shown in FIGS. 4a and 4b.

Figure 4C:
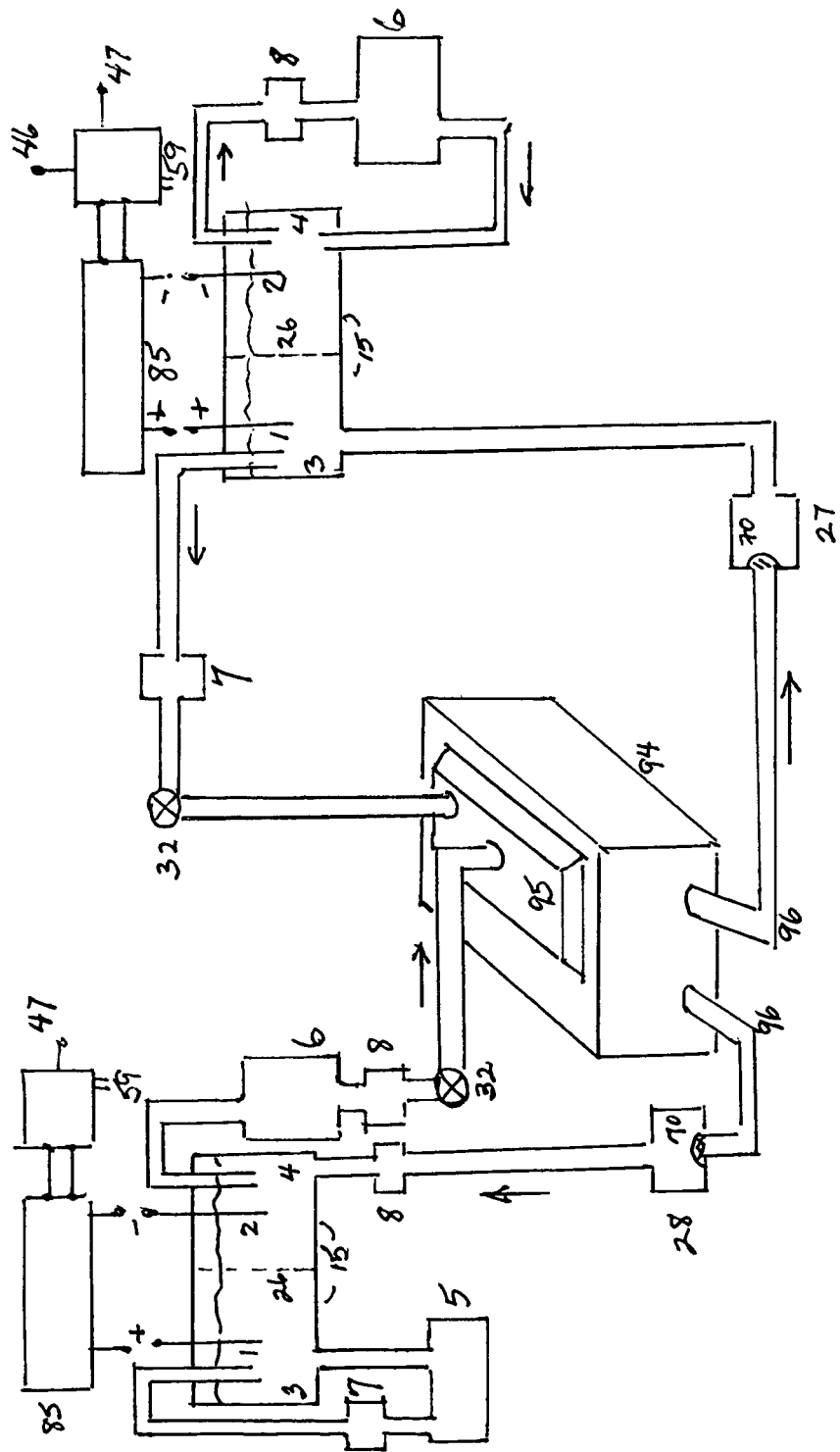
FIG. 4c is a schematic representation of SCIMIST Function (3) of the invention operating in a batch mode. The contaminated soil is removed from the ground and placed in a container where the decontamination is completed.

The embodiment [7c] FIG. 4c can be operated in a close-loop mode where the anolyte 3 and catholyte 4 from the SCIMIST Function (3) are dispersing into a processing container 94 where the contaminated soil has been removed from the ground site and placed in this container 94. The anolyte 3 or catholyte 4 will be used to decontaminate the soil depending on which process, SEO or SER, is being used to decontaminate the soil. The anolyte 3 or catholyte 4 are dispensed on to the contaminated soil in the processing container 94 by a spray system 95. The anolyte 3 or catholyte 4 are drained through the contaminated soil down to the anolyte/catholyte return lines 96. The anolyte 3 or catholyte 4 are recirculated back to the ARC by the anolyte suction pump 27 when the SEO process is used or recirculated back to the CRC by the catholyte suction pump 28 when the SER process is used respectively through the contaminated soil to be remediated. The choice of ions to be used by the SEO and SER processes in the SCIMIST Function (3) may be selected from a list a composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups. A controller 59 is used in conjunction with the power supply 85 to manage the soil remediation process. The anolyte 3 and catholyte 4 is circulated through the soil until the contaminating materials are removed. The controller 59 processes data from ORP's 93 and the off gas anolyte system 27 and the off gas catholyte system 30 to indicate completion of the decontamination process.

The embodiment [7d] uses SCIMIST Function (3) may be operated in an open-loop mode to clean up an oil spill that contaminates the beach or shorelines. In the case of the ocean beaches and shorelines, the oil permeates the soil and is hard to remove with out the contaminated soil having been removed from the beach and shoreline and placed in a container for remediation. In this embodiment pumps extract ocean water and circulate it through the anolyte side of the electrochemical cell. The typical ocean water already contains the following composition: a) calcium 411 ppm, b) chlorine 19,400 ppm, c) magnesium 1,290 ppm, d) potassium 392 ppm, e) sodium 10,800 ppm, and sulfate 904 ppm. With this composition the SCIMIST Function 3 may be used to decompose the oil in the contaminated beach and shoreline. The seawater would be circulated through the electrochemical cell and in-situ ions would be converted to oxidizers in the cell. The converted in-situ ions in the seawater are spread on the beach and shoreline where they react with the oil contamination to decompose it. The processed seawater would revert back to its input state and return to the ocean. The decomposition process would convert the oil in to carbon dioxide, water, and oxygen. The catholyte side of the system would be run in a closed-loop mode. There would be some hydrogen gas evolved from the cathode that could be used with other SCIMIST Function to offset some of the cost of decontamination of the beach and shoreline. The rate of decomposition could be increased by preprocessing the ocean water by removing some of the water through a water recovery process. The removal of the water would increase the concentration of the ions in the ocean water. The increased concentration would yield a higher concentration of oxidizers exiting the electrochemical cell. The concentration of oxidizers directly affects the rate of decomposition of the oil on the beach and shoreline.

Figure 5:
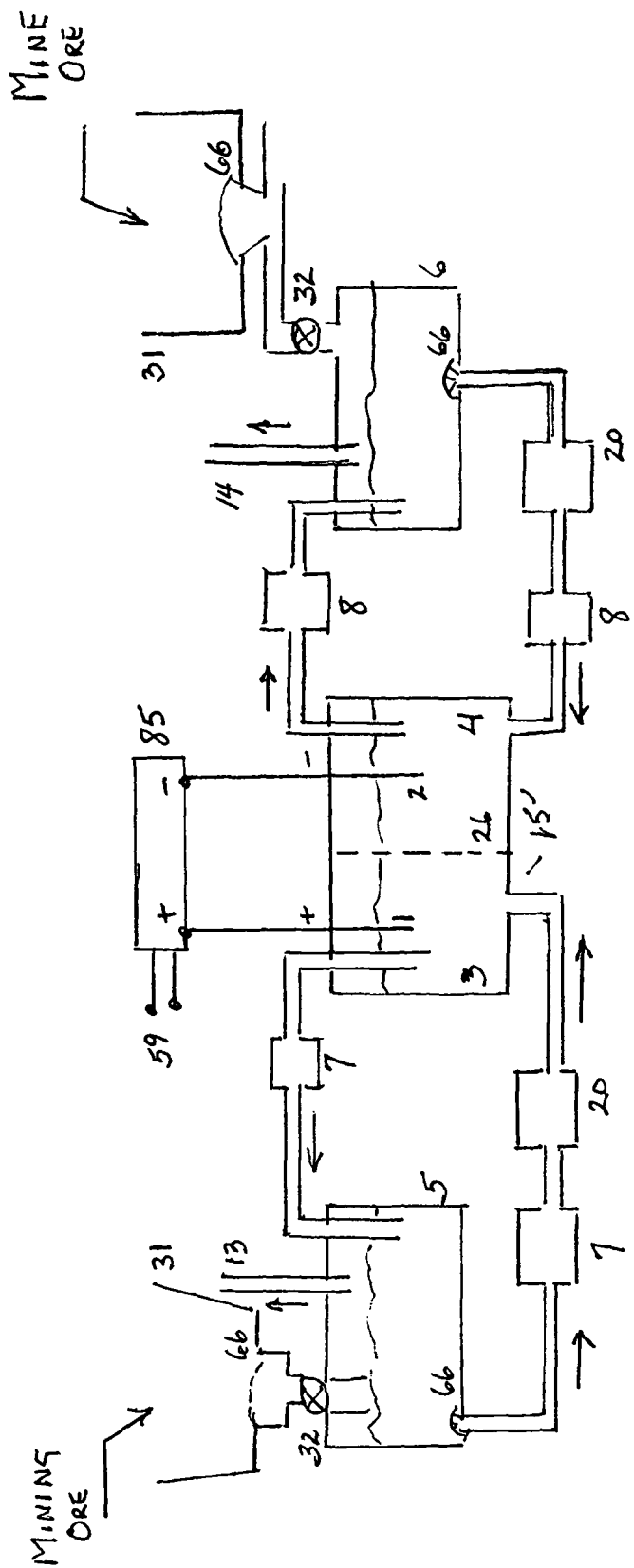
FIG. 5, Precious Metals Recovery. This is a schematic of the use of SCIMIST Function (3) in a decontamination mode.

In one preferred embodiment [8a], Recovery of Precious Metals System—the SCIMIST Function (3) dissolves the precious metal contained in the inorganic metal ores into electrolyte solution. FIG. 5 is a schematic representation of this embodiment. Generally a grinder 31 grinds the inorganic metal ore into smaller pieces to facilitate the dissolution process. The choice of ions to be used by the SEO and SER processes in the SCIMIST Function (3) may be selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The anolyte 3 and catholyte 4 uses electrolytes selected from the following; acids, alkalines, neutral salts, acid plus neutral salts, and alkaline plus neutral salt. The anolyte 3 and catholyte 4 are circulated from the electrochemical cell 15 to the ARC 5 and CRC 6. The controller 59 coupled to the power supply 85 controls the embodiment shown in FIG. 5. The SEO and SER processes dissolve the metal ore into ions in solution in either the anolyte 3 or catholyte 4. The inorganic removal system 20 extracts the metallic ions in solution from either the anolyte 3 or catholyte 4. The valve 32 controls the input feed of the ore into the ARC 5 or CRC 6. In the case of new mining ore, the SEO and SER processes will dissolve the natural compounds that contain the precious metals. Again the precious metals are in the form of ions in solution in either the anolyte 3 or catholyte 4 depending on which process, SEO or SER, is being used.

In addition to the ore mined there is considerable mining scraps resulting from the use of existing mining technology. Particularly with precious metals such as gold and silver the widely used existing ore recovery process involves the use of sodium cyanide. This historical technological process only recovers 40 to 60% of the precious metal. The remaining mining scrap is considered toxic since it is contaminated with sodium cyanide. The foregoing embodiment [8a], which processes mining ore, is modified to handle the toxic mining scrap. The implementation of this embodiment is similar to the equipment shown in FIG. 5 where the input is mining scrap. This embodiment [8b] first destroys the sodium cyanide in the mining scrap by using the SEO process, which directly removes the toxicity. In this embodiment the SEO process oxidizes sodium cyanide producing carbon dioxide and dissolving the metal ions into solution. The ions used in the aqueous anolyte 3 or catholyte 4 solutions depending on which process, SEO or SER, is used to dissolve the precious metals in to metallic ions. The choice of ions to be used by the SEO and the SER processes in the SCIMIST Function (3) may be selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The anolyte 3 and catholyte 4 uses electrolytes selected from the following; acids, alkalines, neutral salts, acid plus neutral salts, and alkaline plus neutral salt.

Figure 6:
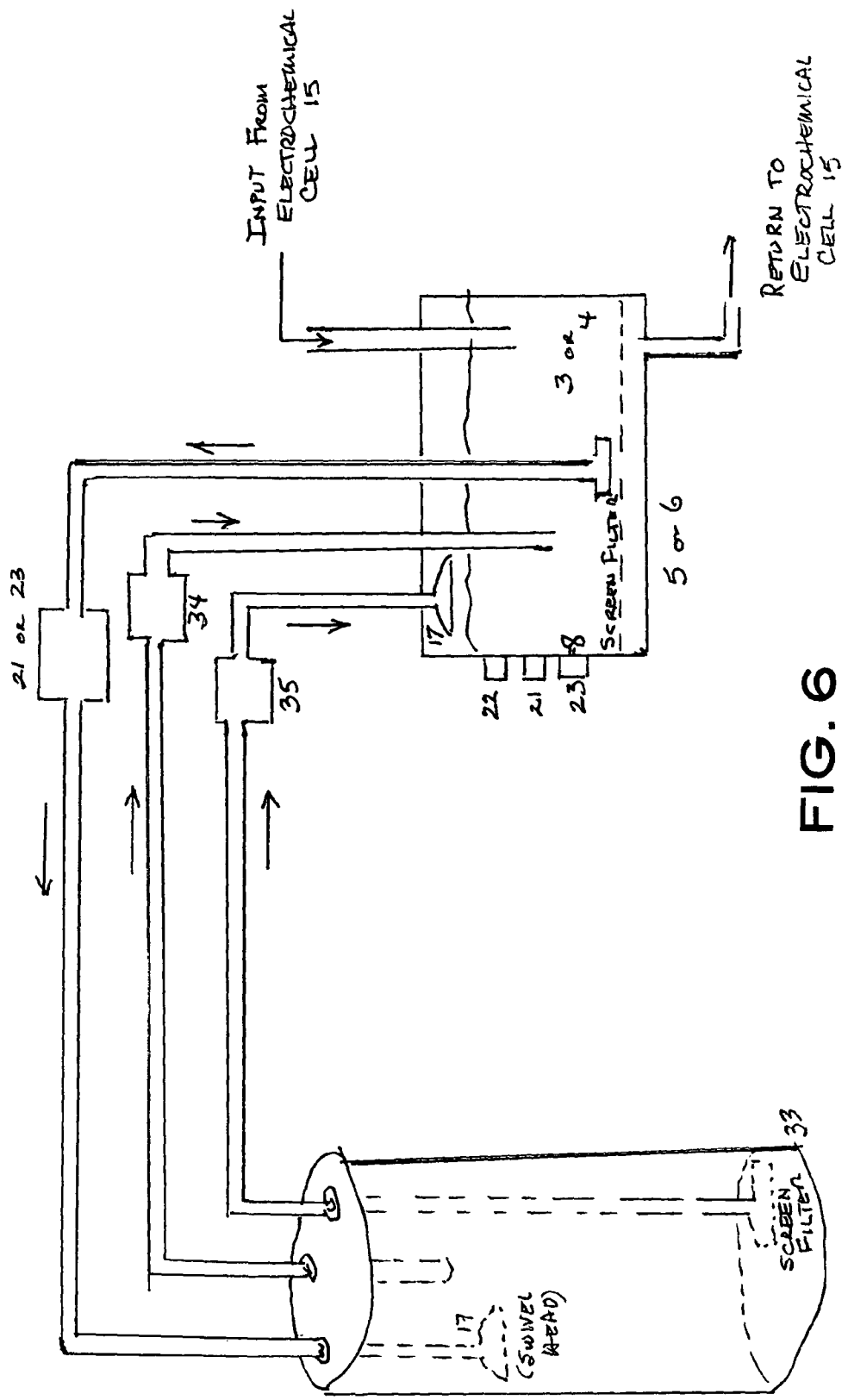
FIG. 6, Container and Equipment Decontamination. This is a schematic representation of the invention using the SCIMIST Function (3) to decontaminate a container such as a fifty-gallon drum. The equipment shown in FIG. 6 would either replace the apparatus containing grinder 31, ARC 5, inorganic removal 20, off gas 13, pump 7 and valve 32 or grinder 31, CRC 6, inorganic removal 20, off gas 14, pump 8, and valve 32. The drum is illustrative of other items such as tanks, tank trucks, railroad tanks, storage tanks on ships, and similar containers.

In one preferred embodiment [9], Container and Equipment Decontamination System the SCIMIST Function (3) is used to decontaminate storage drums, tanks, tank trucks, railroad tanks, storage tanks on ships, and similar containers by decomposition or dissolution of the contaminating material. This embodiment using SCIMIST Function (3) is configured to interface with the containers and equipment. FIG. 6 is a schematic representation of this embodiment. The power supply 85 provides the electrical potential to the electrodes 1 and 2 and the controller 59 controls the operation of the embodiment shown in FIG. 6. This embodiment is designed to circulate either the anolyte 3 or catholyte 4 containing the selected ions that has been processed by either the SEO or SER process, through the items to be decontaminated. The choice of ions to be used by the SEO in the SCIMIST Function (3) may be selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The anolyte 3 and catholyte 4 uses electrolytes selected from the following; acids, alkalines, neutral salts, acid plus neutral salts, and alkaline plus neutral salt. The contamination can be pathogens, spent oils and cleaners, transuranics from mixed waste, food residue, and similar containers and materials. The anolyte 3 or catholyte 4 are circulated by pump 27 or 28 from the ARC 5 or CRC 6 to the contaminated container 33 to be decontaminated and returned to the ARC 5 or CRC 6 by return pump 35. Air pump 34 extracts any off gases from the decontamination process internal to the container and delivers it into the anolyte fluid for further oxidation if required. Additional energy sources previously discussed in the Summary of the Invention are optional in this embodiment as shown by ultrasonic 21, ultraviolet 22, and mechanical mixers 23.

In one preferred embodiment [10], Decontaminating Transuranic Materials System this embodiment is an additional component incorporated into the SCIMIST Function (1) such as in FIG. 1 to contain the materials to be decontaminated. This embodiment also recovers the transuranic materials that are in the aqueous anolyte solution. This embodiment removes the transuranic salts from the SCIMIST Functions (1) after the materials contaminated with transuranics have been decomposed. This embodiment is an addition to the SCIMIST Functions 1 or 3 as necessary for the controlled handling of the recovered transuranic materials.

SCIMIST Function (4) Sanitation

Figure 7A:
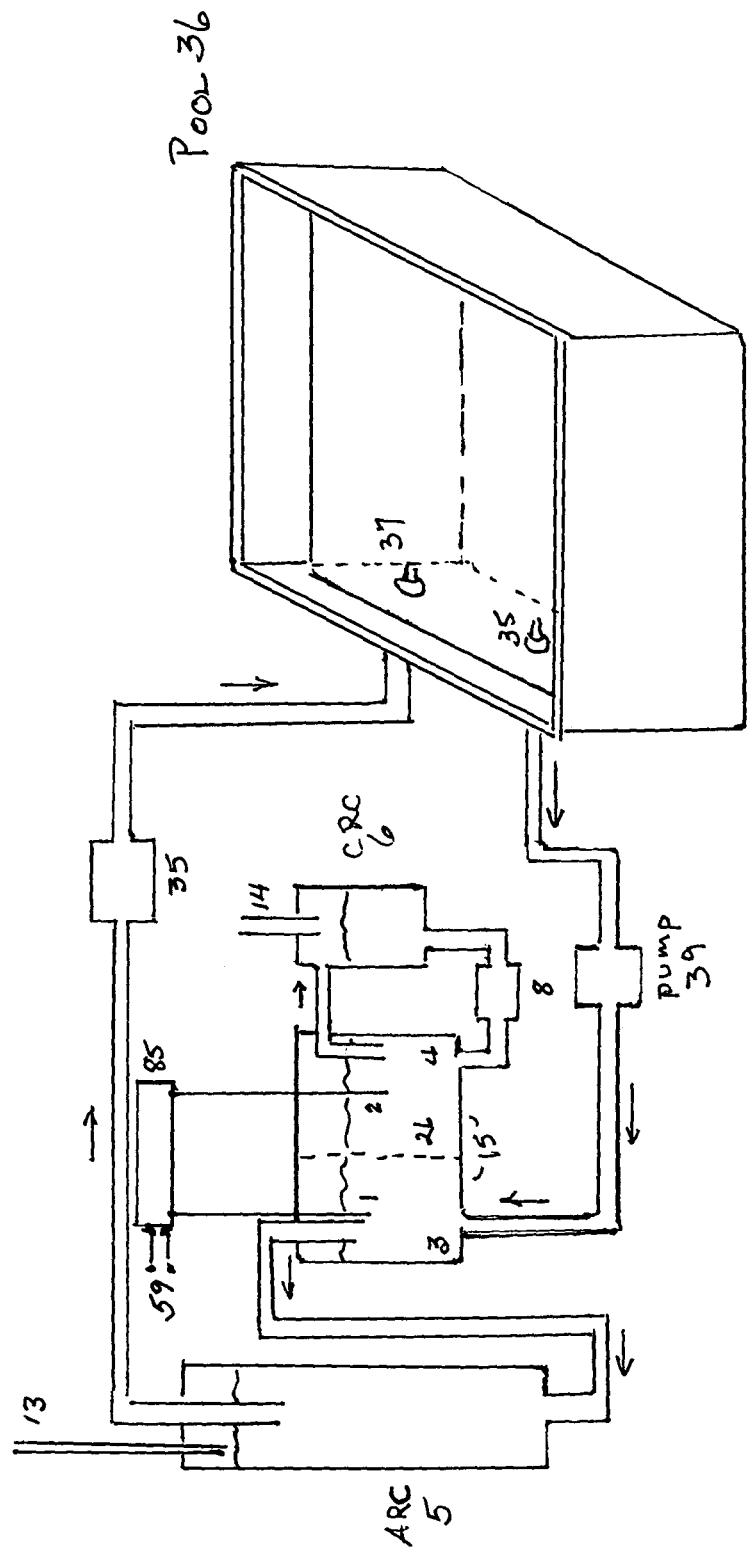
FIG. 7a, Spa and Pool Sanitizer. This is a schematic representation of the use of SCIMIST Function (4) as a sanitizing system for the spa or pool water.

In one preferred embodiment [11a], Spa and Pool Sanitizer System the SCIMIST Function 4 is used to sanitize the spa and pool water in a continuously operating system. FIG. 7*a* is a schematic that illustrates this application to a pool 36. A small amount (e.g., parts per million) of soluble salts selected from the SCIMIST compounds list are added to the Spa/Pool water. The choice of ions to be used by the SEO process in the SCIMIST Function (4) may be selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The water in the spa or pool is circulated through the electrochemical cell 15. As the SCIMIST compounds in the water are circulated by return pump 35 and sampling pump 39 through the electrochemical cell 15 in this embodiment they are converted to oxidizing ions. The controller 59 operated the embodiment shown in FIG. 7*a* and is coupled to the power supply 85 which provides the electrical potential to the electrodes 1 and 2. The pool water travels through the ARC 5 and returns to the pool by way of inlet nozzle 37 and returns through output nozzle 38. These oxidizing ions sanitize the Spa/Pool water by decomposing the biological materials in the water using the SEO process. Living organisms are destroyed by both the SEO process and directly by the electrochemical cell 15. The process is similar to the ionizing system that uses copper and silver today. SEO is a more complete system in that the SEO compounds do not have to be replaced until the water is completely changed. While the silver and copper electrodes are consumed and thus need to be replaced on a regular basis. The mechanism for damaging the microorganisms involves binding of the copper and silver to these organisms. In the case of the SEO compounds, the mechanism is the oxidation of the organisms. The oxidized ions react with the biological materials in the water and are reduced to the original SCIMIST compounds. The reduced form of the SCIMIST compounds is returned to the SCIMIST Function (4) where they are again oxidized repeating the SEO process. The oxidation process leaves the SCIMIST compounds in solution to return to the SCIMIST Function (4) where they are oxidized again to react with additional microorganisms and materials in the Spa/Pool water. The rate of decomposition may be affected by using the electrochemical cell 15 in a tandem configuration using more than one electrochemical cell or in a parallel configuration involving two or more cells. These configurations allow the controller the option of operating each electrochemical cell 15 in differing modes and on varying operation schedules. In the case where the SER process is used a CRC 6 would replace the ARC 5 and the pool water would be circulated through the cathode side 2 and back to the pool.

Figure 7B:
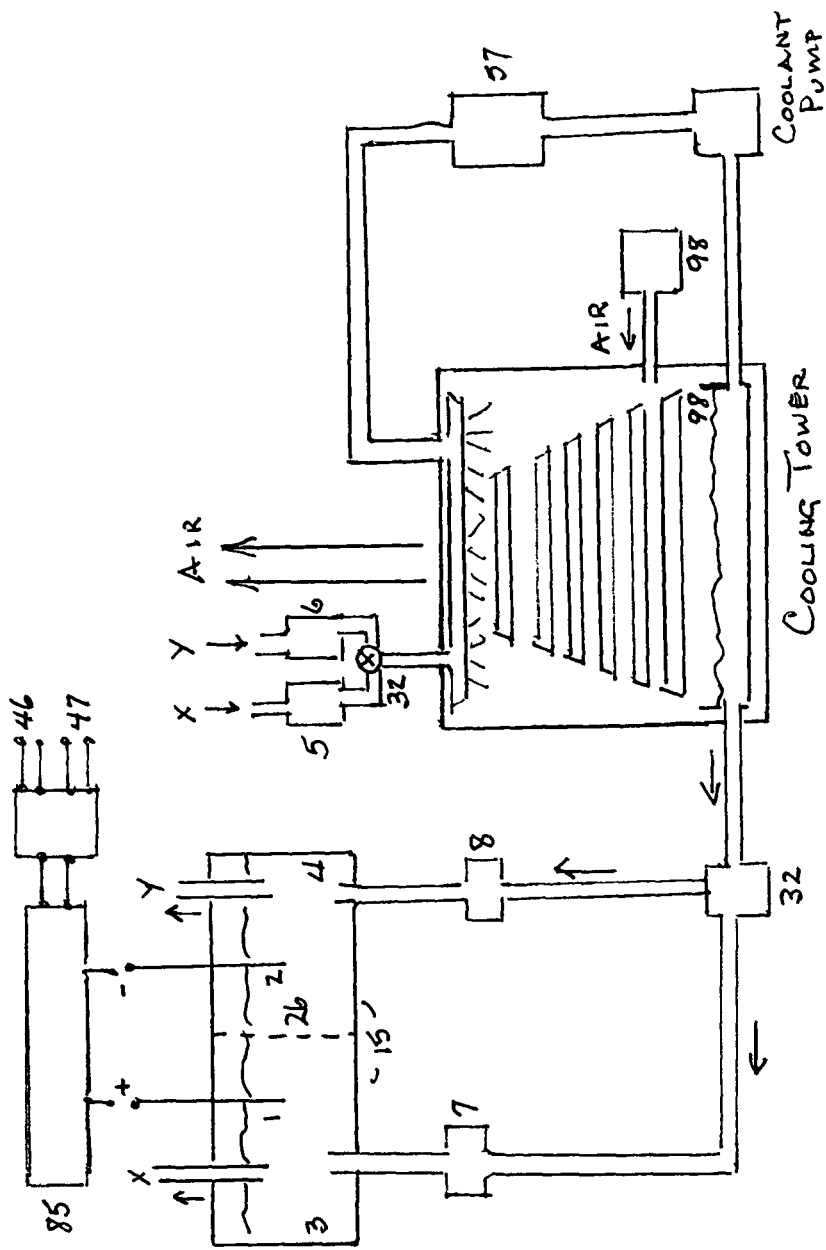
FIG. 7b, Biocide and Algae Generator. This is a schematic representation of the use of SCIMIST Function (4) to destroy algae and microbes in applications as such as a cooling tower. When the SER process is used the circulation system similar to the anolyte system in FIG. 7b is connected to the CRC 6 and the catholyte is circulated similar to the way the anolyte is circulated in FIG. 7b.

In one embodiment [11b], Cooling Tower the SCIMIST Function (3) is used as a biocide and algaecide generator to keep microbiology organisms from growing and flourishing in the cooling waters. FIG. 7*b* (Biocide and Algaecide Generator) is a schematic representation of the application of SCIMIST Function (4) to a cooling tower for purposes of generating biocides and algaecides. The coolant water is circulated through the cooling tower by the coolant pump while ambient air is blown through the cooling tower by the ambient air fan 97. The coolant fluid is processed through the heat exchanger 57 to remove most of the heat absorbed by the coolant fluid. A small amount (e.g., parts per thousand) of soluble salts selected from the SCIMIST compounds list are added to the coolant water. A stream of the coolant water from the coolant basin 98 is circulated through the electrochemical cell 15 by the anolyte pump 7 or catholyte pump 8 depending on which of the SEO or SER processes is being used. The anolyte 3 from the SEO process exits the electrochemical cell 15 at point X and enters ARC 5 where it reenters the coolant water. When the SER process is used the flow of catholyte is from Y out of the electrochemical cell 15 to the CRC 6 and returns to the coolant water. The SEO and SER processes will first kill the microbiological organisms and then decompose them into ECO-Products such as carbon dioxide, water, hydrogen, oxygen and trace inorganic salts. The choice of the SCIMIST compound ions to be used are selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups. This embodiment is managed by using a controller 59 interfaced to the power supply 85. The cooling water is circulated through the electrochemical cell 15 on a continuous basis.

Figure 8:
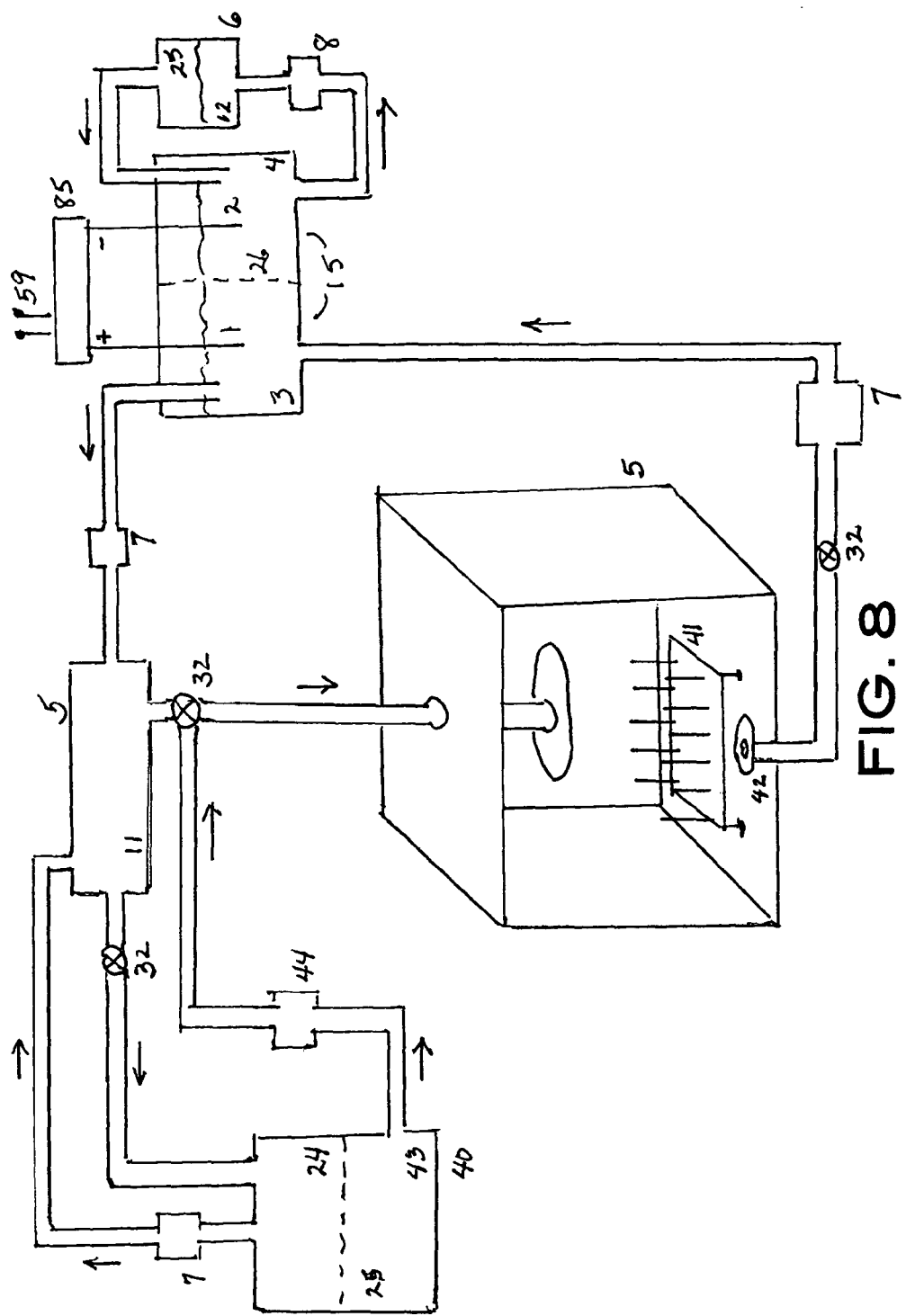
FIG. 8, Washer (waterless). This is a schematic representation of the invention operating as washing machine to clean lab ware, dishes, glassware, instruments, etc.

In one preferred embodiment [12a], Washer System (Waterless) the SCIMIST Function (4) is used to wash soiled utensils and equipment using the either the SEO or SER process, which destroy the biological and organic materials that are on the soiled items. FIG. 8 is a schematic representation of this embodiment. The electrochemical cell 15 produces strong oxidizers/reducers from the ions introduced into the anolyte 3 or catholyte 4, which are used to sterilize materials and equipment. The choice of ions to be used by the SEO or SER process in the SCIMIST Function (4) may be selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The anolyte 3 and catholyte 4 uses electrolytes selected from the following; acids, alkalines, neutral salts, acid plus neutral salts, and alkaline plus neutral salt. This embodiment includes a washing compartment(s) 45 for the cleaning of numerous items ranging from industrial applications to residential. The SCIMIST Function (4) produces processed anolyte 3 and catholyte 4 that is used by this embodiment to wash these numerous items. The anolyte is circulated from the electrochemical cell 15 through pump 7 to an anolyte compartment 11. The anolyte 3 is circulated through the spray head 17 to wash the contents of the cleaning compartment 45. The items to be cleaned are placed in the equipment rack 41. After the cleaning is complete the spent anolyte 24 is sent to the water recovery system 40. The water recovery system 40 recovers potable water 43 using any of the following techniques to remove the water from the catholyte 4; a) reverse osmosis, b) vacuum evaporation, and c) osmotic cells. The recovered water is used to rinse the cleaned items to remove any remaining anolyte 3. The rinse water is returned to the anolyte 3 by the water pump 44 through valve 32 into the cleaning compartment 45 for continued use. The controller 59 controls the operation of this embodiment shown in FIG. 8. The system previously described depicts the use of the SEO process in the washer. The SER process may also be used to clean the items placed in the cleaning compartment 45. In that case the catholyte is circulated by pump 8 through the cleaning compartment 45. A catholyte compartment 12 replaces the anolyte compartment 11 and the catholyte is either used for cleaning through the spray head 17 or is processed in a water recovery system similar to the water recovery system 40 to extract the water from the spent catholyte 25 and use it to rinse the items in the cleaning compartment 45.

The items include industrial applications such as parts, cages, racks, glassware, degreasing, metal cleaning, etc. This embodiment can be operated without being connected to a water supply and saves gallons of water each operations cycle. In one preferred embodiment [12b], Washer is used to clean soiled items similar to embodiment [12a] however it uses an external water supply. In this embodiment the water recovery 40 system is replaced with an external water hookup. The rinse water in this embodiment does not mix with the anolyte 3 or catholyte 4 but rather is drained during the rinsing cycle.

In one preferred embodiment [13a], Lab Equipment Sterilization System the SCIMIST Function (4) produces strong oxidizers in the anolyte 3, which are used to destroy the contaminants on laboratory equipment. These contaminants may include pathogens that may be destroyed by either the SEO and SER processes. This embodiment's apparatus is similar to embodiment [12a]. The SCIMIST Function (4) generates the strong oxidizers/reducers in the anolyte 3 and catholyte 4 using the SEO and SER processes. The ion used to be converted to strong oxidizers/reducers are selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The anolyte 3 carrying the strong oxidizers is circulated thru the electrochemical cell 15 and over the equipment to be sterilized. The strong oxidizers used in the SEO process attack the contaminating materials on the equipment and decompose them into carbon dioxide, water, oxygen, hydrogen, and trace inorganic salts. The oxidized ions react with the biological materials in the water and are reduced to the original SCIMIST compounds. The reduced form of the SCIMIST compounds is returned to the SCIMIST Function (4) where they are again oxidized repeating the SEO process. The first step in the process is the destruction of the pathogens on the equipment to render them sterile. The second step in the process is to decompose the residual materials and pathogens into ECO-Products. This embodiment is used to sterilize medical instruments at room temperature and ambient atmospheric pressure, which is safer and more effective than an autoclave. In one preferred embodiment [13b] the water recovery 40 system is placed on the catholyte 4 side of the electrochemical cell 15. This placement is used to further isolate the pathogens in the electrolyte being used to clean the soiled items. The electrolytes being used in this configuration are adjusted to crate an osmotic pressure across the membrane 26. The result of the osmotic pressure is to drive the water from the soiled side to the unsoiled electrolyte where it is removed by the water recovery 40 system. This implementation makes the water recovery process easier to implement. In one embodiment [13c] the water recovery 40 system would be replaced by an external water supply. The external water supply would supply only rinse water and it would not be mixed with the electrolyte. The operation of this embodiment is managed by the controller 59 which receives data from the components of the embodiment through inputs 46 and outputs 47 and controls the power supply 85 which provides the electrical potential to the electrochemical cell 15 electrodes 1 and 2. The SER process may be used in place of the SEO process in this embodiment.

Figure 9:
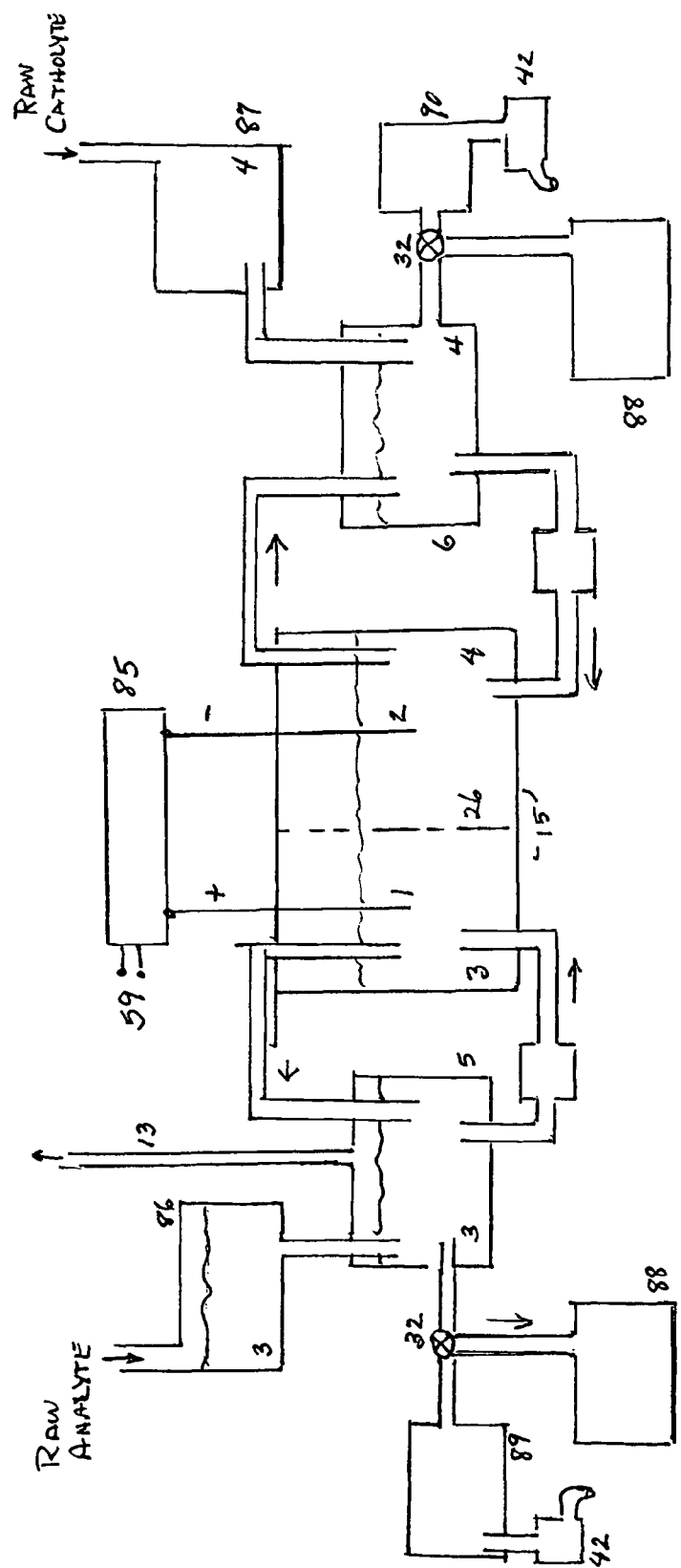
FIG. 9, On-Site Generation of Sterilizing Solution. This is a schematic representation of the use of SCIMIST Function (4) as an on-site generator of sterilizing solutions. The figure shows both the SEO and SER processes, which may operate singly or simultaneously.

In one preferred embodiment [14], On-site Generation of Sterilizing Solutions the SCIMIST Function (4) produces strong oxidizers/reducers in the anolyte 3 and catholyte 4 respectively. FIG. 9 is a schematic representation of embodiment [14]. This embodiment generates the strong oxidizers/reducers that may be stored in containers for future use or applied directly from the apparatus of this embodiment to sterilize instruments, clean surfaces, clean equipment both externally and internally, rinse glassware, and etc. The anolyte 3 is introduced into the system in the anolyte supply system 86 and the catholyte 4 is introduced into the system through the catholyte supply system 87. The controller 59 manages the embodiment shown in FIG. 9 through inputs 46 and outputs 47. The electrochemical cell 15 produces a sterilizing solution that contains strong oxidizers/reducers generated from the ions in the anolyte 3 or catholyte 4, which are used to sterilize contaminating materials. The power supply 85 provides the electrical potential to the electrodes 1 and 2 in the electrochemical cell 15. The strong oxidizer/reducer may be stored in the anolyte storage system 89 and the strong reducers may be stored in the catholyte storage system 90. The strong oxidizers may be extracted from the system through drains 42 or through the sterilizer application system 88 which would be interfaced to an application. The choice of ions to be used by the SEO or SER processes in the SCIMIST Function (4) may be selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The anolyte 3 and catholyte 4 uses electrolytes selected from the following; acids, alkalines, neutral salts, acid plus neutral salts, and alkaline plus neutral salt. The invention in this embodiment enhances the effectiveness of the sterilizer generated by applying ultrasonic energy 21 and ultraviolet energy 22 to the anolyte 3 or catholyte 4 during the operation of this embodiment. Various mixtures (referred to as a cocktail) selected from the foregoing list provide the ability to enhance the effectiveness of the strong oxidizer/reducer solution and to tailor the sterilizing solution depending on its application. The cocktail may contain two or more different ions and types of ions in differing concentration which provides for the tailoring of the sterilizing solution depending on application and type of materials being cleaned. The power supply 58 controls the DC voltage so that the cocktail of ions may be selectively generated into a cocktail of strong oxidizers/reducers. When super oxidizers are used in this embodiment the sterilizing solution may also contain free radicals resulting from the secondary oxidation/reduction and/or from the application of ultraviolet energy 22 to the sterilizing solution.

SCIMIST Function (5) Producing Chemical Intermediates

In one preferred embodiment [15a], Chemical Intermediate this embodiment is used to capture chemical intermediate compounds produced in the SCIMIST Function (5). The components of this embodiment are similar to embodiment [1] shown in FIG. 1. The implementation of this embodiment is to control the decomposition process so as to manage what compounds are generated. In this embodiment, the SEO process is managed so as to produce chemical compounds henceforth referred to as chemical intermediates, from the feed materials by controlling the oxidizing of the feed materials. The controller 59 manages the application of the electrical potential being applied through the power supply 85 to the electrochemical cell 15. As the chemical compounds are generated from the feed materials numerous techniques are applied to remove the chemical intermediate compounds from the anolyte 3. In addition, this embodiment may vary the magnitude and frequency of the electrical potential applied through the power supply 85 to the electrochemical cell 15 in the SCIMIST Function (5) to selectively decompose the unwanted or used materials processed in the SCIMIST Function (5). The SCIMIST Function (5) generates the strong oxidizers in the anolyte 3 using the SEO process. The ions used to be converted to strong oxidizers are selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

In this embodiment the SEO process may use multiple SCIMIST compounds to exploit their differences in reacting with the feed materials in the SEO process. Each SCIMIST compound may react with the feed materials in a different order of decomposing the feed materials. This embodiment starts with the input raw materials and begins to decompose them. They are decomposed in a controlled manner to create the chemical intermediates. The controller 59 is used to manage the chemical intermediate process. The chemical intermediate process varies from the choice of feed materials and the SCIMIST compounds chosen to execute the process. Typical of this process is the removal of the chlorine atoms from a polychlorinated biphenyl (PCB) leaving biphenyls.

In one preferred embodiment [15b], Chemical Intermediate this embodiment is used to capture chemical intermediate compounds produced in the SCIMIST Function (5) using the SER process in place of the SEO process. The flow of catholyte 4 is modified so as to provide for the use of numerous techniques to remove the chemical intermediate compounds from the catholyte 4. In this embodiment the controller 59 would modify the electrical controls on the power supply 85 which provides the electrical potential to the electrodes 1 and 2 in the electrochemical cell 15 in the SCIMIST Function (5) to selectively decompose the unwanted or used materials processed in the SCIMIST Function (5). The SCIMIST Function (5) generates the strong reducers in the catholyte 4 using the SER process. The ions used to be converted to strong reducers are selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

In this embodiment the SER process may use multiple SCIMIST compounds to exploit their differences in reacting with the feed materials in the SER process. Each SCIMIST compound may react with the feed materials in a different order of decomposing the feed materials. This embodiment starts with the input raw materials and begins to decompose them. They are decomposed in a controlled manner to create the chemical intermediates. Typical of this process is the removal of the chlorine atoms by hydrodechlorination by using elemental iron suspended in the catholyte 4 in nanoparticle sizes.

SCIMIST Function (6) Inorganic and Organic Fuel Generation

The feed materials may be decomposed by the SCIMIST technology processes and will yield hydrogen, which may be put to use as a fuel. Typical categories of feed materials used as fuel sources (but not limited to) are animal waste, food waste, organic waste (such as solvents, etc.) medical waste, landfill runoff, industrial waste, etc. The embodiments [16 through 18] may achieve nearly a carbon neutral condition where there is no emission of carbon from the SCIMIST process in these embodiments. Furthermore, these embodiments may achieve a net-zero energy usage since all the energy used in the process is recovered in the generation of a hydrocarbon fuel.

Figure 10:
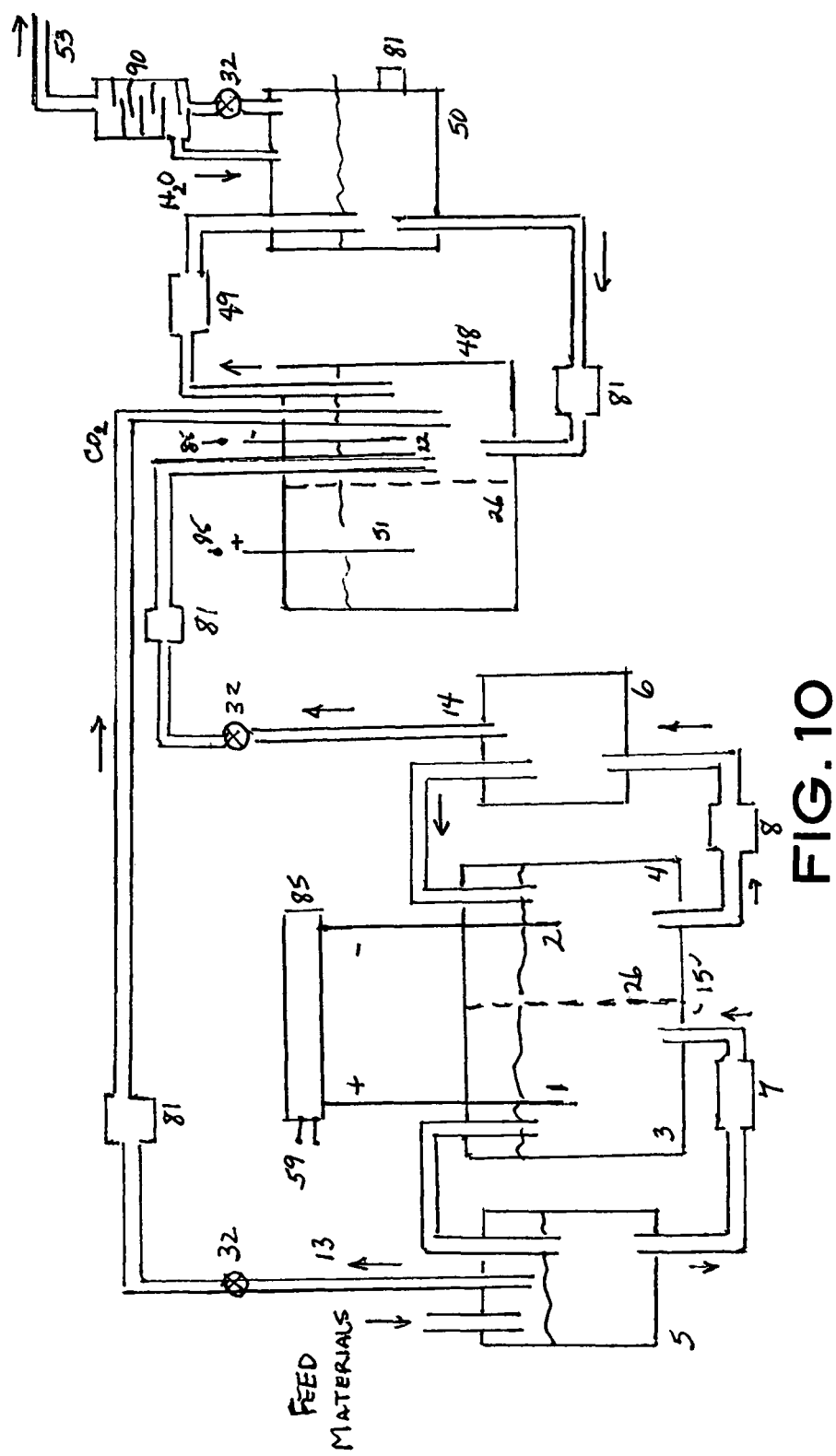
FIG. 10, Methane/Methanol Generator. This is a schematic representation of the invention operating to convert biological and organic materials into a combustible hydrocarbon fuel.

In these preferred embodiments [16 & 17], Methane Generator and Methanol Generator SCIMIST Function (6) is used to produce methane or methanol from biological or organic feed materials using the SEO and SER processes. FIG. 10 Methane/Methanol Generator is a schematic representation of an apparatus that either generated Methane or Methanol. The power supply 85 applies the electrical potential to the electrodes 1 and 2 to operate the SEO or SER process. The controller 59 controls the embodiment shown in FIG. 10. The ions used in the SEO process or SER process are selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The anolyte 3 and catholyte 4 uses electrolytes selected from the following; acids, alkalines, neutral salts, acid plus neutral salts, and alkaline plus neutral salt. These embodiments [16 and 17] are operated using a two-step methodology to yield hydrocarbon fuels from biological and organic waste. The hydrocarbon fuel is essentially a free product since the expense of processing the waste has been avoided or eliminated.

In these preferred embodiments [16 & 17], the first step involves using the SEO process to convert biological and organic waste materials into carbon dioxide and oxygen gas evolving from the anolyte system. Concurrently, these embodiments produce hydrogen gas evolving from the catholyte system. This embodiment operates at low temperatures and ambient atmospheric pressure. The two off gas systems (anolyte 13 and catholyte 14) supply these gases controlling the temperature 81, pressure 82, and flow rate 32 to the second step in the process where methane or methanol may be generated.

In this embodiment [16] Methane Generator, the second step involves the use of fuel cell(s) 48 coupled to the SCIMIST Function (6) apparatus shown in FIG. 10. The fuel cell 48 is operated in a manner where the conventional inputs and outputs are reversed. In this case the fuel cell 48, which would in its normal operation produce electricity from inputting hydrogen and oxygen, now produces combustible hydrocarbon fuel. In this embodiment [16] electricity is applied to the electrodes (anode 51 and cathode 52) by power supply 85 rather than extracting it from the fuel cell 48. The controller 59 manages the embodiment shown in FIG. 10 by using inputs 46 and outputs 47 from components throughout the embodiment as well as controlling the power supply 85. The fuel cell 48 is supplied carbon dioxide and hydrogen from the SCIMIST Function (6) SEO process via the off gas systems 13 and 14. These off gas systems 13 and 14 control the temperature 81, pressure 82, and flow rate 32. The carbon dioxide and hydrogen will react and form a hydrocarbon fuel such as methane. The SCIMIST Function (6) SEO process and apparatus (see FIG. 9) produces clean carbon dioxide off the anode 1 and hydrogen off the cathode 2. The catholyte 4 from the fuel cell 48 is pumped by pump 49 to the hydrocarbon fuel processor 50. The methane is removed from hydrocarbon fuel processor 50 through valve 32. Methane is a gas at the temperature ranges 0 to 100° C. The condenser 92 dries the off gas from the hydrocarbon fuel processor and the condensed water is returned to the hydrocarbon fuel processor. The methane is either stored or used directly through pipe to the combustion fuel appliance 53.

In one preferred embodiment [17] Methanol Generator, the second step involves the use of a DMFC, direct methanol fuel cell, being operated in the reverse mode from its normal use. FIG. 10 Methanol Generator is a schematic representation of this embodiment [17]. When FIG. 9 represents the Methanol Generation process, the fuel cell 48 used is a DMFC. When the DMFC is operating in its normal mode the reactions are shown for the anode and cathode. Operating in that mode the DMFC generates a current by the electrons and protons in the half reactions. When the inputs to the anode cell, methanol and water, and to the cathode cell, oxygen, a current is generated. When the inputs to the two cells are reversed, e.g., the carbon dioxide in introduced into the cathode cell in the form of carbon dioxide and hydrogen is also introduced, the DMFC is considered to be being operated in the reverse mode. The 'Overall reaction' equation 1 normally operates from left to right in the chemical equation. The reverse mode of operation would be from right to left since the methanol would be being oxidized. In addition, an electrical potential is applied across the electrodes thus providing the electrons to complete the reaction.

Overall reaction:

$$CH_3OH+(3/2)O_2 \rightarrow CO_2+2H_2O \quad \text{(Equation 1)}$$

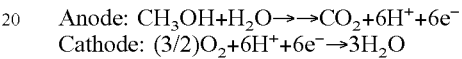

Anode: $CH_3OH+H_2O \rightarrow \rightarrow CO_2+6H^++6e^-$

Cathode: $(3/2)O_2+6H^++6e^- \rightarrow 3H_2O$

The SCIMIST Function (6) using the SEO process and apparatus provides the carbon dioxide, hydrogen and oxygen to input to the DMFC 48 as described in step one above. The output of the DMFC 48 will be a hydrocarbon fuel (methanol) resulting from the combination of the carbon dioxide and the hydrogen gases (see equation 1) in the DMFC 48. The catholyte 4 from the fuel cell 48 is pumped by pump 49 to the hydrocarbon fuel processor 50. The methanol is removed from hydrocarbon fuel processor 50 through valve 32. The methanol is either stored or used directly to the combustion fuel appliance 53. The controller 59 manages the processes in this embodiment including the power supply 85, which provides the electrical potential to the electrodes in the electrochemical cell 15.

Embodiment [17a] is a variation of embodiment [17] that produces ethanol ($C_2H_5OH$) rather than methanol ($CH_3OH$) in a process similar to the one shown in FIG. 10. This embodiment would use hydrocarbons such as agricultural waste (for example, corncobs), switch grass, or wood chips to start the process in the anolyte reaction chamber 5. The components of the process are the same as shown in FIG. 10 with the exception of using a fuel cell 48. The fuel cell 48 would be replaced with a fermentation processor 106. The carbon dioxide, carbon monoxide, and hydrogen gas are feed into fermentation processor 106 which containing microorganisms such as *clostridium ljungdahil*. The microorganisms convert the input gases into ethanol. The hydrocarbon processor 50 then removes the ethanol. The advantage of this cellulosic ethanol process is the use of a low temperature SCIMIST function to produce the ECO-gases inputs to the fermentation process.

Figure 11:
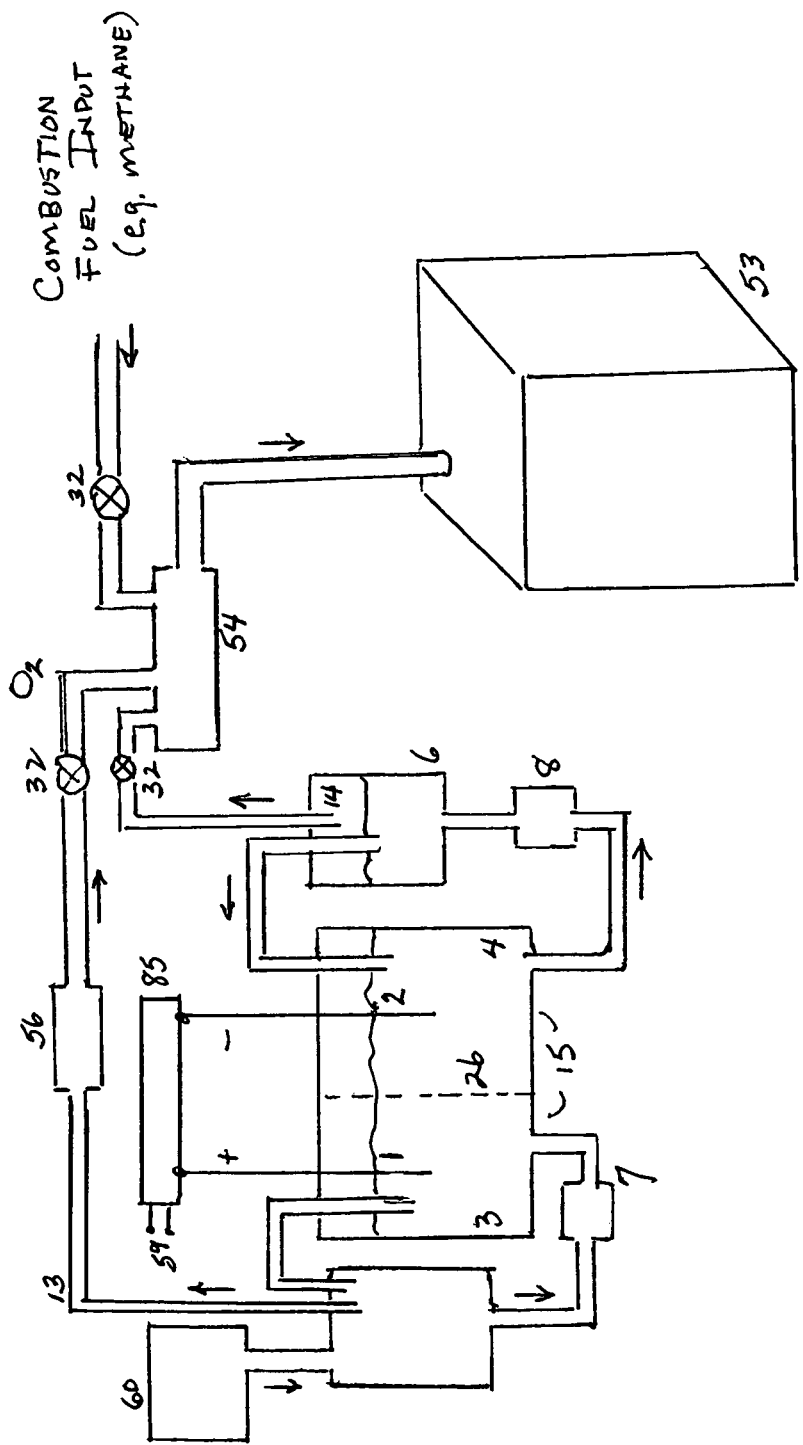
FIG. 11, Hydrogen/Oxygen Combustion Fuel. This is a schematic representation of the invention operating to produce hydrogen gas to be used as a partial or complete substitute for typical combustion gases.

In these preferred embodiments [18 & 19], the hydrogen and oxygen gas outputs of the SCIMIST Function (6) are used as combustion fuels. FIG. 11 Hydrogen/Oxygen Combustion Fuel is a schematic representation of the use of hydrogen as a partial or complete substitute for typical combustion gases such as methane, propane, or butane. In preferred embodiment [18] Hydrogen Combustion Substitution, the hydrogen is used in a gas-fired apparatus directly replacing the use of methane, propane, or butane gas as the fuel source. For this embodiment [18], the Combustion Fuel Input, the Fuel Gas Blender 54, and the oxygen system from FIG. 10 are not included. The typical apparatus where this embodiment would be used are such items as hot water heaters, boilers, furnaces, gas fired generators, gas-fired internal combustion engine 62, and similar apparatus. In this embodiment, the SEO or SER processes are used to decompose the feed materials. The power supply 85 supplies the electrical potential to the electrodes 1 and 2 and interfaces with the controller 59, which operates the embodiment shown in FIG. 11. The feed materials are introduced into the ARC 5 or CRC 6 through the feed materials mechanism 60. When the SER process is used the feed materials mechanism 60 is connected to the CRC 6 (not shown in FIG. 11). The ions used in the SEO process are selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The anolyte 3 and catholyte 4 use electrolytes selected from the following; acids, alkalines, neutral salts, acid plus neutral salts, and alkaline plus neutral salt.

Embodiment [19] Hydrogen/Oxygen Combustion Substitution is similar to embodiment [18] in that the hydrogen is used as a combustion fuel while it is being enriched with oxygen. The oxygen normally used in combustion apparatus comes from using atmospheric air (referred to as makeup air). In that case the oxygen is usually approximately 20% but in this use the combustion process may be enriched to improve the efficiency of the process and require less makeup air. The Fuel Gas Blender 54, and the Combustion Fuel Input as shown in FIG. 11 are not included in this embodiment.

In preferred embodiment [20] Hydrogen/Oxygen Blending with Combustion Fuels, the hydrogen and oxygen gas outputs are used to enhance other combustion fuels. The hydrogen and oxygen can be blended with other hydrocarbon fuels such as methane, propane, or butane. FIG. 11 is a schematic representation of this embodiment [20]. The blending of hydrogen in the Fuel Gas Blender 54 as shown in FIG. 11 going to the Combustion Fuel Appliance 53 increases their efficiency, reduces the carbon footprint, reduces toxic emissions, and conserves these fuels. The typical combustion fuel appliances where this embodiment would be used are such items as hot water heaters, boilers, furnaces, gas fired generators, and similar apparatus.

SCIMIST Function (7) Generation of Electrical, Thermal, and Mechanical Energy

Figure 12:
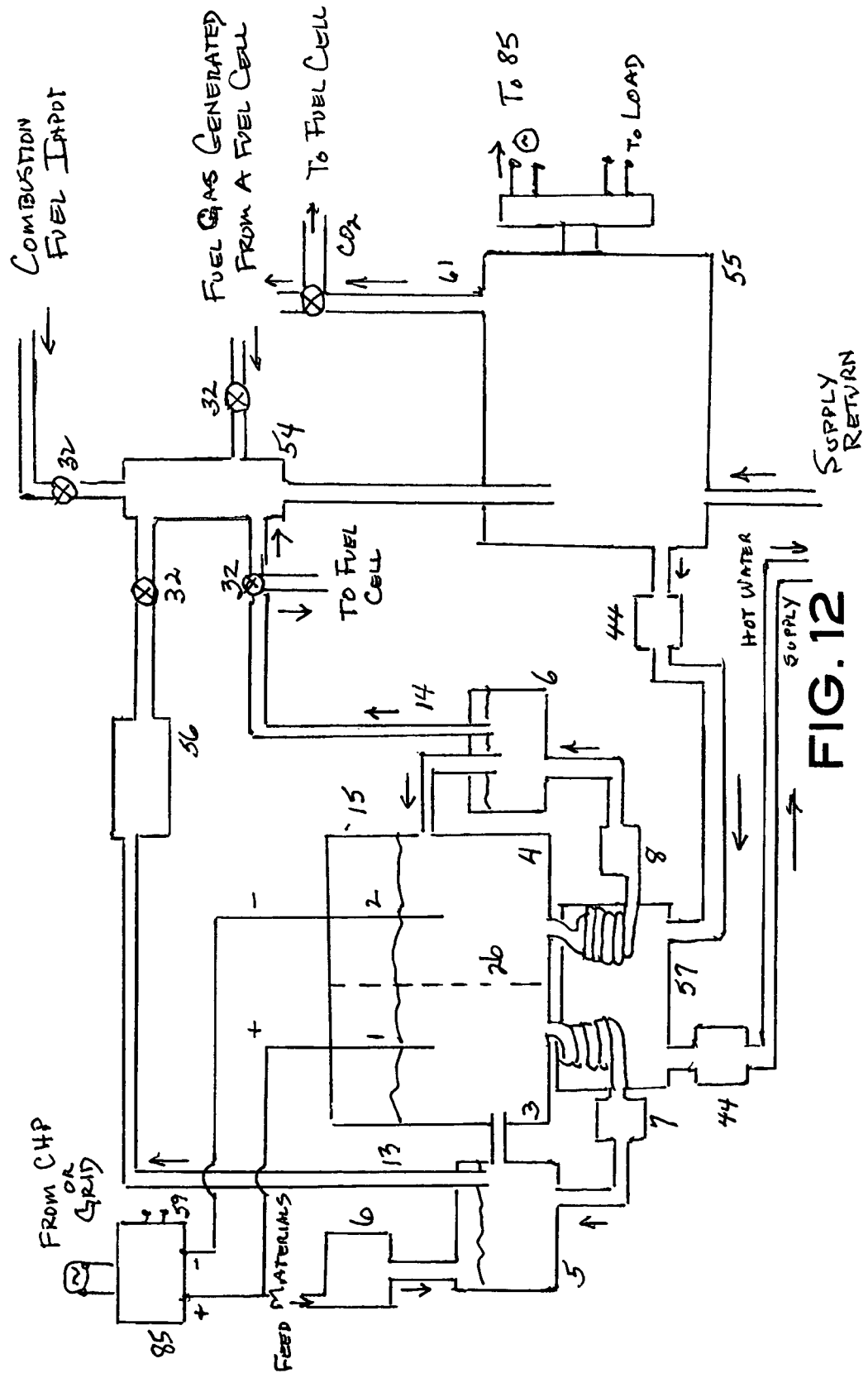
FIG. 12, CHP Powers SCIMIST Functions. This is a schematic representation of the invention using a CHP to power and interact with a SCIMIST system.

In one preferred embodiment [21] CHP Powers SCIMIST Functions, the electrical energy source to operate the direct current (DC) power supply for the SCIMIST Functions are provided by a CHP (combined heat and power) system operated off of either a methane or propane gas supply. FIG. 12 CHP Powers SCIMIST Functions is a schematic representation of the CHP powering a SCIMIST Function. The SCIMIST Function (7) may supply hydrogen from the off gas system 14 in a feedback loop to the input to the CHP 55 to be blended by the fuel gas blender 54 with the methane, propane, or butane. Oxygen may be supplied by the off gas from the ARC 5 after the carbon dioxide is removed by the carbon dioxide filter 56. The hydrogen reduces the input fuel required to operate the CHP. The resulting output of the combustion in the CHP will be a reduction in the carbon dioxide. The result of this feedback of the hydrogen is a more efficient system (composed of this embodiment and the CHP) and the input from an external electrical power supply. The power supply 85 supplies the electrical potential to the electrodes 1 and 2 and interfaces with the controller 59, which manages the embodiment shown in FIG. 12. The output hot water supply from the CHP may be routed through the SCIMIST Function heat exchanger 57 using pump 44. This loop picks up additional heat from the SCIMIST Function along with the heat from the CHP on its way to an application of the hot water supply. Using the hot water captures the energy available during the generation of the electrical power.

In one preferred embodiment [22] Generating Combustion Fuel from CHP Exhaust, the output of the combustion gas (carbon dioxide) from the CHP exhaust 61 and the SCIMIST Function (7) from the off gas system 13 will be feed into the fuel cell 48 or DMFC 48 through embodiments [16 and 17] respectively and not released into the atmosphere. FIG. 12 illustrates the foregoing handling of the CHP exhaust gas. The processes of these embodiments improve the efficiency of the total system as well as reducing or eliminating the carbon dioxide release from the hydrocarbon combustion gases, which yield a smaller carbon footprint or zero carbon emissions. The carbon dioxide in the CHP off gas is passed to a fuel cell to be used to generate combustible hydrocarbon fuels. The off gas contains water, which may be removed, and the heat contents of the water are extracted. The off gas may also contain a small amount of carbon monoxide (CO), which is passed with the carbon dioxide to the fuel cell. The CO is used in the fuel cell to generate combustible hydrocarbon fuels along with the carbon dioxide.

In one preferred embodiment [23] Methane Generation Feed CHP, the output of the reverse operation of the SCIMIST Function (7) and the fuel cell, which yields methane, will be feed back into the input of the CHP thus lowering the methane or propane required from an external source. The feed back of the combustion fuel generated in the fuel cell from the CHP exhaust combined with the carbon dioxide from the SCIMIST Function is illustrated in FIG. 12. The result is a more efficient operation of the system as well as a smaller carbon footprint or zero carbon emissions.

Figure 13:
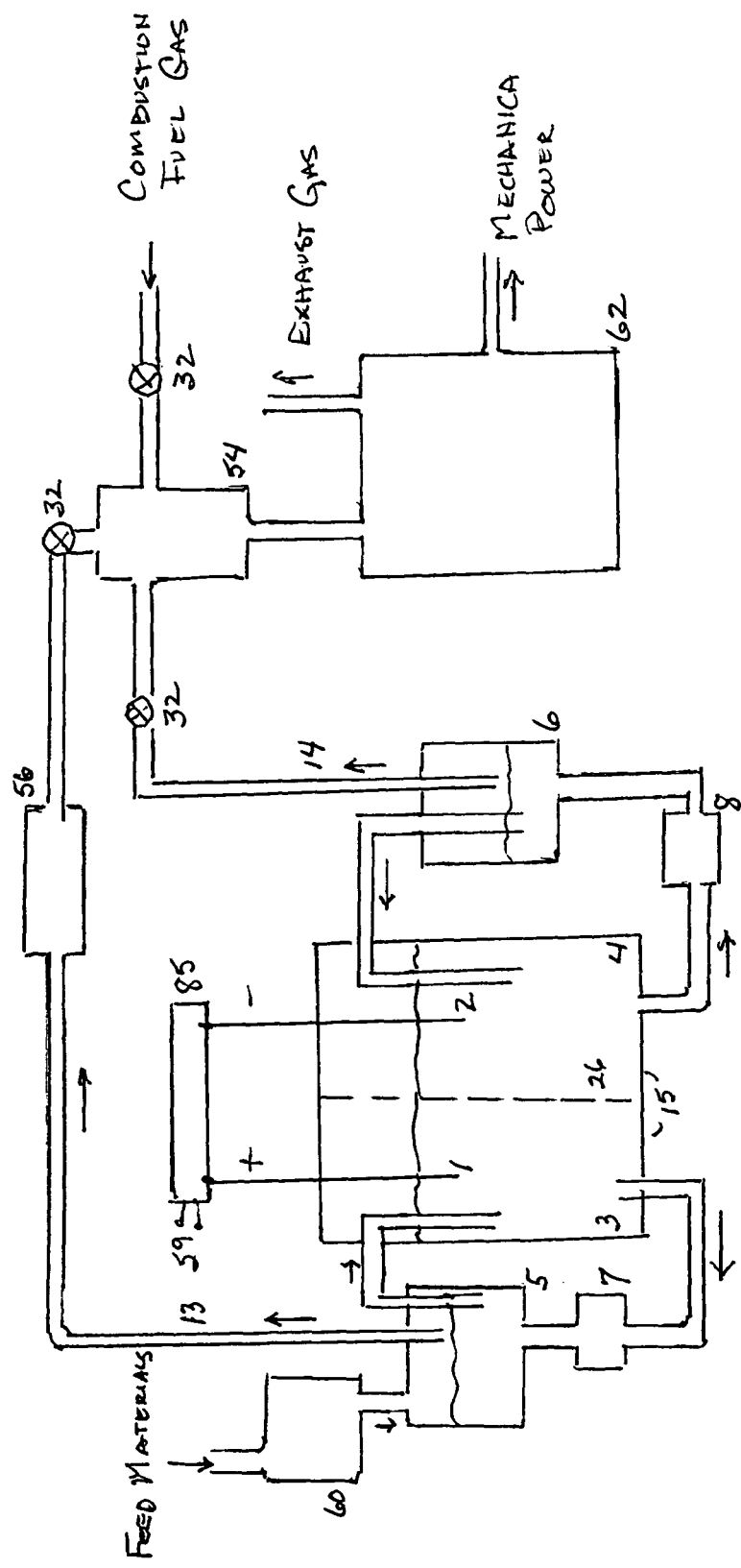
FIG. 13, Gas-fired Internal Combustion Engine. This is a schematic representation of the invention where the output gases of SCIMIST Function (7) using the SEO or SER processes will be blended with external fuel sources to feed a gas fired internal combustion engine.

In one preferred embodiment [24] Gas-fired Internal Combustion Engine, the output gases of SCIMIST Function (7) using the SEO or SER processes will be blended with external fuel sources (such as methane, propane, butane and alcohols) to feed a gas fired internal combustion engine. FIG. 13 Gas-Fired Internal Combustion Engine, is a schematic representation of this embodiment. In this embodiment, the SEO or SER processes are used to decompose the feed materials. The power supply 85 provides the electrical potential to the electrodes 1 and 2. The controller 59 operates the embodiment shown in FIG. 13. The SEO and SER processes may be used singly or in combination. The ions used in the SEO and SER processes are selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The anolyte 3 and catholyte 4 uses electrolytes selected from the following; acids, alkalines, neutral salts, acid plus neutral salts, and alkaline plus neutral salt. The output of the internal combustion engine will be used to provide mechanical power. The result is a more efficient operation of the system, conservation of the external fuel, and a smaller carbon footprint.

In one preferred embodiment [25] Production of Mechanical Power, the output gases of SCIMIST Function (7) operating in a manner similar to embodiment [24] will be used to directly supply fuel for a gas fired internal combustion engine. FIG. 13 is a schematic representation of the use of the SCIMIST Function to produce the combustion fuel to fire the internal combustion engine. In this embodiment as shown in FIG. 13 the external combustion fuel connection is not used. The output of the internal combustion engine will be used to provide mechanical power. The result is a more efficient operation of the system, conservation of the external fuel, and a nearly zero carbon footprint.

In these preferred embodiments [26 & 27], the hydrogen and oxygen gas outputs of the SCIMIST Function (7) are used as combustion fuels. In this embodiment, the SEO or SER processes are used to decompose the feed materials. The SEO and SER processes may be used singly or in combination. The ions used in the SEO and SER process are selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The anolyte 3 and catholyte 4 uses electrolytes selected from the following; acids, alkalines, neutral salts, acid plus neutral salts, and alkaline plus neutral salt. In preferred embodiment [26] Hydrogen as Combustion Fuel the hydrogen is used in a gas fired apparatus directly replacing the use of methane, propane, or butane gas as the fuel source to produce thermal energy. This embodiment is similar to the embodiment illustrated in FIG. 13 where the external fuel source is not used and the internal combustion engine is replaced with a gas-fired appliance. The typical apparatus where this embodiment would be used are such items as hot water heaters, boilers, furnaces, gas fired generators, and similar apparatus. In preferred embodiment [27] Hydrogen and Oxygen Blended with Combustion Fuels, the hydrogen and oxygen gas outputs are used to enhance other combustion fuels. The hydrogen and oxygen can be blended with other hydrocarbon fuels such as methane, propane, or butane to produce thermal energy. The blending of hydrogen with these fuels increases their efficiency, reduces the carbon footprint, reduces toxic emissions, and conserves these fuels. This embodiment is similar to the embodiment illustrated in FIG. 13 where the internal combustion engine is replaced with a gas-fired appliance. The typical apparatus where this embodiment would be used are such items as hot water heaters, boilers, furnaces, gas fired generators, and similar apparatus. Oxygen gas from the SCIMIST Function (7) may be used to enrich the makeup air for the combustion process in these embodiments.

SCIMIST Function (8) Hydrocarbon Generation by Reduction

Figure 14:
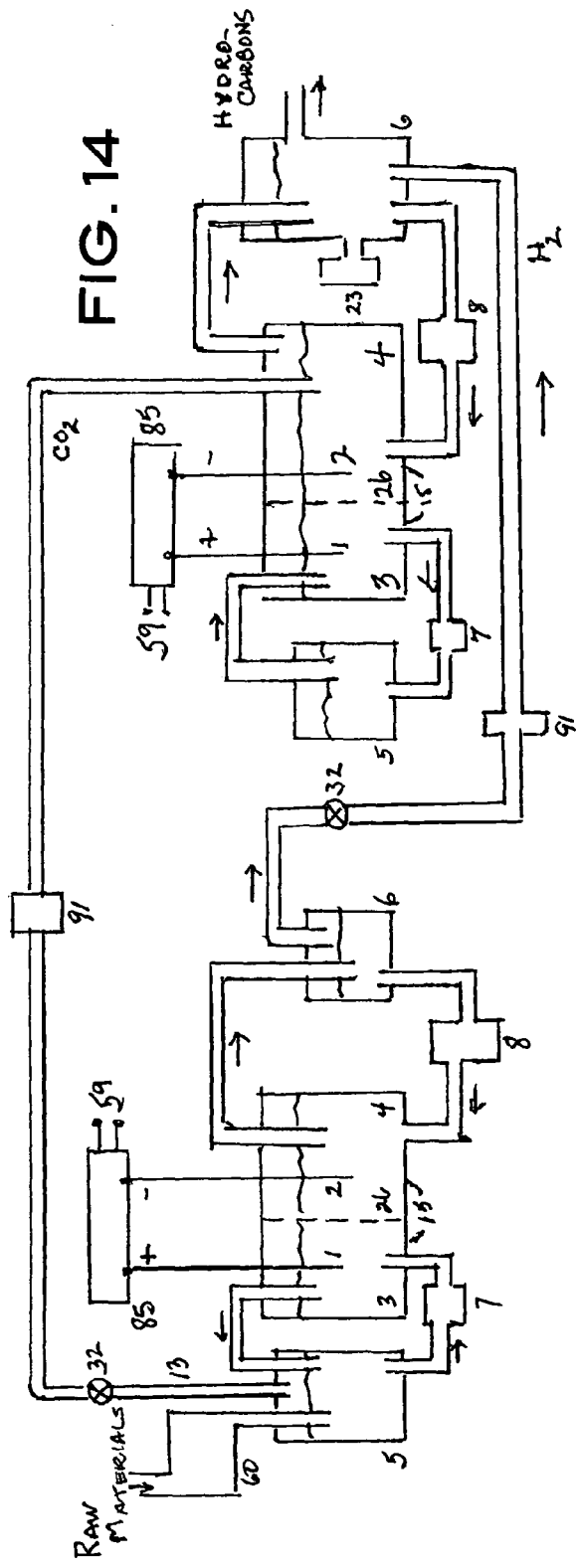
FIG. 14, Generating Hydrocarbons by Reduction Process. This is a schematic representation of the invention that is used to generate useful hydrocarbons from a hydrocarbon raw materials being used as the feed materials.

In one preferred embodiment [28] Generating Hydrocarbon by Reduction, the SCIMIST Function (8) is used to generate useful hydrocarbons from a hydrocarbon feed materials. FIG. 14 is a schematic representation of this embodiment. This preferred embodiment uses two SCIMIST Function (1) apparatus in a tandem configuration. The first apparatus is fed feed materials and is operated in a decomposition mode using the SEO process. The power supply 85 applies the electrical potential to the electrodes 1 and 2. The controller 59 manages the processes used in this embodiment shown in FIG. 14. In this embodiment, the SEO process is used to decompose the feed materials. The ions used in the SEO process are selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The anolyte 3 and catholyte 4 use electrolytes selected from the following; acids, alkalines, neutral salts, acid plus neutral salts, and alkaline plus neutral salt. This SCIMIST apparatus produces carbon dioxide from the feed materials in the anolyte system and hydrogen from the catholyte system. The carbon dioxide and the hydrogen generated in this embodiment are transferred to the second electrochemical cell 15 by gas pumps 91. This SCIMIST apparatus is referred to as operating in the forward mode where the reaction is the oxidation of the feed materials, which occurs in the anolyte system (using the SEO process). The carbon dioxide and hydrogen are used as inputs into the catholyte system of the second SCIMIST apparatus. This SCIMIST apparatus is operating in the reverse mode where the reaction is reduction of the carbon dioxide in the catholyte system using the SER process. The carbon dioxide is reduced to carbon monoxide in the catholyte system. Hydrogen is introduced into the catholyte reaction chamber (CRC) 6 where it reacts with the carbon monoxide. The reaction in the catholyte 4 yields hydrocarbon compounds such as methanol [$CH_3OH$]. The hydrocarbon compound is extracted from the catholyte solution to be used in other applications such as functioning as a combustion fuel. This process has resulted in the conversion of a feed material into a useful fuel. This embodiment captures the carbon released from the feed materials, which yields a reduced carbon footprint or nearly carbon neutral result.

Figure 15:
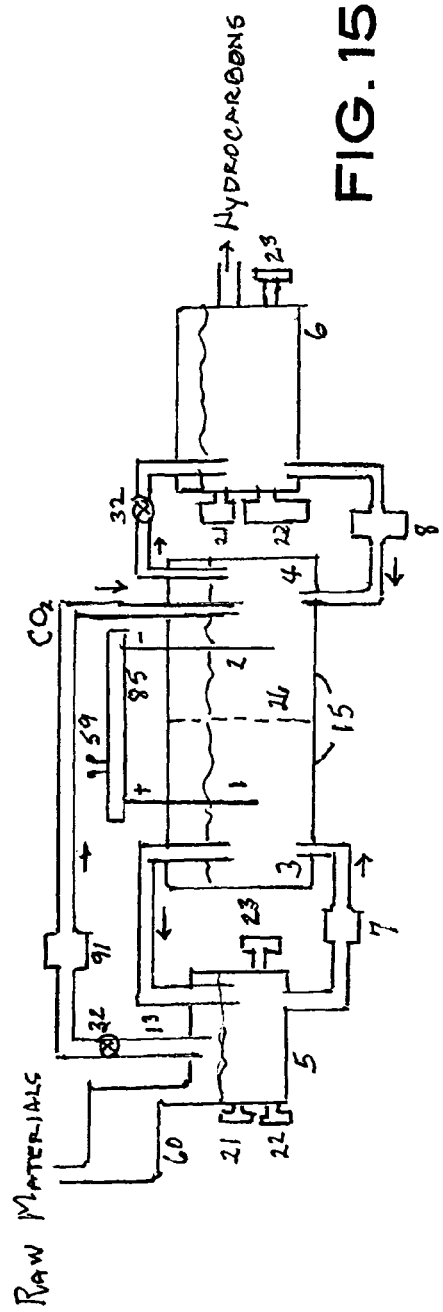
FIG. 15, Closed-Loop Generation Hydrocarbon by Reduction. This is a schematic representation of the invention operating in a closed-loop mode that is being used to generate useful hydrocarbons from the feed materials being used that contains hydrocarbons in a unuseful form.

In one preferred embodiment [29] Closed-Loop Generation of Hydrocarbon by Reduction, the SCIMIST function is used to generate hydrocarbons from a hydrocarbon being used as a feed material. FIG. 15 is a schematic representation of this embodiment. This preferred embodiment uses a modified SCIMIST Function (7) apparatus. The apparatus is fed feed materials and is operated in a decomposition mode using the SEO process. The power supply 85 supplies the electrical potential to the electrodes to operate the SEO process. The controller 59 manages the system shown in FIG. 15. In this embodiment, the SEO process is used to decompose the feed materials. The ions used in the SEO process are selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The anolyte 3 and catholyte 4 use electrolytes selected from the following; acids, alkalines, neutral salts, acid plus neutral salts, and alkaline plus neutral salt. This apparatus produces carbon dioxide from the feed materials in the anolyte system and hydrogen from the catholyte system. The carbon dioxide is used as an input through a feedback loop into the catholyte system. The reaction in the catholyte system is reduction of the carbon dioxide to carbon monoxide in the catholyte system. The catholyte solution containing carbon dioxide and carbon monoxide is pumped from the catholyte cell in the electrochemical cell 15 to the catholyte reaction chamber 6. Hydrogen is introduced into the catholyte reaction chamber 6 where it reacts with the carbon monoxide. The reaction in the catholyte reaction chamber yields hydrocarbon compounds such as methanol [$CH_3OH$]. The hydrocarbon compound is extracted from the catholyte solution to be stored for used in other applications such as functioning as a combustion fuel. This process has resulted in the conversion of a feed material into a useful fuel.

SCIMIST Function (9) ECO-Products

Figure 16:
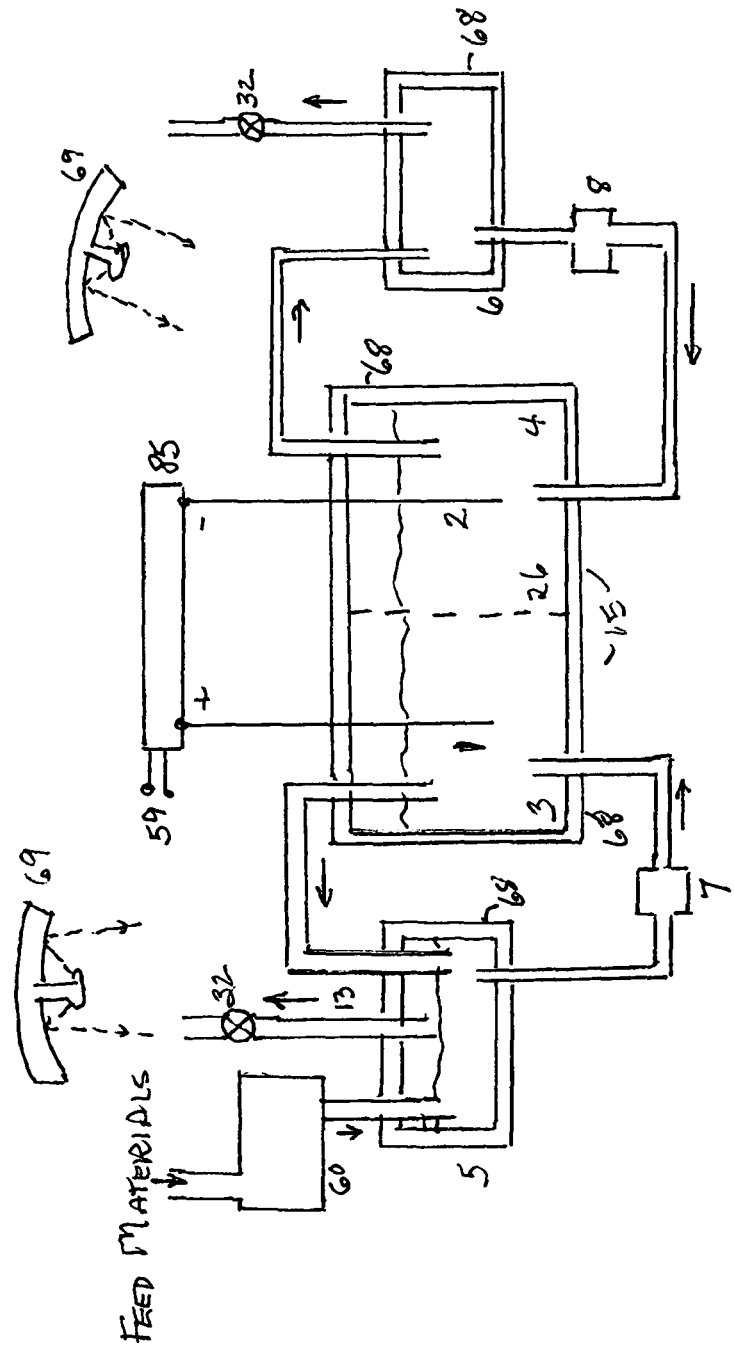
FIG. 16, Solar Enhanced ECO-Products Generation. This is a schematic representation of the invention used to promote the generation of hydrogen from the electrolysis of the water in the electrolyte solution through the illumination of the SCIMIST Function (9) with solar energy.

In one preferred embodiment [30], Solar Enhanced ECO-Products Generation System the SCIMIST Function (9) can be modified to promote the generation of hydrogen from the electrolysis of the water in the electrolyte solution through the illumination of the SCIMIST Function (9) with solar energy. FIG. 16 is a schematic representation of this embodiment. In this embodiment some of the components of the SCIMIST Function (9) would be made of transparent material 68 such as glass. The solar energy 69 is used to create solar water splitting in the anolyte fluid 3 in the SCIMIST system. The electrochemical cell 15 having a membrane 26 passes the hydrogen ions generated in the anolyte 3 through the electrochemical cell 15 to the cathode 2 where hydrogen is evolved while the anode 1 evolves oxygen. The power supply 85 controls the electrical potential to operate the electrochemical cell 15 and the controller 59 manages the operation of the embodiment shown in FIG. 16. The solar energy may also be used to create solar water splitting in the catholyte fluid 4 in the SCIMIST system to further the production of hydrogen. Research has shown that the solar water splitting can be enhanced by the presence of a catalyst. The SCIMIST Function (9) process uses ions in anolyte solution 3 as an integral part of its process. The ions used in the SEO process are selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The anolyte 3 and catholyte 4 uses electrolytes selected from the following; acids, alkalines, neutral salts, acid plus neutral salts, and alkaline plus neutral salt. The proper choice of those ions would provide the catalyst as well as a secondary oxidation process. The addition of the solar energy to the SCIMIST Function (9) improves the efficiency and cost of the generation of the ECO-Products.

Figure 17:
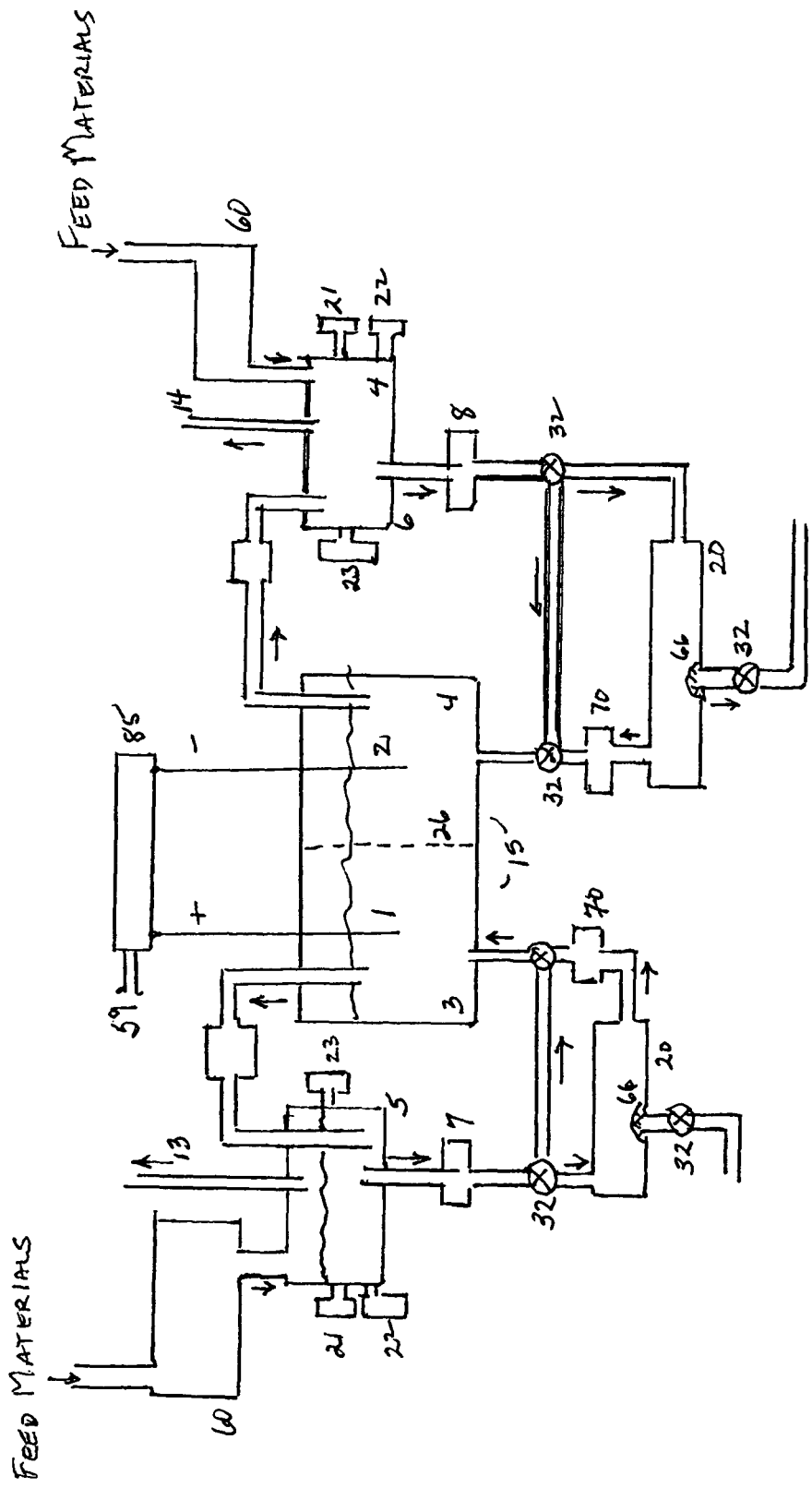
FIG. 17, Inorganic Salts Recovery. This is a schematic representation of the invention being used to produce inorganic salts from the decomposition of biological and organic materials.

In one preferred embodiment [31], Recovery of Inorganic Salts System the SCIMIST Function (9) produces inorganic salts from the decomposition of biological and organic materials using the SEO or SER process. Usually the amounts of the inorganic salts are less than 10%. FIG. 17, is a schematic representation of this embodiment. In this embodiment the purpose is to recover the inorganic salts for their potential value. The feed materials are introduced through the feed materials mechanism 60 into the ARC 5 or CRC 6. The power supply 85 provides the electrical potential to the electrodes 1 and 2 and the controller 59 manages the operation of the embodiment shown in FIG. 17. The inorganic salts enter either the anolyte 3 or the catholyte 4 solutions depending on whether the SEO or SER process is being used. The inorganic salts are removed by the inorganic removal system 20 from the electrolytes. The inorganic salt removal system 20 uses several techniques to remove the inorganic ion from the solution. Among the techniques used are electroplating, evaporation, and precipitation. The electrolytes are filtered by filter 70 after they have passed through the inorganic salt removal system 20. The SCIMIST Function (9) process uses ions in anolyte 3 or catholyte 4 solution as an integral part of it process. The ions used in the SEO or SER processes are selected from a list composed of species as described in Table I (simple redox couple mediators); Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements listed in Table II (heteroatoms) either singly or in combination thereof; or any HPA containing at least one heteroatom type (i.e., element) contained in both Table I and Table II; or combinations of species from any or all of these generic groups.

The anolyte 3 and catholyte 4 uses electrolytes selected from the following; acids, alkalines, neutral salts, acid plus neutral salts, and alkaline plus neutral salt. Typical of the inorganic salts of interest involve potassium, phosphorus, calcium, sulfur, and nitrogen. The following case illustrates the use of this embodiment. Animal manures are considered to be of marginal value as a fertilizer. The amounts of inorganic salts are small and the possible presents of pathogens are a problem. This application removes the pathogens and concentrates the inorganic salts so they become more valuable as a fertilizer.

Figure 18:
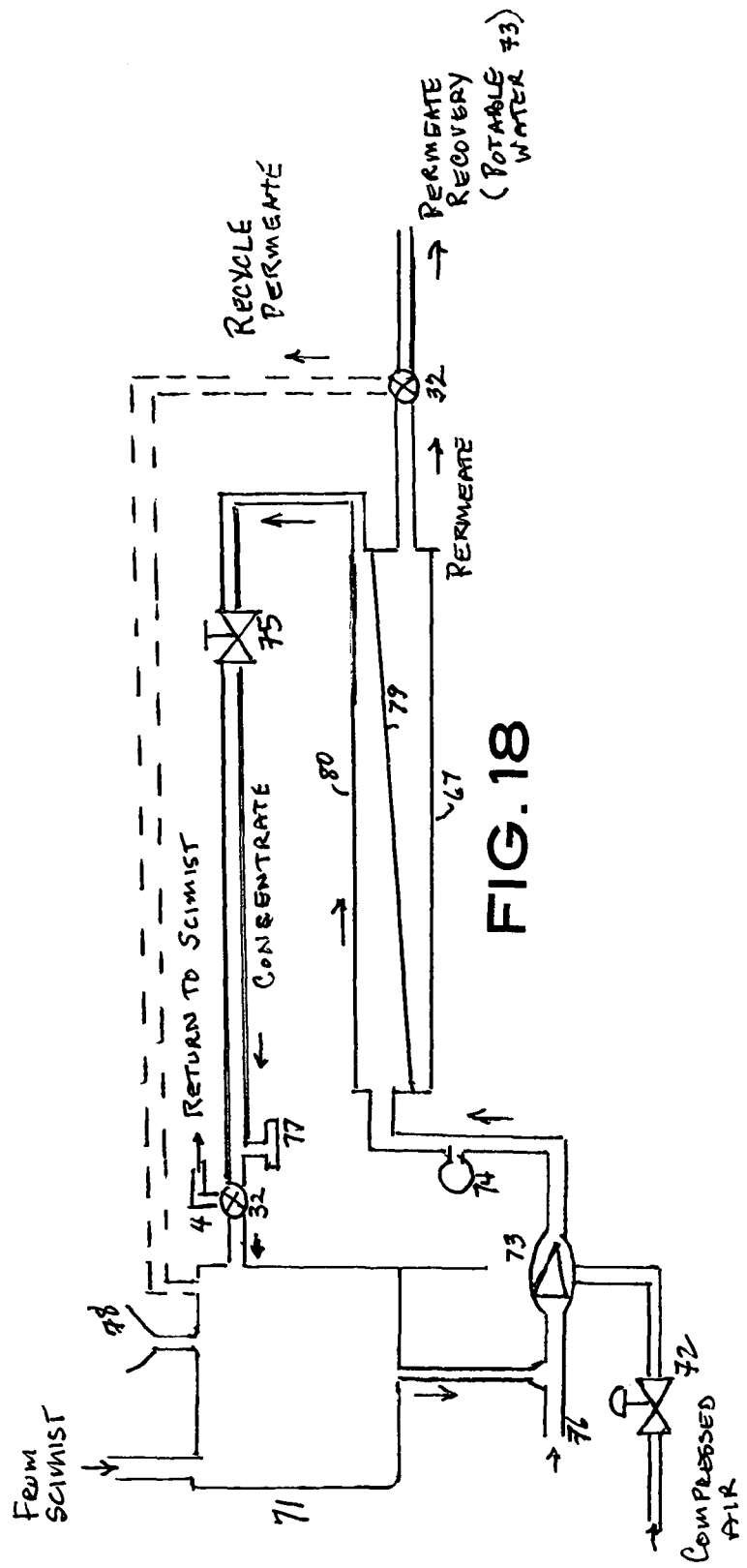
FIG. 18, Water Recovery System. This is a schematic representation of the invention being used to produce water as a product of the decomposition of feed materials.

In one preferred embodiment [32a], Water Recovery System the SCIMIST Function (9) produces water as a product of the decomposition of feed materials. FIG. 18 is a schematic representation of this embodiment. Depending on the comparative density of the anolyte 3 and catholyte 4 the water accumulates in either of the two electrolytes. By adjusting the relative densities of the electrolytes the water can be made to transport through the membrane in the electrochemical cell 15 from the anolyte 3 to the catholyte 4 when using a SEO process or in the opposite direction with a SER process. The catholyte 3 is essentially free from any of the contents of the anolyte 3 in the SEO process and the reverse in the SER process. This embodiment can use any of the following techniques to remove the water from the electrolyte; a) reverse osmosis, b) vacuum evaporation, and c) osmotic pressure. This embodiment can be used to produce potable water 43 from the process of decomposing feed materials. The use of the reverse osmosis 67 process has been developed in this invention in such a manner as to be able to extract water from a solution containing as much as 20% sulfuric acid.

This invention has advanced the reverse osmosis (RO) technology in the areas of a) recovering water from concentrated acid and alkaline solutions and b) concentrating an aqueous feed solution. The advancements achieved in the RO technology complement the SCIMIST technologies by enhancing the removal of potable water and in the removal of inorganic and organic compounds. FIG. 18 is a schematic representation of the RO unit in this invention.

The removal of potable water from either the anolyte 3 or catholyte 4 solutions is accomplished by passing these electrolyte solutions over a membrane 79 contained in a housing 80. The electrolyte is pressurized (using a pump 73) depending on the concentration of electrolyte in the solution. The electrolyte from a SCIMIST unit flows into the feed solution system 71 and can be circulated back to the SCIMIST unit by exiting through the ball valve 76. An air compressor or other source of energy powers the pump. The water that will pass through the membrane 79 is called permeate. The membrane 79 will reject more than 95% of the ions in solution in every pass over the membrane 79. The permeate may be passed over the membrane 79 repeated times to continue to remove more and more ions. The flow of the concentrate from the RO housing 80 is controlled by the needle valve 75. The permeate recovered may be processed until it meets the criteria to be considered potable water 43. In this invention, the feed solution (usually anolyte 3 or catholyte 4) was pressurized (measured by pressure gauge 74) to as high as 5000 psi. Measurements were made using electrolyte containing as high as 20% sulfuric acid resulting in the production of potable water. The feed solution system 71 has drains 77 and flushes 78 to clean the residual feed solution from the RO unit.

The RO unit was also operated in a manner to concentrate the feed solution by removing the water and increasing the concentration of ions in solution. The feed solution is passed over the membrane and about 95% of the water is removed. The feed solution is pressurized depending on the starting concentration. The initially processed feed solution is recycled and passed over the membrane 79 again. The concentration of the feed solution being processed is being measured with each cycle over the membrane 79 and the pressurization is adjusted to continue to concentrate the feed solution. To achieve specific volumetric concentration, the feed volume and the permeate volume must be measured and to determine the concentration factor. For precise concentrations a sample of the feed solution would need to be analyzed. In general use the testing of the feed solution and permeate could be measured with a hydrometer.

In one preferred embodiment [32b], Continuous Water Recovery System the SCIMIST Function (9) produces water continuously from any embodiment using any SCIMIST Function. This embodiment takes advantage of the potential transport of water through the membrane from anolyte to catholyte or vice versa. When the SEO process is being used the continuous water recovery system operates removing water from the catholyte. The constant removal of water from the catholyte keeps the concentration of ions in the catholyte at a higher level than in the anolyte resulting in an osmotic pressure from anolyte to catholyte. The controller 59 receives information from sensors 46 in the two electrolytes. The controller 59 sends commands to the continuous water recovery unit to extract water from the catholyte to maintain the osmotic pressure. When the SER process is being used in an embodiment the continuous water recovery system is operated on the anolyte to remove water. The controller 59 using information from the sensors 46 in the anolyte sends commands to operate the continuous recovery of water system to remove water from the anolyte. The continuous recovery of water maintains the osmotic pressure from catholyte to anolyte. This embodiment of the continuous water recovery system keeps the materials being processed in either the SEO or SER process from flowing through the water recovery system.

Other water recovery systems have been addressed in the Utility patent Ser. No. 10/560,576 and these systems may be substituted for the water recovery system discussed in the previous paragraphs.

Figure 19:
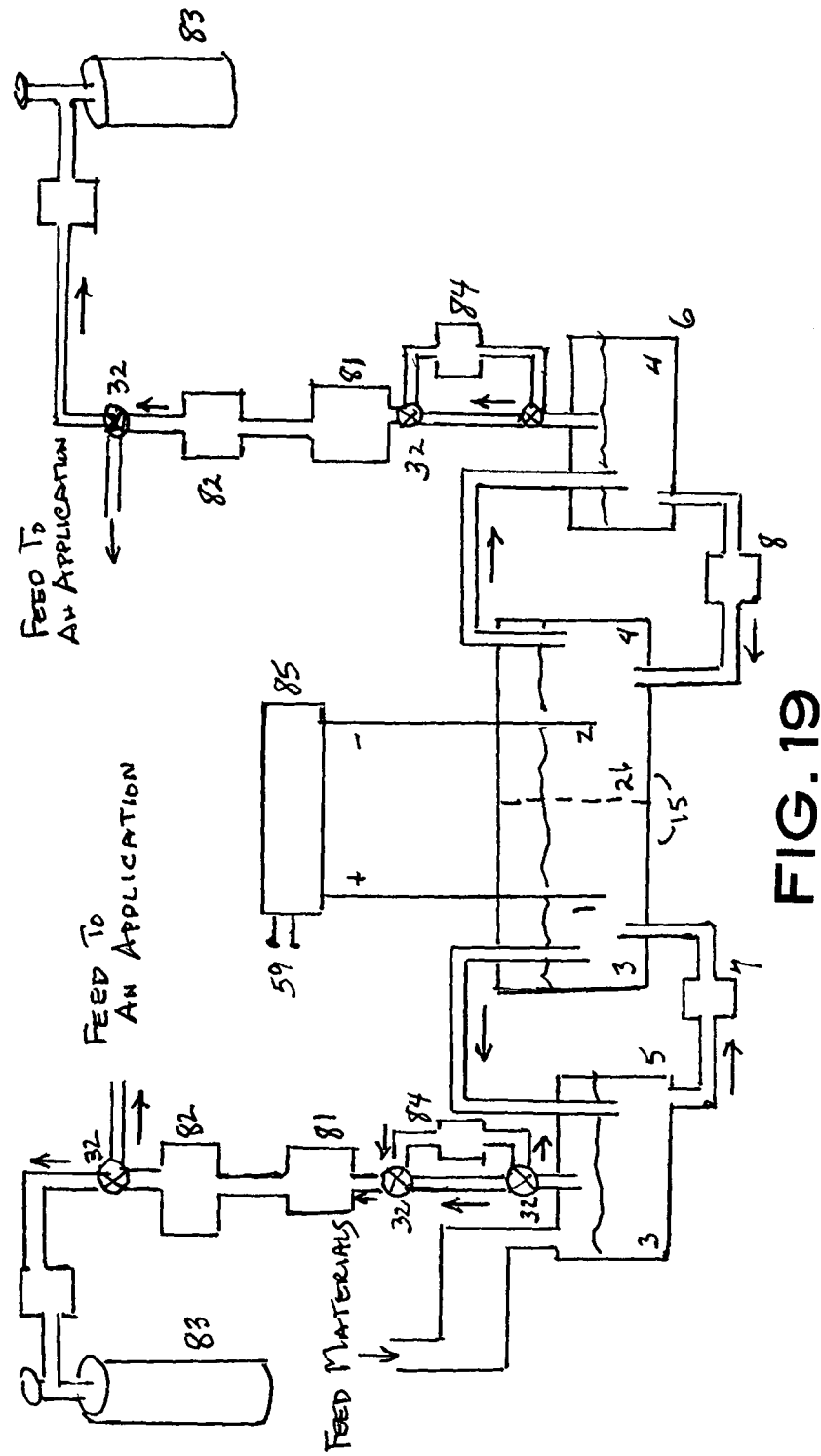
FIG. 19, Gas Storage System. This is a schematic representation of the invention being used to capture ECO-gases products evolving off various SCIMIST Functions during their operation.

In one preferred embodiment [33], ECO-Gases Storage System the SCIMIST Function (9) used with an "off gas management embodiment" can be used to capture ECO-gases products evolving off the SCIMIST Functions (9) during its operation. The power supply 85 supplies the electrical potential to the electrodes 1 and 2 and the controller 59 manages the processes involved with this embodiment shown in FIG. 19. This embodiment is depicted in a schematic representation in FIG. 19. These gases are stored by this embodiment for use in connection with other embodiment or transported for use in other applications. The SCIMIST Function (9) may be operated to produce carbon dioxide and oxygen off the anode 1 and hydrogen off the cathode 2 as previously mentioned. $NO_x$'s may be produced when specific electrolytes are used in the catholyte fluid and they can be converted to nitrogen gas for storage and other various electrolytes are used. FIG. 19 also shows that the ECO-gases may be directly fed to an application. The ECO-gases are pre-conditioned with respect to temperature control 81 and pressure by gas pressure pump 82. The ECO-Product gases may also be filtered 84 to remove moisture or selected gases such as oxygen or carbon dioxide from the anolyte off gas. Similar systems are used when the SER process is used in the catholyte 4.

In one preferred embodiment [34], ECO-Gases Management the SCIMIST Function (9) produces ECO-gases. The anolyte portion of the SCIMIST Function (9) can produce oxygen and carbon dioxide while the catholyte portion of the SCIMIST Functions (9) can produce hydrogen and nitrogen gases. The power supply 85 furnishes the electrical potential to the electrodes 1 and 2 and the controller 59 manages the operation of the embodiment shown in FIG. 19. This embodiment is used to control the volume, temperature 81, pressure 82, and flow rate 72 of the gases produced by the SCIMIST Function (9) (see FIG. 19). Valves 32 are used to manage the flow of the ECO-gases through the system. The ECO-Product gases may be stored in gas bottles 83 or sent directly to an application for immediate use.

In one preferred embodiment [35], Thermal Energy Capture System uses the SCIMIST Function (1) for decomposition of feed materials, which results in the generation of thermal energy as a part of the decomposition process. This embodiment will be used for the 'capture of thermal energy'. The capture process is illustrated in FIG. 12 extracting the thermal energy from the anolyte 3 fluid using heat exchanger 57. In the case where the SER process is used the heat exchanger 57 is operating on the catholyte 4 fluid. The thermal energy comes from the SEO or SER processes that are decomposing the materials introduced into the anolyte 3 or catholyte 4 fluids. The thermal energy is captured from the decomposition and transferred as a product to be used. The electrochemical cell 15 produces heat from the electrical circuit flowing through the cell 15. This embodiment may use various techniques to transfer the thermal energy from the SCIMIST Function 1 applications. A heat exchanger 57 maybe used to transfer the heat from the anolyte 3 and catholyte 4 by water to circulate it away for an external use. Typical of this embodiment would be the use of the thermal energy to produce hot water or to augment a Hydronics heating system. Another transfer method may use techniques to transfer the heat to the air and use the air to move the heat to its intended use.

SCIMIST Function (10) Extraterrestrial-Based Systems

Figure 20:
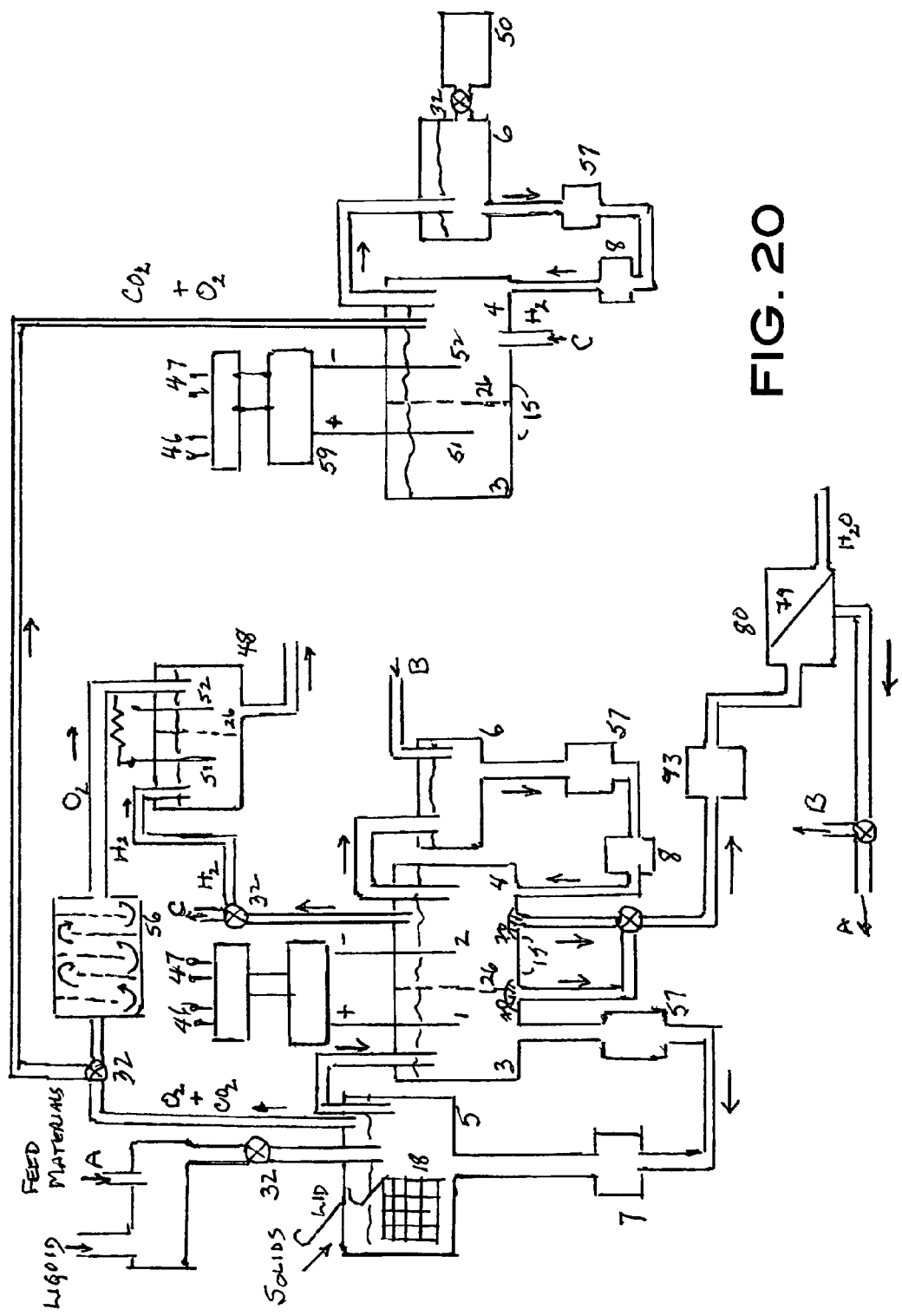
FIG. 20, Extraterrestrial-Based Systems. This is a schematic representation of the invention being used to recover potable water from the decomposition of unwanted feed materials available in the spacecraft such as urine and condensate in the cabin air. This function produces ECO-gases products (e.g., hydrogen and oxygen) evolving off of the decomposition process of the unwanted feed materials.

In one preferred embodiment [36], Extraterrestrial-Based System ECO-Product Generator uses the SCIMIST Function (10) for the decomposition of unwanted feed materials present in a spacecraft or on planets, which results in the purification and sanitation of the water in these unwanted materials. The SCIMIST Function 10 is used to perform processes in a space-based environment. This function may produce useful ECO-Products from processing feed materials such as urine, soapy water, food waste, human waste, construction waste, experiment waste, medical waste, mortuary waste, human and animal body disposal, solids as skin cells and hair, trace organics, microbes, and condensation from cabin air. A typical extraterrestrial-based system is illustrated in FIG. 20. The liquid unwanted feed materials are introduced in to the anolyte input 9 where they are transferred through valve 32 into the anolyte reaction chamber (ARC) 5. Anolyte 3 is circulated through the electrochemical cell 15 and returned to the ARC 5 by the anolyte pump 7 by way of the heat exchanger 57. These liquid materials are decomposed in the ARC 5, in the anolyte fluid 3, and in the electrochemical cell 15. The decomposition results from the use of the SEO process discussed previously where the power supply 85 is controlled by the controller 59. In some cases the SER process may be substituted for the SEO process to decompose the liquid materials. The SEO processes produces $H_2O$, $CO_2$ and $O_2$ as an off gas which travels from either the electrochemical cell 15 or the ARC 5 (which is not illustrated in FIG. 20) to the $CO_2$ filter 56. The $CO_2$ is removed from the off gas leaving $O_2$ to be transferred to the cathode side of the fuel cell 48. On the cathode side of the electrochemical cell 15 the SEO process produces hydrogen gas $H_2$ that is transferred to the anode side of the fuel cell 48. The fuel cell 48 uses the $H_2$ and the $O_2$ to produce electrical power for use by the spacecraft or planetary equipment. Solid unwanted feed materials such as food waste, human waste, solids as skin cells and hair are introduced directly into the ARC 5 through a lid into the basket 18. The solids are decomposed in the ARC 5 into these products $H_2O$, $CO_2$ and $O_2$ or into solution as intermediate compounds, which are further, decomposed into $H_2O$, $CO_2$ and $O_2$. Under the control of the controller 59, water may be removed from the anolyte 3 or the catholyte 4 when it has reached a predetermined level controlled by the controller 59. The valve 32 is opened to allow pump 73 to pump either anolyte 3 or catholyte 4 into the reverse osmosis unit 67. Water is removed as permeate and the concentrate is returned to either the anolyte 3 or the catholyte 4 respectively via either A or B. Heat is extracted by the heat exchanger 57 from both the anolyte 3 and the catholyte 4 to be used by the spacecraft or planet colonization, as needed. The result of this extraterrestrial-based system is to convert unwanted liquids or solids into useful ECO-Products for use in the spacecraft or planet colonization. Throughout the process the controller 59 is being fed data from sensors by input from the sensors 46 and commands are sent from the outputs of the controller 59 back to the sensors via 47.

In one preferred embodiment [37], Extraterrestrial-Based Hydrocarbon Generator uses the SCIMIST Function (6) in these embodiments, which are similar to embodiments 16 and 17 as shown in FIG. 10 to produce hydrocarbon fuel from the carbon dioxide and the hydrogen off gases for potential use in the spacecraft and planet colonization. An alternative would be to store the hydrocarbon fuel rather than to capture or release the carbon dioxide.

SCIMIST Function (11) Hybrid Formulations

In one embodiment [38], Shale Oil Processor uses SCIMIST Functions 1 and 3 to assist in decontaminating the water used in the processing of oil shale as well as embodiments [16, 17, and 18] to improve the efficiency of these technologies. There are several technologies used to produce oil and oil products from the shale. Each technology produces some waste from the application of their process. Typical of the waste are a) waste water used for extraction, and b) tar like materials that result from pyrolysis operating at between 300° C. and 500° C. This embodiment may be used to decontaminate the retort water used in the processing or to decompose the tar like waste from either the ex-situ or in-situ pyrolysis processes. This embodiment not only decontaminates the water using processes similar to embodiment [32] but also generates inorganic and organic fuels from embodiments [16, 17, and 18]. Modifications of FIG. 1, FIGS. 4 A, B and C and FIG. 18 may be used to illustrate this embodiment.

Figure 22:
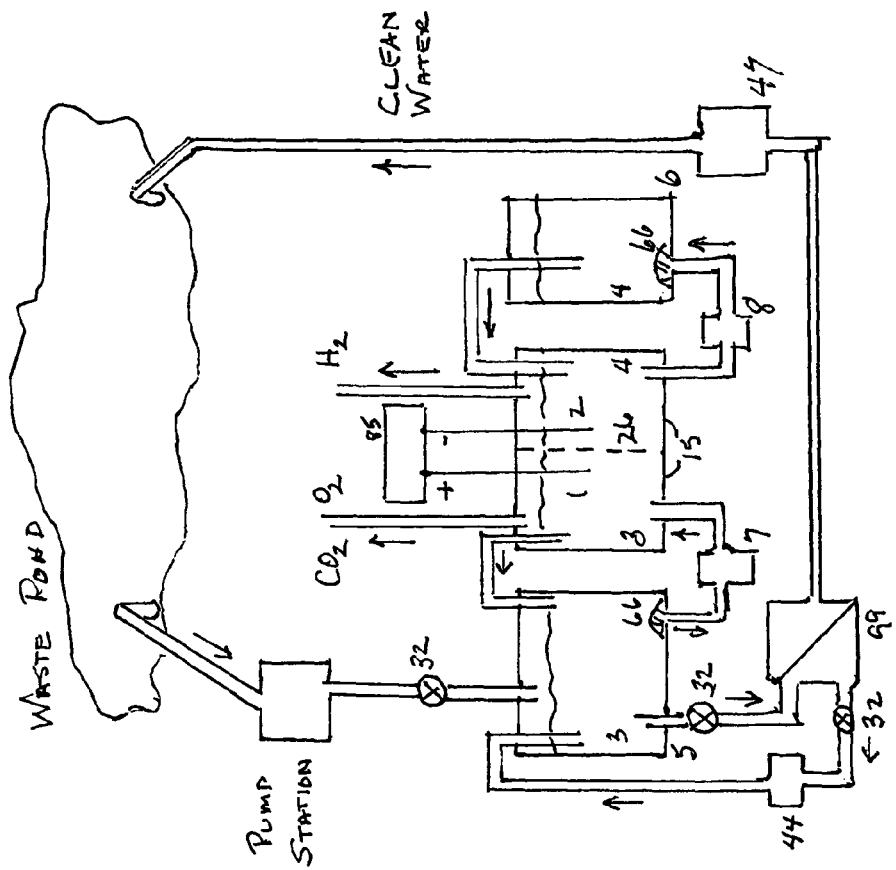
FIG. 22, Remediation of Waste Ponds. This is a schematic representation of the invention being used to remediate the ponds that are being used to store waste from the Oil Sands processing.
Figure 21:
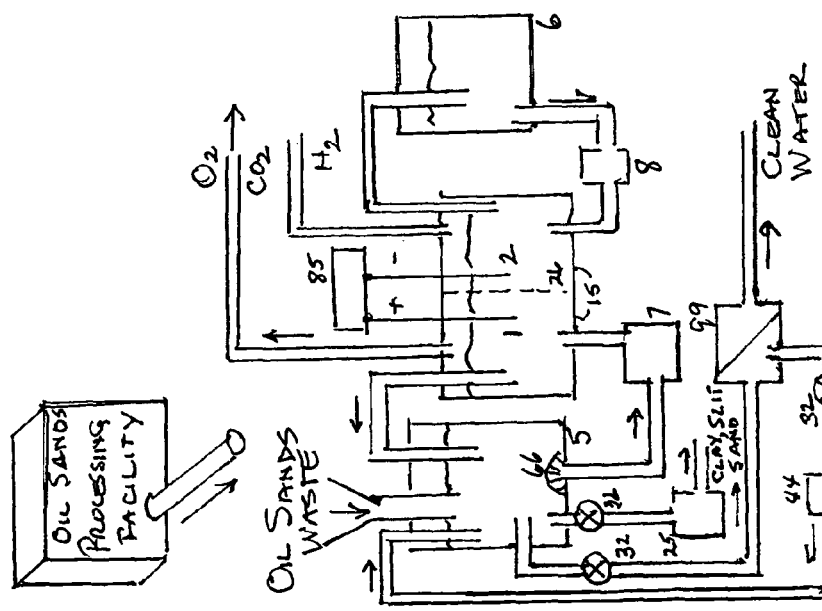
FIG. 21, Direct Oil Sands Waste System. This is a schematic representation of the invention being used to capture ECO-gases and the recovery water from the oil sands process as it is being operated.

In one embodiment [39], Oil Sands Processor uses SCIMIST Functions 1 and 3 to assist in the processing of oil sands. The oil is extracted from the oil sands using a number of technologies [surface mining, cold heavy oil production from sands (CHOPS), cyclic steam stimulation (CSS), steam assisted gravity drainage (SAGD), vapor extraction process (VAPEX), and toe to heel air injection (THAI)]. These technologies produce oil sands tailings suspended in the water used in these processes. The contaminated water is stored in settling ponds where the tailings gradually settles out and sinks to the bottom of the pond as a tar like substance. It is estimated that this process may take upwards of 150 years to be completed. The volume of water being stored in these toxic waste ponds is of the order of 720 million cubic meters in a volume equivalent of 288,000 swimming pools 50 m by 25 m by 2 m. Embodiment [39] uses a number of SCIMIST Functions, decomposition, sanitation, inorganic fuel generation, organic fuel generation and ECO-Products to remediate the waste ponds and stop the new production of waste. Typical of the composition of the waste is a) few percent of bitumen and naphtha, b) 30-50% solids (sand, silt, and clay), c) inorganic materials such as sodium, calcium, iron, and chlorine in mg/liter, d) acid components such as sulfate and nitrate in mg/liter, e) ammonium in mg/liter, and f) dissolved organic carbon in mg/liter. FIG. 21 Direct Oil Sands System and FIG. 22 Remediation of Waste Ponds are schematic representations of embodiment [39]. FIG. 21 depicts the system that processes the new oil sands waste before it is transferred to a waste pond. The oil sands waste is sent to the anolyte reaction chamber 5 where it is processed using the anolyte 3 from the electrochemical cell 15. The anolyte is composed of either the addition of SCIMIST compounds or may directly use the ions existing in the oil sands waste such as sodium, iron, calcium, or others naturally present. As these compounds pass through the electrochemical cell 15 they are converted to oxidizers that interact with the organic materials in the waste. The clean water is extracted from the anolyte reaction chamber 5 as a finished product by the water recovery unit 99. The organic materials in the waste are decomposed to carbon dioxide, oxygen, hydrogen, and water. The carbon dioxide and oxygen are made available to the other embodiments to be used as inorganic fuel or converted to organic fuel. The inorganic solid waste such as clay, silt, and sand are removed by the inorganic removal system 20. Any microorganisms are decomposed in the same manner as the organic materials. The hydrogen transports through the membrane 26 to the cathode 2 where it evolves off as hydrogen gas. The hydrogen gas is made available to other SCIMIST embodiments as a fuel or component for the generation of a combustible hydrocarbon fuel. The SEO process generates heat, which may be used as a by-product of this embodiment. FIG. 22 depicts the system that processes the oil sands waste that has been previously stored in waste ponds. The process is similar to that depicted in FIG. 22 except that the oil sands waste is extracted from the waste ponds. The oil sands waste is processed in the anolyte reaction chamber 5 generally in a batch mode. When the organic materials have been decomposed, then the water recovery unit 44 processes the contaminated water remaining. The clean water may be returned to the pond. The residual wastewater from the water recovery unit 99 is returned to the anolyte reaction chamber 5 by the water pump 44 where it is continues to be processed.

Figure 23:
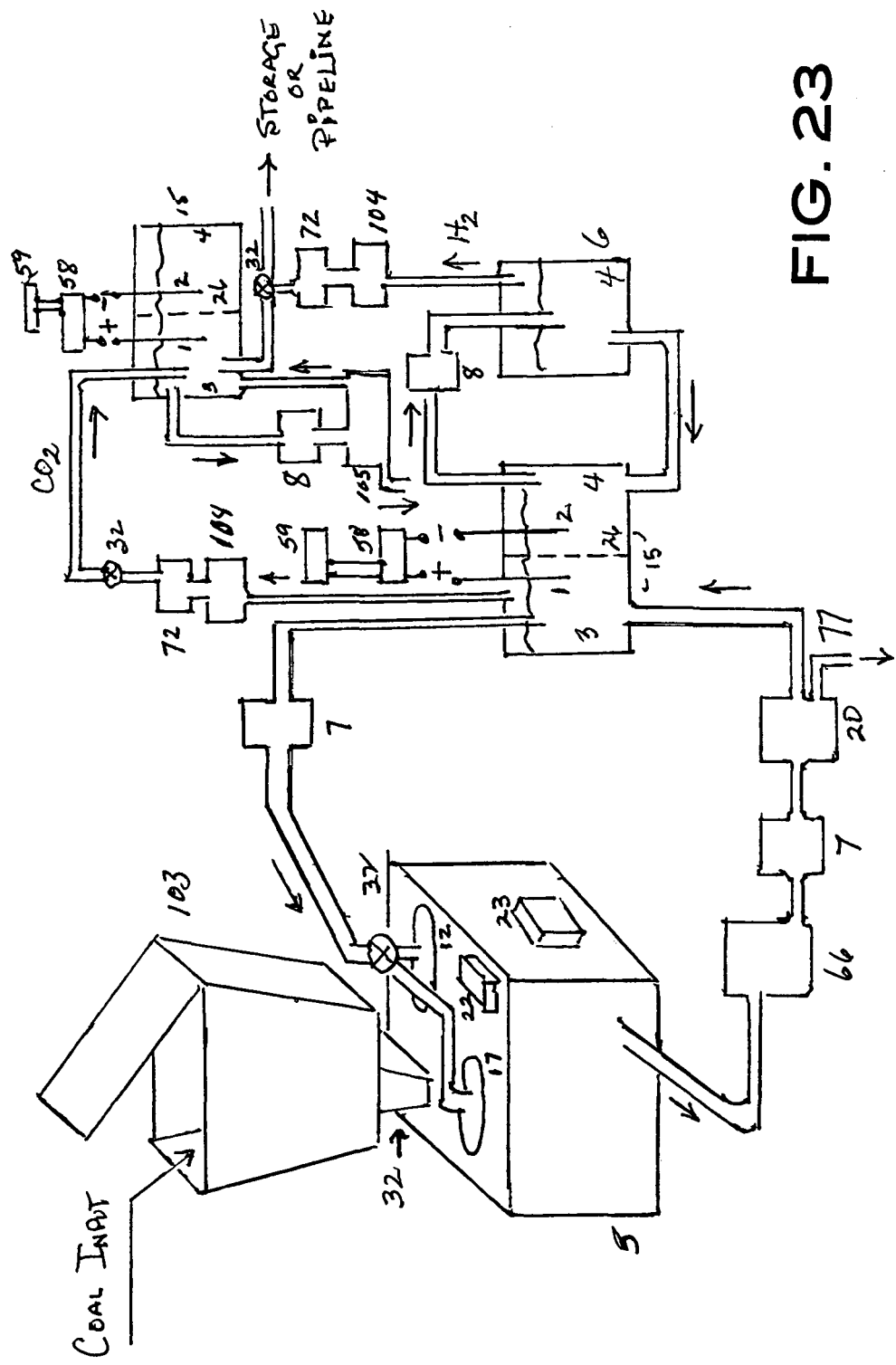
FIG. 23, Clean Coal Processor. This is a schematic representation of the invention being used for the processing of coal into clean energy and combustible organic and inorganic fuels.

In one embodiment [40], Clean Coal Processor uses SCIMIST Functions 1, 6 and 8 to assist in the processing of coal into clean energy and combustible organic and inorganic fuels. A process was studied and published in Electrochemical Oxidation of acidic Alberta coal slurries, G. Thomas, M. Chattier, and V. I. Birds, *Journal of Applied Electrochemistry*, 20 (1990) 941-950 which presented results showing the oxidation of coal. The Thomas article provided an extensive set of references that supported their results by a number of other investigators. The SCIMIST process differs significantly from Thomas as well as the other references. In embodiment [40] coal is processed using SCIMIST Function 1 and produces carbon dioxide and oxygen in the anolyte portion, hydrogen in the catholyte portion, and heat resulting from the process. FIG. 23 is a schematic representation of the embodiment of a Clean Coal Processor. The coal is processed through a grinder 103 and deposited in the ARC 5. The anolyte 3 is circulated through ARC 5 where it is mixed using a mixer 23. An ultraviolet energy source 22 is used to enhance the decomposition process in the ARC 5. The carbon dioxide and hydrogen are processed using SCIMIST Functions 6 or 8 to produce a combustible hydrocarbon fuel. Embodiment [40] is a clean coal process in that it produces heat energy from the oxidation process and coverts the carbon dioxide into a clean hydrocarbon fuel. Coal contains varying amounts of inorganic materials mostly sulfur, calcium, nitrogen, and oxygen in addition to the hydrogen and carbon. These inorganic materials remain in solution in the anolyte portion of the SCIMIST process where they will be removed by the inorganic removal system 20 and used for other purposes. An alternative process would be to use the hydrogen and oxygen as inorganic fuels. The carbon dioxide would be filtered and removed from the anolyte off gas rather then converted to an organic fuel.

Figure 24:
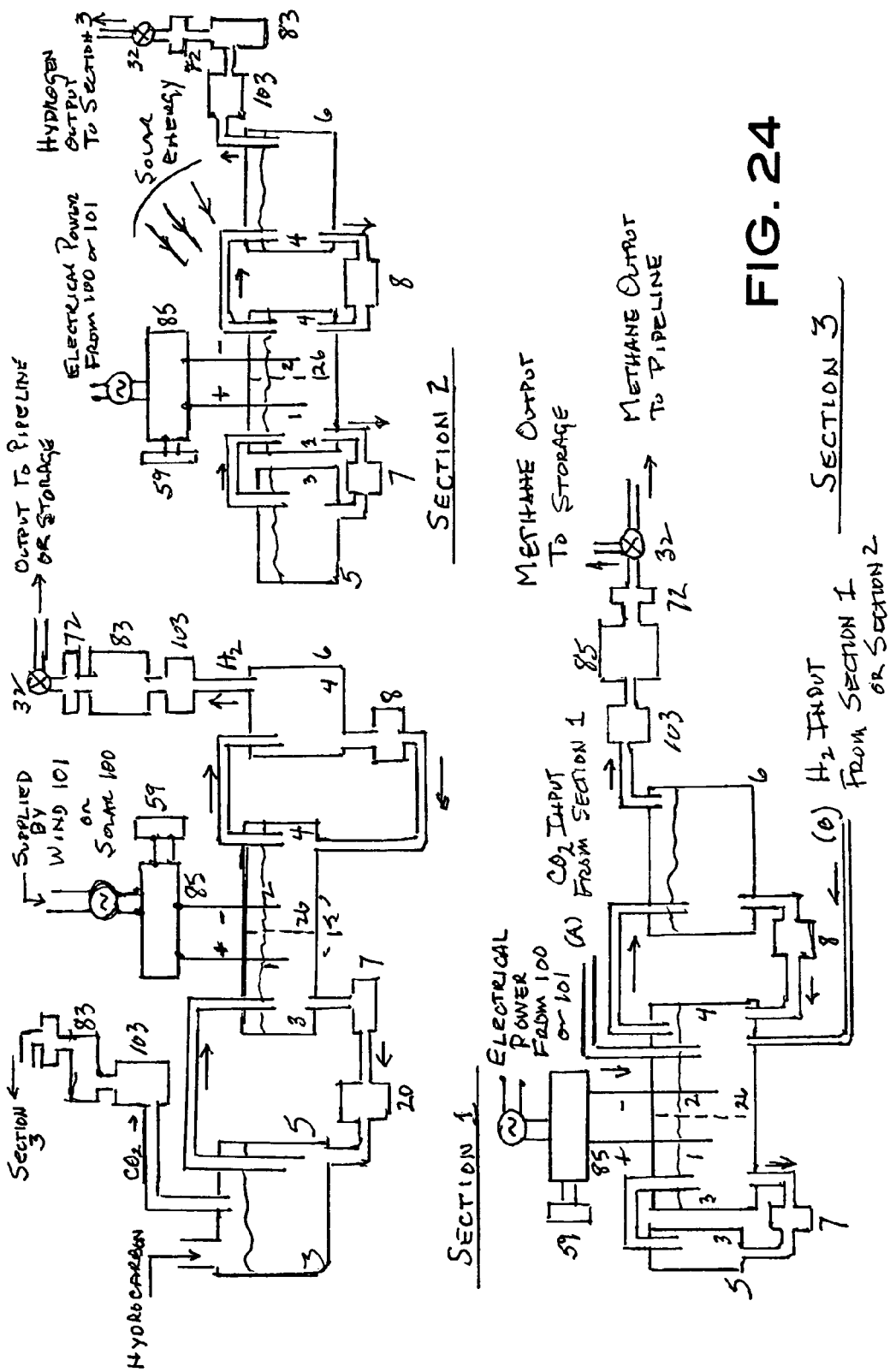
FIG. 24, Remotely Generated Energy Converter. This is a schematic representation of the invention being used to convert wind and solar energy into economically transportable fuels.

In one embodiment [41], Remotely Generated Energy Converter uses SCIMIST Functions 1, 6 and 8 to assist in the processing of energy sources that are remotely located with respect to the useful energy load. Society is addressing the problem of using alternative energy sources that lack an energy delivery infrastructure. Most notable of these sources are wind and solar power, which are most typically available in areas that are remote to the locations where the energy is most needed. These sources are used to generate electricity from the wind and solar energy through electrical generators and photovoltaic cells respectively. First, the cost of building a delivery system for the electricity is a major deterrent to the use of these energy sources. Second, these energies are converted into electrical energy, which suffers substantial losses during its transmission from the electrical generators to the end use application. These two problems make it difficult for wind and solar to compete with nature gas, propane, oil, and coal to economically produce electrical energy. Embodiment [41] is designed to create a hybrid system that converts wind and solar energy into economically transportable fuels using SCIMIST Functions. FIG. 24 is a schematic that depicts embodiment [41] showing the key functional components. Either a solar photovoltaic panel(s) 100 or a wind powered electrical generator(s) 101 may provides electrical power to the various SCIMIST Functions used in this embodiment. There are three sections to the embodiment. Section 1 uses SCIMIST Function 1, decomposition, in a manner similar to embodiment [1]. This section generates ECO-gases (carbon dioxide, oxygen, and hydrogen) from raw materials containing hydrocarbon(s). The raw materials are placed in the ARC 5 and the anolyte is circulated into the ARC to react with them. The hydrocarbon is decomposed by the SCIMIST Function 1 to produce heat, hydrogen, oxygen, water, and carbon dioxide. The electrochemical cell 15 converts the SCIMIST compounds into oxidizers and reducers to operate the SCIMIST decomposition process. The electrochemical cell 15 is powered by electrical energy from either of these two energy sources. The resulting hydrogen ions are passed from the anolyte 3 through the membrane 26 into the catholyte 4 under the influence of the electrical potential between the electrodes and they evolve into hydrogen gas at the cathode 2. The hydrogen gas exits the CRC 6 into a gas compressor 102 controlled by a pressure regulator 72. A valve to either Section 3 or to a gas storage container directs the hydrogen gas where it is available to be fed into a gas pipeline for blending with natural gas. The overland shipping or in ground transmission lines do not suffer from the losses that occur in an electrical transmission line. The hydrogen gas is converted to energy by either being used directly in a combustion equipment or blended with either methane or propane gas supply for use in various combustion equipment. The carbon dioxide produced in the ARC 5 and is transported to Section 3. Section 3 uses SCIMIST Function 8, inorganic and organic fuel generation, in a manner similar to embodiments [28] and [29]. The carbon dioxide is fed into the catholyte 4 where it is reduced to carbon monoxide and reacted with hydrogen. The hydrogen is fed into the catholyte 4 from either Section 1 or 2. Section 3 combines the carbon dioxide and hydrogen to produce a hydrocarbon fuel. Section 2 uses SCIMIST Function 9, generation of ECO-Products, in a manner similar to embodiment [30], Solar Enhanced ECO-Products Generation. The components of embodiment [30] are transparent to solar energy, which is used for solar water splitting. The hydrogen ions that are produced in the anolyte 3 pass through the membrane 26 into the catholyte 4. In the catholyte 4 the hydrogen ions evolve into hydrogen gas at the cathode 2. The hydrogen gas exits the CRC 6 and passes through a compressor 102 to a gas storage tank 83. A pressure regulator 72 controls when the hydrogen is released through a valve 32 to be transported to Section 3's CRC 6. Section 2 supplements the production of hydrogen by taking advantage of the solar energy available at three remote sites.

The SCIMIST process is not generally 100% efficient but it is considerably more efficient then using the electrical transmission lines. The hybrid SCIMIST system addresses the two significant problems facing the alternative energy sources. The SCIMIST system provides a method to capture the electrical energy produced by the solar and wind sources and transports it more efficiently in an alternative form. The hydrocarbon materials would include the use of coal in a clean system as depicted in embodiment 40.

We have described the SCIMIST technological processes and their various chemical steps, which we believe are accurate. However if the process varies from our expressed description we still hold all claims as valid.

While we believe that the theoretical explanation presented in this section are correct, we do not wish to be bound by them.

The disclosures in U.S. Pat. Nos. 6,402,932, 7,387,719, 7,479,215, 7,488,409, 7,517,445, 7,531,080, 7,531,708 and 7,531,710 and co-pending U.S. patent application Ser. Nos. 10/493,500, 10/502,439, 10/512,484 and 10/560,576 are incorporated herein by reference as if fully set forth herein.

EXAMPLES

Example 1

COP Calculation for Embodiment 17 (Methanol Generator)

The Coefficient of Performance (COP) will be calculated for the SCIMIST system as shown in FIG. 10 as an illustration. A liter of dodecane is input into four liters of electrolyte. The decomposition system as illustrated in FIG. 10 is used to decompose the dodecane into carbon dioxide, water, hydrogen, and oxygen. The following assumptions are used for this calculation:
a. The input feed materials will be dodecane, or vegetable oil assuming one liter input into an anolyte solution of four liters at a temperature of 40° C.
b. One liter of dodecane is 0.766 kg and it takes 10 kwh/kg to oxidize it; thus 7.66 kwh of power input (or expended)
c. Heat generated is 8086 kJ/mol and there are 4.5 mol of dodecane in one liter
d. 8086 kJ/mol (dodecane heat energy/mol) times 0.0002778 kwh/kJ is 2.246 kwh/mol; thus for the one liter of dodecane (4.5 mols/l)=10.1 kwh of heat energy produced
e. One mol of dodecane will produce 12 moles of methanol thus one liter of dodecane will be 54 mols of methanol
f. Methanol has 726 kJ/mol thus 12 mol will be 8712 kJ; multiply by 0.0002778 kwh/kJ is 2.42 kwh/mol: times 12 mol/mol of dodecane is 29 kwh.
g. Thus the dodecane will generate 10 kwh heat and 29 kwh of energy stored in the methanol Several additional assumptions are also made in this calculation. These additional assumptions will increase the energy required to process the dodecane thus reducing the COP. They are not included since they are a function of a specific implementation of the system illustration through the schematic represented in FIG. 10. First assumption is that the circulation losses and power expended in the pump (e.g., 500 w) at ignored. Second, not included is the water produced only the heat captured in the water. Third, the efficiency of the production of the methanol in the operation of the fuel cell which should not be lower than 50% and may be as high as 80%.

In this illustration the dodecane will generate 10 kwh heat and the energy stored in the methanol is 29 kwh. Therefore the COP calculation is COP=39 kwh output/7.66 kwh input resulting in a COP=5.1. A similar calculation would be to estimate Energy Returned on Energy Invested (EROEI). For this example the EROEI would be approximately the same as the COP. A calculation could be done for just the output gases such as carbon dioxide, oxygen, and hydrogen and the heat generated without taking the step of producing methanol.

Example 2

System Parameters for Embodiment 11a, Spa and Pool Systems

A system for a typical residential spa (or hot tub) would process the total amount of water through the electrochemical cell(s) about twice in a twenty-four hour period. The capacity of the Spa is approximately 500 gallons of water heated to approximately 100° F. The two pumps shown in FIG. 7a would be sized at about ⅛ hp and generally would be centripetal pumps using magnetic drives and Teflon™ impellors. These pumps would produce a flow rate of 0.7 gallons per minute (gpm) when operating against a head of 20 feet of water and would exchange the water twice in a twenty-four hour period. The SCIMIST compounds added to the Spa water would approximately be in the range of 1-5 parts per million (ppm). The SCIMIST compounds are not expended during the SEO or SER processes and only need to be added when changing the water in the Spa. Operating under these parameters would keep the unwanted microorganisms at an acceptable level for safe use by humans. Operations should be under these parameter with periodic testing to verify safe levels of microorganisms.

While the invention has been described with reference to specific embodiments, modifications and variations of the invention may be constructed without departing from the scope of the invention, which is defined in the following claims.

TABLE I

| | | SIMPLE ANION REDOX COUPLES MEDIATORS | | | |
|---|---|---|---|---|---|
| GROUP | SUB GROUP | ELEMENT | VALENCE | SPECIES | SPECIFIC REDOX COUPLES |
| I | A | None | | | |
| | B | Copper (Cu) | +2 | $Cu^{-2}$ (cupric) | +2 Species/+3, +4 Species |
| | | | | $HCuO_2$ (bicuprite) | +3 Species/+4 Species |
| | | | | $CuO_2^{-2}$ (cuprite) | |
| | | | +3 | $Cu^{+3}$ | |
| | | | | $CuO_2^-$ (cuprate) | |
| | | | | $Cu_2O_3$ (sesquioxide) | |
| | | | +4 | $CuO_2$ (peroxide) | |
| | | Silver (Ag) | +1 | $Ag^+$ (argentous) | +1 Species/+2, +3 Species |
| | | | | $AgO^-$ (argentite) | +2 Species/+3 Species |
| | | | +2 | $Ag^{-2}$ (argentic) | |
| | | | | $AgO$ (argentic oxide) | |
| | | | +3 | $AgO^+$ (argentyl) | |
| | | | | $Ag_2O_3$ (sesquioxide) | |

TABLE I-continued

SIMPLE ANION REDOX COUPLES MEDIATORS

| GROUP | SUB GROUP | ELEMENT | VALENCE | SPECIES | SPECIFIC REDOX COUPLES |
|---|---|---|---|---|---|
| | | Gold (Au) | +1 | $Au^+$ (aurous) | +1 Species/+3, +4 Species |
| | | | +3 | $Au^{+3}$ (auric) | +3 Species/+4 Species |
| | | | | $AuO^-$ (auryl) | |
| | | | | $H_3AuO_3^-$ (auric acid) | |
| | | | | $H_2AuO_3^-$ (monoauarate) | |
| | | | | $HAuO_3^{-2}$ (diaurate) | |
| | | | | $AuO_3^{-3}$ (triaurate) | |
| | | | | $Au_2O_3$ (auric oxide) | |
| | | | | $Au(OH)_3$ (auric hydroxide) | |
| | | | +4 | $AuO_2$ (peroxide) | |
| II | A | Magnesium (Mg) | +2 | $Mg^{+2}$ (magnesic) | +2 Species/+4 Species |
| | | | +4 | $MgO_2$ (peroxide) | |
| | | Calcium (Ca) | +2 | $Ca^{+2}$ | +2 Species/+4 Species |
| | | | +4 | $CaO_2$ (peroxide) | |
| | | Strontium | +2 | $Sr^{+2}$ | +2 Species/+4 Species |
| | | | +4 | $SrO_2$ (peroxide) | |
| | | Barium (Ba) | +2 | $Ba^{+2}$ | +2 Species/+4 Species |
| | | | +4 | $BaO_2$ (peroxide) | |
| | B | Zinc (Zn) | +2 | $Zn^{+2}$ (zincic) | +2 Species/+4 Species |
| | | | | $ZnOH^+$ (zincyl) | |
| | | | | $HZnO_2^-$ (bizincate) | |
| | | | | $ZnO_2^{-2}$ (zincate) | |
| | | | +4 | $ZnO_2$ (peroxide) | |
| | | Mercury (Hg) | +2 | $Hg^{+2}$ (mercuric) | +2 Species/+4 Species |
| | | | | $Hg(OH)_2$ (mercuric hydroxide) | |
| | | | | $HHgO_2^-$ (mercurate) | |
| | | | +4 | $HgO_2$ (peroxide) | |
| III | A | Boron | +3 | $H_3BO_3$ (orthoboric acid) | +3 Species/+4.5, +5 Species |
| | | | | $H_2BO_3^-$, $HBO_3^{-2}$, $BO_3^{-3}$ (orthoborates) | |
| | | | | $BO_2^-$ (metaborate) | |
| | | | | $H_2B_4O_7$ (tetraboric acid) | |
| | | | | $HB_4O_7^-/B_4O_7^{-2}$ (tetraborates) | |
| | | | | $B_2O_4^{-2}$ (diborate) | |
| | | | | $B_6O_{10}^{-2}$ (hexaborate) | |
| | | | +4.5 | $B_2O_5^-$ (diborate) | |
| | | | +5 | $BO_3^-/BO_2^- \cdot H_2O$ (perborate) | |
| | | Thallium (Tl) | +1 | $Tl^{+1}$ (thallous) | +1 Species/+3 or +3.33 Species |
| | | | +3 | $Tl^{+3}$ (thallic) | +3 Species/+3.33 Species |
| | | | | $TlO^+$, $TlOH^{+2}$, $Tl(OH)_2^+$ (thallyl) | |
| | | | | $Tl_2O_3$ (sesquioxide) | |
| | | | | $Tl(OH)_3$ (hydroxide) | |
| | | | +3.33 | $Tl_3O_5$ (peroxide) | |
| | B | See Rare Earths and Actinides | | | |
| IV | A | Carbon (C) | +4 | $H_2CO_3$ (carbonic acid) | +4 Species/+5, +6 Species |
| | | | | $HCO_3^-$ (bicarbonate) | |
| | | | | $CO_3^{-2}$ (carbonate) | |
| | | | +5 | $H_2C_2O_6$ (perdicarbonic acid) | |
| | | | +6 | $H_2CO_4$ (permonocarbonic acid) | |
| | | Germanium (Ge) | +4 | $H_2GeO_3$ (germanic acid) | +4 Species/+6 Species |
| | | | | $HGeO_3^-$ (bigermaniate) | |
| | | | | $GeO_3^{-4}$ (germinate) | |
| | | | | $Ge^{+4}$ (germanic) | |
| | | | | $GeO_4^{-4}$ | |
| | | | | $H_2Ge_2O_5$ (digermanic acid) | |
| | | | | $H_2Ge_4O_9$ (tetragermanic acid) | |
| | | | | $H_2Ge_5O_{11}$ (pentagermanic acid) | |
| | | | | $HGe_5O_{11}^-$ (bipentagermanate) | |
| | | | +6 | $Ge_6O_{11}^{-2}$ (pentagermanate) | |
| | | Tin (Sn) | +4 | $Sn^{+4}$ (stannic) | +4 Species/+7 Species |
| | | | | $HSnO_3^-$ (bistannate) | |
| | | | | $SnO_3^{-2}$ (stannate) | |
| | | | | $SnO_2$ (stannic oxide) | |
| | | | | $Sn(OH)_4$ (stannic hydroxide) | |
| | | | +7 | $SnO_4^-$ (perstannate) | |
| | | Lead (Pb) | +2 | $Pb^{+2}$ (plumbous) | +2, +2.67, +3 Species/+4 Species |
| | | | | $HPbO_2^-$ (biplumbite) | |
| | | | | $PbOH^+$ | |
| | | | | $PbO_2^{-2}$ (plumbite) | |
| | | | | $PbO$ (plumbus oxide) | |
| | | | +2.67 | $Pb_3O_4$ (plumbo-plumbic oxide) | |
| | | | +3 | $Pb_2O_3$ (sequioxide) | |

TABLE I-continued

SIMPLE ANION REDOX COUPLES MEDIATORS

| GROUP | SUB GROUP | ELEMENT | VALENCE | SPECIES | SPECIFIC REDOX COUPLES |
|---|---|---|---|---|---|
| | | Lead (Pb) | +4 | $Pb^{+4}$ (plumbic)<br>$PbO_3^{-2}$ (metaplumbate)<br>$HPbO_3^-$ (acid metaplumbate)<br>$PbO_4^{-4}$ (orthoplumbate)<br>$PbO_2$ (dioxide) | +2, +2.67, +3 Species/+4 Species |
| | B | Titanium | +4 | $TiO^{+2}$ (pertitanyl)<br>$HTiO_4^-$ titanate)<br>$TiO_2$ (dioxide) | +4 Species/+6 Species |
| | | | +6 | $TiO_2^{+2}$ (pertitanyl)<br>$HTiO_4^-$ (acid pertitanate)<br>$TiO_4^{-2}$ (pertitanate)<br>$TiO_3$ (peroxide) | |
| | | Zirconium (Zr) | +4 | $Zr^{+4}$ (zirconic)<br>$ZrO_2^{+2}$ (zirconyl)<br>$HZrO_3^-$ (zirconate) | +4 Species/+5, +6, +7 Species |
| | | | +5 | $Zr_2O_5$ (pentoxide) | |
| | | | +6 | $ZrO_3$ (peroxide) | |
| | | | +7 | $Zr_2O_7$ (heptoxide) | |
| | | Hafnium (Hf) | +4 | $Hf^{+4}$ (hafnic)<br>$HfO^{+2}$ (hafnyl) | +4 Species/+6 Species |
| | | | +6 | $HfO_3$ (peroxide) | |
| V | A | Nitrogen | +5 | $HNO_3$ (nitric acid)<br>$NO_3^-$ (nitrate) | +5 species/+7 Species |
| | | | +7 | $HNO_4$ (pernitric acid) | |
| | | Phosphorus (P) | +5 | $H_3PO_4$ (orthophosphoric acid)<br>$H_2PO_4^-$ (monoorthophosphate)<br>$HPO_4^{-2}$ (diorthophosphate)<br>$PO_4^{-3}$ (triorthophosphate)<br>$HPO_3$ (metaphosphoric acid)<br>$H_4P_2O_7$ (pryophosphoric acid)<br>$H_5P_3O_{10}$ (triphosphoric acid)<br>$H_6P_4O_{13}$ (tetraphosphoric acid) | +5 Species/+6, +7 species |
| | | | +6 | $H_4P_2O_8$ (perphosphoric acid) | +5 Species/+6, +7 Species |
| | | | +7 | $H_3PO_5$ (monoperphosphoric acid) | |
| | | Arsenic (As) | +5 | $H_3AsO_4$ (ortho-arsenic acid)<br>$H_2AsO_4^-$ (mono ortho-arsenate)<br>$HAsO_4^{-2}$ (di-ortho-arsenate)<br>$AsO_4^{-3}$ (tri-ortho-arsenate)<br>$AsO_2^+$ (arsenyl) | +5 Species/+7 species |
| | | | +7 | $AsO_3^+$ (perarsenyl) | |
| | | Bismuth (Bi) | +3 | $Bi^{+3}$ (bismuthous)<br>$BiOH^{+2}$ (hydroxybismuthous)<br>$BiO^+$ (bismuthyl)<br>$BiO_2^-$ (metabismuthite) | +3 Species/+3.5, +4, +5 Species |
| | | | +3.5 | $Bi_4O_7$ (oxide) | |
| | | | +4 | $Bi_2O_4$ (tetroxide) | |
| | | | +5 | $BiO_3^-$ (metabismuthite)<br>$Bi_2O_5$ (pentoxide) | |
| | B | Vanadium (V)<br>(See also POM<br>Complex Anion<br>Mediators) | +5 | $VO_2^+$ (vanadic)<br>$H_3V_2O_7^-$ (pyrovanadate)<br>$H_2VO_4^-$ (orthovanadate)<br>$VO_3^-$ (metavanadate)<br>$HVO_4^{-2}$ (orthovanadate)<br>$VO_4^{-3}$ (orthovanadate)<br>$V_2O_5$ (pentoxide)<br>$H_4V_2O_7$ (pyrovanadic acid)<br>$HVO_3$ (metavanadic acid)<br>$H_4V_6O_{17}$ (hexavanadic acid) | +5 Species/+7, +9 Species |
| | | | +7 | $VO_4^-$ (pervanadate) | |
| | | | +9 | $VO_5^-$ (hypervanadate) | |
| | | Niobium (Nb)<br>(See also POM<br>Complex Anion<br>Mediators) | +5 | $NbO_3^-$ (metaniobate)<br>$NbO_4^{-3}$ (orthoniobate)<br>$Nb_2O_5$ (pentoxide)<br>$HNbO_3$ (niobid acid) | +5 Species/+7 species |
| | | | +7 | $NbO_4^-$ (perniobate)<br>$Nb_2O_7$ (perniobic oxide)<br>$HNbO_4$ (perniobic acid) | |
| | | Tantalum (Ta)<br>(See also POM<br>Complex Anion<br>Mediators) | +5 | $TaO_3^-$ (metatantalate)<br>$TaO_4^{-3}$ (orthotanatalate)<br>$Ta_2O_5$ (pentoxide)<br>$HTaO_3$ (tantalic acid) | +5 species/+7 species |
| | | | +7 | $TaO_4^-$ (pentantalate)<br>$Ta_2O_7$ (pertantalate)<br>$HTaO_4 \cdot H_2O$ (pertantalic acid) | |

TABLE I-continued

SIMPLE ANION REDOX COUPLES MEDIATORS

| GROUP | SUB GROUP | ELEMENT | VALENCE | SPECIES | SPECIFIC REDOX COUPLES |
|---|---|---|---|---|---|
| VI | A | Sulfur (S) | +6 | $H_2SO_4$ (sulfuric acid)<br>$HSO_4^-$ (bisulfate)<br>$SO_4^{-2}$ (sulfate) | +6 Species/+7, +8 Species |
| | | | +7 | $S_2O_8^{-2}$ (dipersulfate) | |
| | | | +8 | $H_2SO_5$ (momopersulfuric acid) | |
| | | Selenium (Se) | +6 | $H_2Se_2O_4$ (selenic acid)<br>$HSeO_4^-$ (biselenate)<br>$SeO_4^{-2}$ (selenate) | +6 species/+7 Species |
| | | | +7 | $H_2Se_2O_8$ (perdiselenic acid) | |
| | | Tellurium (Te) | +6 | $H_2TeO_4$ (telluric acid)<br>$HTeO_4^-$ (bitellurate)<br>$TeO_4^{-2}$ (tellurate) | +6 species/+7 species |
| | | | +7 | $H_2Te_2O_8$ (perditellenic acid) | |
| | | Polonium (Po) | +2 | $Po^{+2}$ (polonous) | +2, +4 species/+6 Species |
| | | | +4 | $PoO_3^{-2}$ (polonate) | |
| | | | +6 | $PoO_3$ (peroxide) | |
| | B | Chromium | +3 | $Cr^{+3}$ (chromic)<br>$CrOH^{+2}$, $Cr(OH)_2^+$ (chromyls)<br>$CrO_2^-$, $CrO_3^{-3}$ (chromites)<br>$Cr_2O_3$ (chromic oxide)<br>$Cr(OH)_3$ (chromic hydroxide) | +3 Species/+4, +6 Species<br>+4 Species/+6 Species |
| | | | +4 | $CrO_2$ (dioxide)<br>$Cr(OH)_4$ (hydroxide) | |
| | | | +6 | $H_2CrO_4$ (chromic acid)<br>$HCrO_4^-$ (acid chromate)<br>$CrO_4^{-2}$ (chromate)<br>$Cr_2O_7^{-2}$ (dichromate) | |
| | | Molybdenum (Mo)<br>(See also POM Complex Anion Mediators) | +6 | $HMoO_4^-$ (bimolybhate)<br>$MoO_4^{-2}$ (molydbate)<br>$MoO_3$ (molybdic trioxide)<br>$H_2MoO_4$ (molybolic acid) | +6 Species/+7 Species |
| | | | +7 | $MoO_4^-$ (permolybate) | |
| | | Tungsten (W)<br>(See also POM Complex Anion Mediators) | +6 | $WO_4^{-2}$ tungstic)<br>$WO_3$ (trioxide)<br>$H_2WO_4$ (tungstic acid) | +6 Species/+8 Species |
| | | | +8 | $WO_5^{-2}$ (pertungstic)<br>$H_2WO_5$ (pertungstic acid) | |
| VII | A | Chlorine (Cl) | -1 | $Cl^-$ (chloride) | -1 Species/+1, +3, +5, +7 Species |
| | | | +1 | HClO (hypochlorous acid)<br>$ClO^-$ (hypochlorite) | +1 Species/+3, +5, +7 Species<br>+3 Species/+5, +7 Species |
| | | | +3 | $HClO_2$ (chlorous acid)<br>$ClO_2^-$ (chlorite) | +5 Species/+7 Species |
| | | | +5 | $HClO_3$ (chloric acid)<br>$ClO_3^-$ (chlorate) | |
| | | | +7 | $HClO_4$ (perchloric acid)<br>$ClO_4^-$, $HClO_5^{-2}$, $ClO_5^{-3}$, $Cl_2O_9^{-4}$<br>(perchlorates) | |
| | | Bromine (Br) | -1 | $Br^-$ (bromide) | -1 Species/+1, +3, +5, +7 Species |
| | | | +1 | HBrO (hypobromous acid)<br>$BrO^-$ (hypobromitee) | +1 Species/+3, +5, +7 Species<br>+3 Species/+5, +7 Species |
| | | | +3 | $HBrO_2$ (bromous acid)<br>$BrO_2^-$ (bromite) | +5 Species/+7 Species |
| | | | +5 | $HBrO_3$ (bromic acid)<br>$BrO_3^-$ (bromate) | |
| | | | +7 | $HBrO_4$ (perbromic acid)<br>$BrO_4^-$, $HBrO_5^{-2}$, $BrO_5^{-3}$, $Br_2O_9^{-4}$<br>(prebromates) | |
| | | Iodine | -1 | $I^-$ (iodide) | -1 Species/+1, +3, +5, +7 Species |
| | | | +1 | HIO (hypoiodus acid)<br>$IO^-$ (hypoiodite) | +1 Species/+3, +5, +7 Species<br>+3 Species/+5, +7 Species |
| | | | +3 | $HIO_2$ (iodous acid)<br>$IO_2^-$ (iodite) | +5 Species/+7 Species |
| | | | +5 | $HIO_3$ (iodic acid)<br>$IO_3^-$ (iodate) | |
| | | | +7 | $HIO_4$ (periodic acid)<br>$IO_4^-$, $HIO_5^{-2}$, $IO_5^{-3}$, $I_2O_9^{-4}$<br>(periodates) | |
| | B | Manganese (Mn) | +2 | $Mn^{+2}$ (manganeous)<br>$HMnO_2^-$ (dimanganite) | +2 Species/+3, +4, +6, +7 Species<br>+3 Species/+4, +6, +7 Species |
| | | | +3 | $Mn^{+3}$ (manganic) | +4 Species/+6, +7 Species |
| | | | +4 | $MnO_2$ (dioxide) | +6 Species/+7 Species |
| | | | +6 | $MnO_4^{-2}$ (manganate) | |
| | | | +7 | $MnO_4^-$ (permanganate) | |

TABLE I-continued

SIMPLE ANION REDOX COUPLES MEDIATORS

| GROUP | SUB GROUP | ELEMENT | VALENCE | SPECIES | SPECIFIC REDOX COUPLES |
|---|---|---|---|---|---|
| VIII | Period 4 | Iron (Fe) | +2 | $Fe^{+2}$ (ferrous) | +2 Species/+3, +4, +5, +6 Species |
| | | | | $HFeO_2^-$ (dihypoferrite) | +3 Species/+4, +5, +6 Species |
| | | | +3 | $Fe^{+3}$, $FeOH^{+2}$, $Fe(OH)_2^+$ (ferric) | +4 Species/+5, +6 Species |
| | | | | $FeO_2^-$ (ferrite) | +5 Species/+6 Species |
| | | | +4 | $FeO^{+2}$ (ferryl) | |
| | | | | $FeO_2^{-2}$ (perferrite) | |
| | | | +5 | $FeO_2^+$ (perferryl) | |
| | | | +6 | $FeO_4^{-2}$ (ferrate) | |
| | | Cobalt (Co) | +2 | $Co^{+2}$ (cobalous) | +2 Species/+3, +4 Species |
| | | | | $HCoO_2^-$ (dicobaltite) | +3 Species/+4 Species |
| | | | +3 | $Co^{+3}$ (cobaltic) | |
| | | | | $Co_2O_3$ (cobaltic oxide) | |
| | | | +4 | $CoO_2$ (peroxide) | |
| | | | | $H_2CoO_3$ (cobaltic acid) | |
| | | Nickel (Ni) | +2 | $Ni^{+2}$ (nickelous) | +2 Species/+3, +4, +6 Species |
| | | | | $NiOH^+$ | +3 Species/+4, +6 Species |
| | | | | $HNiO_2^-$ (dinickelite) | +4 Species/+6 Species |
| | | | | $NiO_2^{-2}$ (nickelite) | |
| | | | +3 | $Ni^{+3}$ (nickelic) | |
| | | | | $Ni_2O_3$ (nickelic oxide) | |
| | | | +4 | $NiO_2$ (peroxide) | |
| | | | +6 | $NiO_4^{-2}$ (nickelate) | |
| | Period 5 | Ruthenium (Ru) | +2 | $Ru^{+2}$ | +2 Species/+3, +4, +5, +6, +7, +8 Species |
| | | | +3 | $Ru^{+3}$ | +3 Species/+4, +5, +6, +7, +8 Species |
| | | | | $Ru_2O_3$ (sesquioxide) | +4 Species/+5, +6, +7, +8 Species |
| | | | | $Ru(OH)_3$ (hydroxide) | +5 Species/+6, +7, +8 Species |
| | | | +4 | $Ru^{+4}$ (ruthenic) | +6 Species/+7, +8 Species |
| | | | | $RuO_2$ (ruthenic dioxide) | +7 Species/+8 Species |
| | | | | $Ru(OH)_4$ (ruthenic hydroxide) | |
| | | | +5 | $Ru_2O_5$ (pentoxide) | |
| | | | +6 | $RuO_4^{-2}$ (ruthenate) | |
| | | | | $RuO_2^{+2}$ (ruthenyl) | |
| | | | | $RuO_3$ (trioxide) | |
| | | | +7 | $RuO_4^-$ (perruthenate) | |
| | | | +8 | $H_2RuO_4$ (hyperuthenic acid) | |
| | | | | $HRuO_5^-$ (diperruthenate) | |
| | | | | $RuO_4$ (ruthenium tetroxide) | |
| | | Rhodium (Rh) | +1 | $Rh^+$ (hyporhodous) | +1 Species/+2, +3, +4, +6 Species |
| | | | +2 | $Rh^{+2}$ (rhodous) | +2 Species/+3, +4, +6 Species |
| | | | +3 | $Rh^{+3}$ (rhodic) | +3 Species/+4, +6 Species |
| | | | | $Rh_2O_3$ (sesquioxide) | +4 Species/+6 Species |
| | | | +4 | $RhO_2$ (rhodic oxide) | |
| | | | | $Rh(OH)_4$ (hydroxide) | |
| | | | +6 | $RhO_4^{-2}$ (rhodate) | |
| | | | | $RhO_3$ (trioxide) | |
| | | Palladium | +2 | $Pd^{+2}$ (palladous) | +2 Species/+3, +4, +6 Species |
| | | | | $PdO_2^{-2}$ (palladite) | +3 Species/+4, +6 Species |
| | | | +3 | $Pd_2O_3$ (sesquioxide) | +4 Species/+6 Species |
| | | | +4 | $PdO_3^{-2}$ (palladate) | |
| | | | | $PdO_2$ (dioxide) | |
| | | | | $Pd(OH)_4$ (hydroxide) | |
| | | | +6 | $PdO_3$ (peroxide) | |
| | Period 6 | Iridium (Ir) | +3 | $Ir^{+3}$ (iridic) | +3 Species/+4, +6 Species |
| | | | | $Ir_2O_3$ (iridium sesquioxide) | +4 Species/+6 Species |
| | | | | $Ir(OH)_3$ (iridium hydroxide) | |
| | | | +4 | $IrO_2$ (iridic oxide) | |
| | | | | $Ir(OH)_4$ (iridic hydroxide) | |
| | | | +6 | $IrO_4^{-2}$ (iridate) | |
| | | | | $IrO_3$ (iridium peroxide) | |
| | | Platinum (Pt) | +2 | $Pt^{+2}$ (platinous) | +2, +3 Species/+4, +6 Species |
| | | | +3 | $Pt_2O_3$ (sesquioxide) | +4 Species/+6 Species |
| | | | +4 | $PtO_3^{-2}$ (palatinate) | |
| | | | | $PtO^{+2}$ (platinyl) | |
| | | | | $Pt(OH)^{+3}$ | |
| | | | | $PtO_2$ (platonic oxide) | |
| IIIB | Rare earths | Cerium (Ce) | +3 | $Ce^{+3}$ (cerous) | +3 Species/+4, +6 Species |
| | | | | $Ce_2O_3$ (cerous oxide) | +4 Species/+6 Species |
| | | | | $Ce(OH)_3$ (cerous hydroxide) | |
| | | | +4 | $Ce^{+4}$, $Ce(OH)^{+3}$, $Ce(OH)_2^{+2}$, $Ce(OH)_3^+$ (ceric) | |
| | | | | $CeO_2$ (ceric oxide) | |
| | | | +6 | $CeO_3$ (peroxide) | |

TABLE I-continued

SIMPLE ANION REDOX COUPLES MEDIATORS

| GROUP | SUB GROUP | ELEMENT | VALENCE | SPECIES | SPECIFIC REDOX COUPLES |
|---|---|---|---|---|---|
| | | Praseodymium (Pr) | +3 | $Pr^{+3}$ (praseodymous) $Pr_2O_3$ (sesquioxide) $Pr(OH)_3$ (hydroxide) | +3 species/+4 species |
| | | | +4 | $Pr^{+4}$ (praseodymic) $PrO_2$ (dioxide) | |
| | | Neodymium | +3 | $Nd^{+3}$ $Nd_2O_3$ (sesquioxide) | +3 Species/+4 Species |
| | | | +4 | $NdO_2$ (peroxide) | |
| | | Terbium (Tb) | +3 | $Tb^{+3}$ $Tb_2O_3$ (sesquioxide) | +3 Species/+4 Species |
| | | | +4 | $TbO_2$ (peroxide) | |
| | Actinides | Thorium (Th) | +4 | $Th^{+4}$ (thoric) $ThO^{+2}$ (thoryl) $HThO_3^-$ (thorate) | +4 Species/+6 Species |
| | | | +6 | $ThO_3$ (acid peroxide) | |
| | | Uranium (U) | +6 | $UO_2^{+2}$ (uranyl) $UO_3$ (uranic oxide) | +6 Species/+8 Species |
| | | | +8 | $HUO_5^-$, $UO_5^{-2}$ (peruranates) $UO_4$ (peroxide) | |
| | | Neptunium (Np) | +5 | $NpO_2^+$ (hyponeptunyl) $Np_2O_5$ (pentoxide) | +5 Species/+6, +8 Species +6 Species/+8 Species |
| | | | +6 | $NpO_2^{+2}$ (neptunyl) $NpO_3$ (trioxide) | |
| | | | +8 | $NpO_4$ (peroxide) | |
| | | Plutonium (Pu) | +3 | $Pu^{+3}$ (hypoplutonous) | +3 Species/+4, +5, +6 Species |
| | | | +4 | $Pu^{+4}$ (plutonous) $PuO_2$ (dioxide) | +4 Species/+5, +6 Species |
| | | | +5 | $PuO_2^+$ (hypoplutonyl) $Pu_2O_5$ (pentoxide) | +5 Species/+6 Species |
| | | | +6 | $PuO_2^{+2}$ (plutonyl) $PuO_3$ (peroxide) | |
| | | Americium (Am) | +3 | $Am^{+3}$ (hypoamericious) | |
| | | | +4 | $Am^{+4}$ (americous) $AmO_2$ (dioxide) $Am(OH)_4$ (hydroxide) | |
| | | | +5 | $AmO_2^+$ (hypoamericyl) $Am_2O_5$ (pentoxide) | |
| | | | +6 | $AmO_2^{+2}$ (americyl) $AmO_3$ (peroxide) | |

TABLE II

ELEMENTS PARTICIPATING AS HETEROATOMS IN HETEROPOLYANION COMPLEX ANION REDOX COUPLE MEDIATORS

| GROUP | SUB GROUP | ELEMENT |
|---|---|---|
| I | A | Lithium (Li), Sodium (Na), Potassium (K), and Cesium (Cs) |
| | B | Copper (Cu), Silver (Ag), and Gold (Au) |
| II | A | Beryllium (Be), Magnesium (Mg), Calcium (Ca), Strontium (Sr), and Barium (Ba) |
| | B | Zinc (Zn), Cadmium (Cd), and Mercury (Hg) |
| III | A | Boron (B), and Aluminum (Al) |
| | B | Scandium (Sc), and Yttrium (Y) - (See Rare Earths) |
| IV | A | Carbon (C), Silicon (Si), Germanium (Ge), Tin (Sn) and Lead (Pb) |
| | B | Titanium (Ti), Zirconium (Zr), and Hafnium (Hf) |
| V | A | Nitrogen (N), Phosphorous (P), Arsenic (As), Antimony (Sb), and Bismuth (Bi) |
| | B | Vanadium (V), Niobium (Nb), and Tantalum (Ta) |
| VI | A | Sulfur (S), Selenium (Se), and Tellurium (Te) |
| | B | Chromium (Cr), Molybdenum (Mo), and Tungsten (W) |
| VII | A | Fluorine (F), Chlorine (Cl), Bromine (Br), and Iodine (I) |
| | B | Manganese (Mn), Technetium (Tc), and Rhenium (Re) |
| VIII | | Period 4 Iron (Fe), Cobalt (Co), and Nickel (Ni) Period 5 Ruthenium (Ru), Rhodium (Rh), and Palladium (Pd) Period 6 Osmium (Os), Iridium (Ir), and Platinum (Pt) |
| IIIB | | Rare Earths All |

We claim:

1. A system comprising a decomposition system having an electrochemical cell, a membrane in the electrochemical cell separating the electrochemical cell into an anode side and a cathode side, an anode in the anode side, a cathode in the cathode side,
an anolyte reaction chamber connected to the anolyte side of the electrochemical cell,
a catholyte reaction chamber connected to the catholyte side of the electrochemical cell,
an anolyte fluid in the anolyte side of the electrochemical cell and in the anolyte reaction chamber,
the anolyte fluid containing an ion species as a oxidizer species, anolyte fluid oxidizer species comprising elements having atomic number below 90 and described as simple redox couple mediators, including any of elements Cu, Ag, Mg, Ca, Sr, Ba, Zn, Hg, B, Tl, C, Ge, Sn, Pb, Ti, Zr, Hf, N, P, As, Bi, V, Nb, Ta, S, Se, Te, Po, Cr, Mo, W, Cl, Br, I, Mn, Fe, Co, Ni, Ru, Rh, Pd, Ir, Ce, Pr, Nd, Tb, Th; Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements Li, Na, K, Cs, Cu, Ag, Mg, Ca, Sr, Ba, Zn, Cd, Hg, B, C, Ge, Sn, Pb, Ti, Zr, Hf, N, P, As, Sb, Bi, V, Nb, Ta, S, Se, Te, Cr, Mo, W, F, Cl, Br, I, Mn, Te, Re, Fe, Co, Ni, Ru, Rh, Pd, Os, Ir, Ce, Pr, Nd, Tb, Th combinations thereof, a catholyte fluid in the catholyte side of the electrochemical cell and in the catholyte reaction chamber, the catholyte fluid containing an ion species as a reducer species, the catholyte fluid reducer species comprising elements having atomic number below 90 and described as simple redox couple mediators including any of elements Cu, Ag, Mg, Ca, Sr, Ba, Zn, Hg, B, Tl, C, Ge, Sn, Pb, Ti, Zr, Hf, N, P, As, Bi, V, Nb, Ta, S, Se, Te, Po, Cr, Mo, W, Cl, Br, I, Mn, Fe, Co, Ni, Ru, Rh, Pd, Ir, Ce, Pr, Nd, Tb, Th; the Type I isopolyanions (IPA) formed by Mo, W, V, Nb, and Ta, and mixtures thereof as addenda atoms; the Type I heteropolyanions (HPA) formed by incorporation into the aforementioned isopolyanions of any of the elements Li, Na, K, Cs, Cu, Ag, Mg, Ca, Sr, Ba, Zn, Cd, Hg, B, C, Ge, Sn, Pb, Ti, Zr, Hf, N, P, As, Sb, Bi, V, Nb, Ta, S, Se, Te, Cr, Mo, W, F, Cl, Br, I, Mn, Te, Re, Fe, Co, Ni, Ru, Rh, Pd, Os, Ir, Ce, Pr, Nd, Tb, combinations thereof, an anolyte fluid circulator connected to the anolyte reaction chamber and to the anolyte side of the electrochemical cell, a catholyte fluid circulator connected to the catholyte reaction chamber and to the catholyte side of the electrochemical cell, a first material feed for first feed materials connected to the anolyte reaction chamber for introducing the first feed materials introduced in the anolyte reaction chamber for oxidizing first feed materials in the anolyte reaction chamber, a second material feed for second feed materials connected to the catholyte reaction chamber for introducing the second feed materials into the catholyte reaction chamber for reducing the second feed materials in the catholyte reaction chamber, materials to be changed are introduced into both the catholyte reaction chamber and the anolyte reaction chamber, a DC power supply connected to the anode and cathode.

2. The system of claim 1, wherein each material feed receives sharps material.

3. The system of claim 1, wherein each material feed is connected to soils for remediation.

4. The system of claim 3, further comprising a soil off gas handler connected to the electrochemical cell.

5. The system of claim 3, further comprising a soils container connected each material feed.

6. The system of claim 3, further comprising first and second complete systems, and wherein the anolyte material feed and an anolyte return of the anolyte system are connected to the soils and to the anolyte reaction chamber of anolyte system, and/or wherein the feed and a catholyte return of the catholyte system are connected to the soils and to a catholyte reaction chamber of the catholyte system, and wherein both catholyte and anolyte systems may be used simultaneously.

7. The system of claim 1, wherein material-bearing ore is provided in at least the catholyte or anolyte material feeds for recovery of the materials from the ore.

8. The system of claim 1, wherein material-bearing ore is provided in the feeds for recovery of the materials from the ore.

9. The system of claim 1, wherein the catholyte or anolyte material feeds and a catholyte or anolyte return are connected to the catholyte or anolyte reaction chambers and to a container for decontamination of the container or its contents.

10. The system of claim 1, wherein the catholyte or anolyte reaction chambers and a return are connected to a spa or pool for sanitizing.

11. The system of claim 1, wherein the catholyte or anolyte reaction chamber is connected to a cooling tower water system to remove biological materials from the cooling tower.

12. The system of claim 1, wherein the catholyte or anolyte reaction chambers and a return are connected to a washer.

13. The system of claim 1, further comprising first and second tanks respectively connected to the anolyte and the catholyte reaction chamber for receiving and holding sterilizing solutions from the reaction chambers.

14. A system comprising a decomposition system having an electrochemical cell, a membrane in the electrochemical cell separating the electrochemical cell into an anode side and a cathode side, an anode in the anode side, a cathode in the cathode side, an anolyte reaction chamber connected to the anolyte side of the electrochemical cell, a catholyte reaction chamber connected to the catholyte side of the electrochemical cell, an anolyte fluid in the anolyte side of the electrochemical cell and in the anolyte reaction chamber, the anolyte fluid containing an ion species as a oxidizer species, anolyte fluid oxidizer species comprising elements having atomic number below 90 and described as simple redox couple mediators, including any of elements Cu, Ag, Mg, Ca, Sr, Ba, Zn, Hg, B, Tl, C, Ge, Sn, Pb, Ti, Zr, Hf, N, P, As, Bi, V, Nb, Ta, S, Se, Te, Po, Cr, Mo, W, Cl, Br, I, Mn, Fe, Co, Ni, Ru, Rh, Pd, Ir, Ce, Pr, Nd, Tb, Th; Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements Li, Na, K, Cs, Cu, Ag, Mg, Ca, Sr, Ba, Zn, Cd, Hg, B, C, Ge, Sn, Pb, Ti, Zr, Hf, N, P, As, Sb, Bi, V, Nb, Ta, S, Se, Te, Cr, Mo, W, F, Cl, Br, I, Mn, Te, Re, Fe, Co, Ni, Ru, Rh, Pd, Os, Ir, Ce, Pr, Nd, Tb, Th combinations thereof, a catholyte fluid in the catholyte side of the electrochemical cell and in the catholyte reaction chamber, the catholyte fluid containing an ion species as a reducer species, the catholyte fluid reducer species comprising elements having atomic number below 90 and described as simple redox couple mediators including any of elements Cu, Ag, Mg, Ca, Sr, Ba, Zn, Hg, B, Tl, C, Ge, Sn, Pb, Ti, Zr, Hf, N, P, As, Bi, V, Nb, Ta, S, Se, Te, Po, Cr, Mo, W, Cl, Br, I, Mn, Fe, Co, Ni, Ru, Rh, Pd, Ir, Ce, Pr, Nd, Tb, Th; the Type I isopolyanions (IPA) formed by Mo, W, V, Nb, and Ta, and mixtures thereof as addenda atoms; the Type I heteropolyanions (HPA) formed by incorporation into the aforementioned isopolyanions of any of the elements Li, Na, K, Cs, Cu, Ag, Mg, Ca, Sr, Ba, Zn, Cd, Hg, B, C, Ge, Sn, Pb, Ti, Zr, Hf, N, P, As, Sb, Bi, V, Nb, Ta, S, Se, Te, Cr, Mo, W, F, Cl, Br, I, Mn, Te, Re, Fe, Co, Ni, Ru, Rh, Pd, Os, Ir, Ce, Pr, Nd, Tb, combinations thereof,
an anolyte fluid circulator connected to the anolyte reaction chamber and to the anolyte side of the electrochemical cell,
a catholyte fluid circulator connected to the catholyte reaction chamber and to the catholyte side of the electrochemical cell,
a first materials feed connected to the anolyte reaction chamber for introducing and oxidizing first materials in the anolyte reaction chamber,
a second materials feed connected to the catholyte reaction chamber for introducing and reducing second materials in the catholyte reaction chamber,
the first and second materials feeds introducing materials to be changed chemically into both the catholyte reaction chamber and the anolyte reaction chamber,
a DC power supply connected to the anode and cathode,
wherein the materials are fed into the anolyte reaction chamber producing carbon dioxide off gas, and wherein a second separation chamber having an anode and cathode, and a membrane, first and second off gas tubes connected to the anode and the cathode reaction chambers and connected to a catholyte within the second separation chamber, a second catholyte reaction chamber connected to the catholyte in the second separation chamber, a temperature control connected to the second catholyte reaction chamber, a third off gas tube connected to the second catholyte reaction chamber and a condenser connected to the third off gas tube, and a hydrogen, methane or methanol conduit connected to the condenser.

15. The system of claim 1, further comprising a combustion fuel appliance, a gas tube connected to the anolyte reaction chamber, a hydrogen tube connected to the catholyte reaction chamber, a source of fuel or methane and a blender connected to the source, to the gas tube, to the hydrogen tube and to the combustion appliance.

16. The system of claim 15, further comprising heat exchangers connected between the electrochemical cell and the reaction chambers, and a hot water supply connected to the heat exchangers and to the combustion appliance.

17. The system of claim 15, further comprising fuel cell inlet connections connected to the hydrogen tube and to an exhaust of the combustion appliance and a fuel cell outlet connection to the fuel blender.

18. The system of claim 15, wherein the combustion appliance is an engine producing mechanical power.

19. The system of claim 1, further comprising a gas tube connected to the anolyte reaction chamber and to the catholyte side of the electrochemical cell, and a hydrocarbon outlet connected to the catholyte reaction chamber.

20. The system of claim 19, wherein the hydrocarbon outlet is a hydrocarbon gas outlet, and further comprising a second electrochemical cell and a second catholyte reaction chamber connected to the second electrochemical cell and to the hydrocarbon gas outlet and a second hydrocarbon outlet connected to the second catholyte reaction chamber.

21. The system of claim 1, further comprising solar concentrators directing natural solar energy into the anolyte reaction chamber and the catholyte reaction chamber, wherein the components of the system are composed of solar light transparent glass, and the solar energy causes solar water splitting the production of hydrogen in the system is enhanced.

22. The system of claim 1, further comprising inorganic salt recovery vessels connected below the anolyte reaction chamber and the catholyte reaction chamber, and the electrochemical cell for separating inorganic salts respectively from the anolyte and the catholyte, wherein the inorganic salts resulting from oxidation or reduction of feed materials are saved for use in such applications as fertilizers.

23. A system comprising a decomposition system having an electrochemical cell, a membrane in the electrochemical cell separating the electrochemical cell into an anode side and a cathode side, an anode in the anode side, a cathode in the cathode side,
an anolyte reaction chamber connected to the anolyte side of the electrochemical cell,
a catholyte reaction chamber connected to the catholyte side of the electrochemical cell,
an anolyte fluid in the anolyte side of the electrochemical cell and in the anolyte reaction chamber,
a catholyte fluid in the catholyte side of the electrochemical cell and in the catholyte reaction chamber,
an anolyte fluid circulator connected to the anolyte reaction chamber and to the anolyte side of the electrochemical cell,
a catholyte fluid circulator connected to the catholyte reaction chamber and to the catholyte side of the electrochemical cell,
a material feed connected to the anolyte reaction chamber wherein materials are introduced for purposes of oxidizing them,
a material feed connected to the catholyte reaction chamber wherein materials are introduced for purposes of reducing them,
materials are introduced into both the catholyte reaction chamber and the anolyte reaction chamber,
a DC power supply connected to the anode and cathode,
wherein one reaction chamber feed receives an aqueous solution of a substance to be decomposed, and further comprising a water separation tank connected to the one reaction chamber and a permeable membrane in the tank, a compressed air outlet connected between the one reaction chamber and the tank, a water outlet connected to one side of the permeable membrane and a substance concentrated solution return connected between the water separation tank and the one reaction chamber.

24. The system of claim 1, further comprising gas outlets connected to the reaction chambers, and further comprising gas storage tanks connected to the gas outlets.

25. A system comprising a decomposition system having an electrochemical cell, a membrane in the electrochemical cell separating the electrochemical cell into an anode side and a cathode side, an anode in the anode side, a cathode in the cathode side,
an anolyte reaction chamber connected to the anolyte side of the electrochemical cell,
a catholyte reaction chamber connected to the catholyte side of the electrochemical cell,
an anolyte fluid in the anolyte side of the electrochemical cell and in the anolyte reaction chamber,
the anolyte fluid containing an ion species as a oxidizer species, anolyte fluid oxidizer species comprising elements having atomic number below 90 and described as simple redox couple mediators, including any of elements Cu, Ag, Mg, Ca, Sr, Ba, Zn, Hg, B, Tl, C, Ge, Sn, Pb, Ti, Zr, Hf, N, P, As, Bi, V, Nb, Ta, S, Se, Te, Po, Cr, Mo, W, Cl, Br, I, Mn, Fe, Co, Ni, Ru, Rh, Pd, Ir, Ce, Pr, Nd, Tb, Th; Type I isopolyanions (IPAs) formed by Mo, W, V, Nb, Ta, or mixtures thereof as addenda atoms; Type I heteropolyanions (HPAs) formed by incorporation into the aforementioned IPAs of any of the elements Li, Na, K, Cs, Cu, Ag, Mg, Ca, Sr, Ba, Zn, Cd, Hg, B, C, Ge, Sn, Pb, Ti, Zr, Hf, N, P, As, Sb, Bi, V, Nb, Ta, S, Se, Te, Cr, Mo, W, F, Cl, Br, I, Mn, Te, Re, Fe, Co, Ni, Ru, Rh, Pd, Os, Ir, Ce, Pr, Nd, Tb, Th combinations thereof, a catholyte fluid in the catholyte side of the electrochemical cell and in the catholyte reaction chamber, the catholyte fluid containing an ion species as a reducer species, the catholyte fluid reducer species comprising elements having atomic number below 90 and described as simple redox couple mediators including any of elements Cu, Ag, Mg, Ca, Sr, Ba, Zn, Hg, B, Tl, C, Ge, Sn, Pb, Ti, Zr, Hf, N, P, As, Bi, V, Nb, Ta, S, Se, Te, Po, Cr, Mo, W, Cl, Br, I, Mn, Fe, Co, Ni, Ru, Rh, Pd, Ir, Ce, Pr, Nd, Tb, Th; the Type I isopolyanions (IPA) formed by Mo, W, V, Nb, and Ta, and mixtures thereof as addenda atoms; the Type I heteropolyanions (HPA) formed by incorporation into the aforementioned isopolyanions of any of the elements Li, Na, K, Cs, Cu, Ag, Mg, Ca, Sr, Ba, Zn, Cd, Hg, B, C, Ge, Sn, Pb, Ti, Zr, Hf, N, P, As, Sb, Bi, V, Nb, Ta, S, Se, Te, Cr, Mo, W, F, Cl, Br, I, Mn, Te, Re, Fe, Co, Ni, Ru, Rh, Pd, Os, Ir, Ce, Pr, Nd, Tb, combinations thereof, an anolyte fluid circulator connected to the anolyte reaction chamber and to the anolyte side of the electrochemical cell, a catholyte fluid circulator connected to the catholyte reaction chamber and to the catholyte side of the electrochemical cell, a first materials feed connected to the anolyte reaction chamber for introducing and oxidizing the first materials in the anolyte reaction chamber, a second materials feed connected to the catholyte reaction chamber for introducing and reducing the second materials in the catholyte reaction chamber, materials to be destroyed are introduced into both the catholyte reaction chamber and the anolyte reaction chamber, a DC power supply connected to the anode and cathode, wherein methanol, methane, or combustible hydrocarbons are generated from carbon dioxide and oxygen gas from an anolyte-off gas system connected to the anolyte reaction chamber and from hydrogen gas from a catholyte-off gas system connected to the catholyte reaction chamber, wherein a fuel cell is supplied carbon dioxide and hydrogen from the anolyte-off gas system and the catholyte-off gas system connected to the fuel cell, wherein the off gas systems control temperature, pressure, and flow rate, wherein catholyte from the fuel cell is pumped to a hydrocarbon fuel cell processor, and wherein methanol, methane, or combustible hydrocarbons are removed from the hydrocarbon fuel cell processor.

26. The system of claim 25, wherein electricity is applied to an anode and a cathode across a membrane in the fuel cell to generate the methanol, methane, or combustible hydrocarbon, wherein a condenser connected to the hydrocarbon fuel cell processor dries off gas from the hydrocarbon fuel cell processor, and wherein water is condensed in the condenser and returned to the hydrocarbon fuel cell processor.

27. The system of claim 1, further comprising an oil sands waste line connected to one material feed,
an output connected to the anolyte reaction chamber or catholyte reaction chamber,
a membrane tank water separator connected to the outlet,
a clean water line, and
a return line separately connected to the membrane tank on opposite sides of the membrane.

28. The system of claim 1, further comprising a waste pond line connected to the first feed,
a clay, silt and sand receiver connected to a bottom of the anolyte reaction chamber,
an output connected to the anolyte reaction chamber,
a membrane tank water separator connected to the outlet,
a clean water-line, and a return line separately connected to the membrane tank on opposite sides of the membrane.

29. The system of claim 1, further comprising a coal cleaning processor connected to the anolyte reaction chamber.

30. The system of claim 1, wherein the power supply is a solar or wind driven power source, and further comprising a hydrogen storage tank connected to the catholyte reaction chamber.

31. The system of claim 30, further comprising a solar concentrator directing solar energy to the catholyte reaction chamber.

32. The system of claim 1, further comprising a $CO_2$ line connected from the anolyte reaction chamber to the catholyte side of the electrochemical cell, an $H_2$ line connected from the catholyte reaction chamber to the catholyte side of the electrochemical cell, and a methane outlet connected to the catholyte reaction chamber.

33. The system of claim 1, further comprising an oxidation and reduction potential sensor connected to the anolyte side and the catholyte side respectively of the electrochemical cell.

* * * * *